US 9,807,128 B2

(12) United States Patent
Tamura

(10) Patent No.: US 9,807,128 B2
(45) Date of Patent: Oct. 31, 2017

(54) COMMUNICATION SYSTEM AND COMPUTER READABLE MEDIUM

(71) Applicant: Hideki Tamura, Kanagawa (JP)

(72) Inventor: Hideki Tamura, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 122 days.

(21) Appl. No.: 14/432,865

(22) PCT Filed: Oct. 30, 2013

(86) PCT No.: PCT/JP2013/080061
§ 371 (c)(1),
(2) Date: Apr. 1, 2015

(87) PCT Pub. No.: WO2014/069671
PCT Pub. Date: May 8, 2014

(65) Prior Publication Data
US 2015/0304361 A1    Oct. 22, 2015

(30) Foreign Application Priority Data

Oct. 31, 2012  (JP) ................................ 2012-241325

(51) Int. Cl.
*H04L 29/06* (2006.01)
*H04M 3/56* (2006.01)
(Continued)

(52) U.S. Cl.
CPC ...... *H04L 65/1069* (2013.01); *H04L 12/1818* (2013.01); *H04L 63/08* (2013.01);
(Continued)

(58) Field of Classification Search
None
See application file for complete search history.

(56) References Cited

U.S. PATENT DOCUMENTS 6,466,252 B1    10/2002  Miyazaki
7,764,632 B2    7/2010   Gray et al.
(Continued)

FOREIGN PATENT DOCUMENTS

CN    1852081 A       10/2006
CN    101141612 A     3/2008
(Continued)

OTHER PUBLICATIONS

Extended European Search Report dated Nov. 11, 2015 in Patent Application No. 13851506.9.
(Continued)

*Primary Examiner* — Diane Lo
(74) *Attorney, Agent, or Firm* — Oblon, McClelland, Maier & Neustadt, L.L.P.

(57) ABSTRACT

A communication system include: a first acquisition unit configured to acquire request information of session initiation and authentication information of session participation; a session management unit configured to establish the session between the first terminal and the second terminal; a second acquisition unit configured to acquire request information of session participation and the authentication information of session participation being input by a third terminal; and a participation determination unit configured to compare the authentication information of session participation obtained by the first acquisition unit with the authentication information of session participation obtained by the second acquisition unit, and the participation determination unit allowing the third terminal to participate in the session when the authentication information of session participation obtained by the first acquisition unit is identical to the authentication information of session participation obtained by the second acquisition unit.

16 Claims, 40 Drawing Sheets

(51) Int. Cl.
*H04M 3/38* (2006.01)
*H04N 7/15* (2006.01)
*H04L 12/18* (2006.01)

(52) U.S. Cl.
CPC ........ *H04L 63/104* (2013.01); *H04L 65/1093* (2013.01); *H04L 65/403* (2013.01); *H04M 3/38* (2013.01); *H04M 3/56* (2013.01); *H04N 7/152* (2013.01); *H04M 2203/5009* (2013.01); *H04M 2203/5063* (2013.01); *H04M 2203/6045* (2013.01)

(56) References Cited

U.S. PATENT DOCUMENTS

| | | | |
|---|---|---|---|
| 8,402,091 | B2 | 3/2013 | Karniely |
| 8,732,244 | B2 | 5/2014 | Karniely |
| 8,943,139 | B2 | 1/2015 | Karniely |
| 9,325,512 | B2 | 4/2016 | Karniely |
| 2003/0156698 | A1 | 8/2003 | Creamer |
| 2005/0044167 | A1 | 2/2005 | Kobayashi et al. |
| 2008/0049922 | A1 | 2/2008 | Karniely |
| 2009/0086012 | A1* | 4/2009 | Thapa ............... H04N 7/15 348/14.08 |
| 2014/0033274 | A1 | 1/2014 | Okuyama |
| 2014/0049597 | A1 | 2/2014 | Inoue |
| 2015/0047002 | A1 | 2/2015 | Tamura |

FOREIGN PATENT DOCUMENTS

| | | |
|---|---|---|
| CN | 101621392 A | 1/2010 |
| CN | 102739668 A | 10/2012 |
| JP | 07-177482 | 7/1995 |
| JP | 2000-299739 | 10/2000 |
| JP | 2002-024105 | 1/2002 |
| JP | 2003-087250 | 3/2003 |
| JP | 2003-087759 | 3/2003 |
| JP | 2008-217116 | 9/2008 |
| JP | 2012-075024 | 4/2012 |
| JP | 2014-027433 | 2/2014 |
| JP | 2014-038522 | 2/2014 |

OTHER PUBLICATIONS

International Search Report dated Feb. 10, 2014 in PCT/JP2013/080061 filed on Oct. 30, 2013.
Chinese Office Action dated Jun. 2. 2017 in CN patent application No. 201380056830.X (with English translation), 18 pages.

* cited by examiner

FIG.5

RELAY DEVICE MANAGEMENT TABLE

| RELAY DEVICE ID | OPERATING STATE | DATE OF RECEPTION | IP ADDRESS OF RELAY DEVICE | MAXIMUM DATA TRANSMISSION RATE (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.2.2.2 | 10 |
| 111e | ON LINE | | 1.1.1.3 | |

FIG.6

TERMINAL AUTHENTICATION MANAGEMENT TABLE

| TERMINAL ID | PASSWORD |
|---|---|
| 10aa | aaaa |
| 10ab | abab |
| 10ba | baba |
| ... | ... |

FIG.7

TERMINAL MANAGEMENT TABLE

| TERMINAL ID | TERMINAL NAME | OPERATING STATE | COMMUNICATION STATE | PARTICIPATION AUTHENTICATION INFORMATION (PIN CODE) | DATE OF RECEPTION | IP ADDRESS OF TERMINAL |
|---|---|---|---|---|---|---|
| 10aa | TERMINAL AA, TOKYO OFFICE, JAPAN | ON-LINE (CALL-CAPABLE) | NONE | | 2009.11.10.13:40 | 1.2.1.3 |
| 10ab | TERMINAL AB, TOKYO OFFICE, JAPAN | OFF-LINE | CALLING | | 2009.11.09.12:00 | 1.2.1.4 |
| 10ac | TERMINAL AC, TOKYO OFFICE, JAPAN | ON-LINE (CALL-CAPABLE) | NONE | | 2009.11.10.13:00 | 1.2.1.5 |
| 10ad | TERMINAL AD, TOKYO OFFICE, JAPAN | ON-LINE (IN CALL) | PRIVATE BUSY | 1234 | 2009.11.10.13:30 | 1.2.1.6 |
| 10ae | TERMINAL AE, TOKYO OFFICE, JAPAN | ON-LINE (IN CALL) | PRIVATE BUSY | 1234 | 2009.11.10.13:15 | 1.2.1.7 |
| ... | ... | ... | | | ... | ... |
| 10ba | TERMINAL BA, OSAKA OFFICE, JAPAN | ON-LINE (CALL-CAPABLE) | NONE | | 2009.11.10.13:45 | 1.2.2.3 |
| 10bb | TERMINAL BB, OSAKA OFFICE, JAPAN | ON-LINE (CALL-CAPABLE) | NONE | | 2009.11.10.13:50 | 1.2.2.4 |
| ... | ... | ... | | | ... | ... |
| 10ca | TERMINAL CA, NEW YORK OFFICE, USA | OFF-LINE | | | 2009.11.10.12:45 | 1.3.1.3 |
| 10cb | TERMINAL CB, NEW YORK OFFICE, USA | ON-LINE (IN CALL) | CALLING | | 2009.11.10.13:55 | 1.3.1.4 |
| ... | ... | ... | | | ... | ... |
| 10da | TERMINAL DA, WASHINGTON OFFICE, USA | ON-LINE (IN CALL) | BUSY | | 2009.11.08.12:45 | 1.3.2.3 |
| 10db | TERMINAL DB, WASHINGTON OFFICE, USA | ON-LINE (CALL-CAPABLE) | NONE | | 2009.11.10.12:45 | 1.3.2.4 |
| ... | ... | ... | | | ... | ... |

FIG.8

DESTINATION LIST MANAGEMENT TABLE

| TERMINAL ID | DESTINATION TERMINAL ID |
|---|---|
| 10aa | 10ac, 10bc, 10ad, 10ae |
| 10ab | 10aa, 10ca, 10cb |
| 10ac | 10aa, 10ad, 10ae |
| ... | ... |
| 10ab | 10aa, 10ab, 10ba, ..., 10da, 10ca, ..., 10cb, ..., 10da |

FIG.9

SESSION MANAGEMENT TABLE

| SESSION ID | RELAY DEVICE ID | INITIATION REQUESTING TERMINAL ID | DESTINATION TERMINAL ID | DELAY TIME (ms) | DELAY INFORMATION RECEPTION DATE AND TIME |
|---|---|---|---|---|---|
| se1 | 111e | 10aa | 10db | 200 | 2009.11.10.14:00 |
| se2 | 111b | 10ba | 10be | 50 | 2009.11.10.14:10 |
| se3 | 111c | 10cd | 10cf | 400 | 2009.11.10.14:20 |
| ... | ... | ... | ... | ... | ... |

FIG.10

STATE CHANGE MANAGEMENT TABLE

| CHANGE REQUEST INFORMATION | STATE-BEFORE-CHANGE INFORMATION | CHANGE INFORMATION |
|---|---|---|
| Call | NONE | ACCEPTED |
| Join | ACCEPTED | BUSY |
| | PRIVATE ACCEPTED | Private Busy |
| Leave | BUSY | NONE |
| | PRIVATE BUSY | NONE |

FIG.11

STATE CHANGE MANAGEMENT TABLE

| CHANGE REQUEST INFORMATION | TERMINAL INFORMATION | STATE-BEFORE-CHANGE INFORMATION | CHANGE INFORMATION |
|---|---|---|---|
| Invite | START REQUEST TERMINAL | NONE | CALLING |
| | DESTINATION TERMINAL | NONE | RINGING |
| Private Invite | START REQUEST TERMINAL | NONE | PRIVATE CALLING |
| | DESTINATION TERMINAL | NONE | PRIVATE RINGING |
| Accept | START REQUEST TERMINAL | CALLING | ACCEPTED |
| | | PRIVATE CALLING | PRIVATE ACCEPTED |
| | | ACCEPTED | ACCEPTED |
| | | PRIVATE ACCEPTED | PRIVATE ACCEPTED |
| | DESTINATION TERMINAL | RINGING | ACCEPTED |
| | | PRIVATE RINGING | PRIVATE ACCEPTED |

START REQUEST OF TELEVISION
CONFERENCE IS RECEIVED FROM
TERMINAL AA, TOKYO OFFICE, JAPAN.

THIS CONFERENCE HAS PARTICIPATION
RESTRICTION.

DO YOU PARTICIPATE IN CONFERENCE?

YES    NO

FIG.34

| STATE | TERMINAL ID | TERMINAL NAME | PARTICIPATION RESTRICTION |
|---|---|---|---|
| 📞 | 10aa | TERMINAL AA, TOKYO OFFICE, JAPAN | NO |
| 📞 | 10ad | TERMINAL AD, TOKYO OFFICE, JAPAN | YES |
| 📞 | 10ae | TERMINAL AE, TOKYO OFFICE, JAPAN | YES |

FIG.37

PARTICIPATION
AUTHENTICATION INFORMATION
MANAGEMENT TABLE

| SESSION ID | PARTICIPATION AUTHENTICATION INFORMATION (PIN CODE) |
|---|---|
| se2 | 13569 |
| se4 | ab5d |
| se5 | x3z6Y |
| ... | ... |

FIG.38

TERMINAL MANAGEMENT TABLE

| TERMINAL ID | TERMINAL NAME | OPERATING STATE | COMMUNICATION STATE | DATE OF RECEPTION | IP ADDRESS OF TERMINAL |
|---|---|---|---|---|---|
| 10aa | TERMINAL AA, TOKYO OFFICE, JAPAN | ON-LINE (CALL-CAPABLE) | PRIVATE BUSY | 2009.11.10.13:40 | 1.2.1.3 |
| 10ab | TERMINAL AB, TOKYO OFFICE, JAPAN | OFF-LINE | | 2009.11.09.12:00 | 1.2.1.4 |
| 10ac | TERMINAL AC, TOKYO OFFICE, JAPAN | ON-LINE (CALL-CAPABLE) | NONE | 2009.11.10.13:00 | 1.2.1.5 |
| 10ad | TERMINAL AD, TOKYO OFFICE, JAPAN | ON-LINE (IN CALL) | PRIVATE BUSY | 2009.11.10.13:30 | 1.2.1.6 |
| 10ae | TERMINAL AE, TOKYO OFFICE, JAPAN | ON-LINE (IN CALL) | BUSY | 2009.11.10.13:15 | 1.2.1.7 |
| ... | ... | ... | | ... | ... |
| 10ba | TERMINAL BA, OSAKA OFFICE, JAPAN | ON-LINE (CALL-CAPABLE) | NONE | 2009.11.10.13:45 | 1.2.2.3 |
| 10bb | TERMINAL BB, OSAKA OFFICE, JAPAN | ON-LINE (CALL-CAPABLE) | NONE | 2009.11.10.13:50 | 1.2.2.4 |
| ... | ... | ... | | ... | ... |
| 10ca | TERMINAL CA, NEW YORK OFFICE, USA | OFF-LINE | | 2009.11.10.12:45 | 1.3.1.3 |
| 10cb | TERMINAL CB, NEW YORK OFFICE, USA | ON-LINE (IN CALL) | CALLING | 2009.11.10.13:55 | 1.3.1.4 |
| ... | ... | ... | | ... | ... |
| 10da | TERMINAL DA, WASHINGTON OFFICE, USA | ON-LINE (IN CALL) | BUSY | 2009.11.08.12:45 | 1.3.2.3 |
| 10db | TERMINAL DB, WASHINGTON OFFICE, USA | ON-LINE (CALL-CAPABLE) | | 2009.11.10.12:45 | 1.3.2.4 |
| ... | ... | ... | | ... | ... |

COMMUNICATION SYSTEM AND COMPUTER READABLE MEDIUM

TECHNICAL FIELD

The present invention relates to a communication system and a program.

BACKGROUND ART

As a request to cut down expenses and time required for a business trip is made in recent years, a call system which holds a teleconference or the like via a communication network such as the Internet has become widely available. A teleconference can be held by use of such call system in which image data and voice data are transmitted/received among a plurality of call terminals once a call has been initiated thereamong.

The enhancement of broadband environment in recent years has also allowed for the transmission/reception of high-quality image data and high-quality voice data among the plurality of call terminals, whereby one can grasp a state of the other party in the teleconference more easily to be able to have a more fulfilling communication by conversation.

Some conferences involve transmission/reception of data that is highly confidential, and thus it is desired to provide a technique which can appropriately restrict a participant to a conference. As a technique to restrict a participant to a conference, Patent Literature 1 has disclosed a technique which, for the purpose of restricting a participant to a conference, registers a participant prior to a conference and restricts the participation by anyone other than those who are registered participants.

SUMMARY OF THE INVENTION

Technical Problem

In the technique disclosed in Patent Literature 1, however, an operation by a user is required to register the participant to the conference in advance, where there is a demand to suit the convenience of a user while improving security by restricting participants in a more simple and appropriate manner and at the same time authorizing a specific person to participate.

The present invention has been made in consideration of the aforementioned problem. An object of the present invention is to provide a communication system and a program which can suit the convenience of a user while improving security by restricting a terminal allowed to participate in a communication in a simple and appropriate manner and at the same time allowing only a specific terminal to participate in the communication.

Solution to Problem

According to an aspect of the invention, a communication system is provided. The communication system include: a first acquisition unit configured to acquire request information of session initiation and authentication information of session participation, the request information of session initiation requesting for initiation of a session between a first terminal and a second terminal and the request information of session initiation including whether or not there is session participation restriction for at least one terminal other than the first terminal and the second terminal, and the authentication information of session participation being provided for authenticating participation to the session when there is the session participation restriction; a session management unit configured to establish the session between the first terminal and the second terminal according to the request information of session initiation; a second acquisition unit configured to acquire request information of session participation and the authentication information of session participation being input by a third terminal, the request information of session participation being a request for participation in the session; and a participation determination unit configured to compare the authentication information of session participation obtained by the first acquisition unit with the authentication information of session participation obtained by the second acquisition unit when the request information of session participation is the request for participation in the session established by the request information of session initiation specifying the participation restriction, and the participation determination unit allowing the third terminal to participate in the session when the authentication information of session participation obtained by the first acquisition unit is identical to the authentication information of session participation obtained by the second acquisition unit, wherein the session management unit causes the third terminal to participate in the session when the participation determination unit allows the third terminal to participate in the session.

According to another aspect of the invention, a computer readable medium including a computer program product is provided. The computer readable medium includes a computer program product, the computer program product comprising instructions which, when executed by a computer, causes the computer to perform operations comprising: acquiring request information of session initiation and authentication information of session participation, the request information of session initiation requesting for initiation of a session between a first terminal and a second terminal and the request information of session initiation including whether or not there is session participation restriction for at least one terminal other than the first terminal and the second terminal, and the authentication information of session participation being provided for authenticating participation to the session when there is the session participation restriction; establishing the session between the first terminal and the second terminal according to the request information of session initiation; acquiring request information of session participation and the authentication information of session participation being input by a third terminal, the request information of session participation being a request for participation in the session; and comparing the authentication information of session participation obtained by the first acquisition unit with the authentication information of session participation obtained by the second acquisition unit when the request information of session participation is the request for participation in the session established by the request information of session initiation specifying the participation restriction, and the participation determination unit allowing the third terminal to participate in the session when the authentication information of session participation obtained by the first acquisition unit is identical to the authentication information of session participation obtained by the second acquisition unit, wherein the session management unit causes the third terminal to participate in the session when the participation determination unit allows the third terminal to participate in the session.

Advantageous Effects of Invention

The present invention can have the effect of suiting the convenience of a user while improving security by restricting a terminal allowed to participate in a communication in a simple and appropriate manner and at the same time allowing only a specific terminal to participate in the communication.

BRIEF DESCRIPTION OF DRAWINGS

FIG. 5 is a conceptual diagram illustrating a relay device management table.

FIG. 6 is a conceptual diagram illustrating a terminal authentication management table.

FIG. 7 is a conceptual diagram illustrating a terminal management table according to the first embodiment.

FIG. 8 is a conceptual diagram illustrating a destination list management table.

FIG. 9 is a conceptual diagram illustrating a session management table.

FIG. 10 is a conceptual diagram illustrating a state modification management table.

FIG. 11 is a conceptual diagram illustrating a state modification management table.

FIG. 24 is a diagram illustrating a display example of an initiation request acceptance screen.

FIG. 34 is a diagram illustrating an example of a destination list displayed on a display 120 of a participation requesting terminal according to the third embodiment.

FIG. 37 is a diagram illustrating an example of a participation authentication information management table according to the fifth embodiment.

FIG. 38 is a diagram illustrating an example of a terminal management table according to the fourth embodiment.

DESCRIPTION OF EMBODIMENTS

Figure 1:
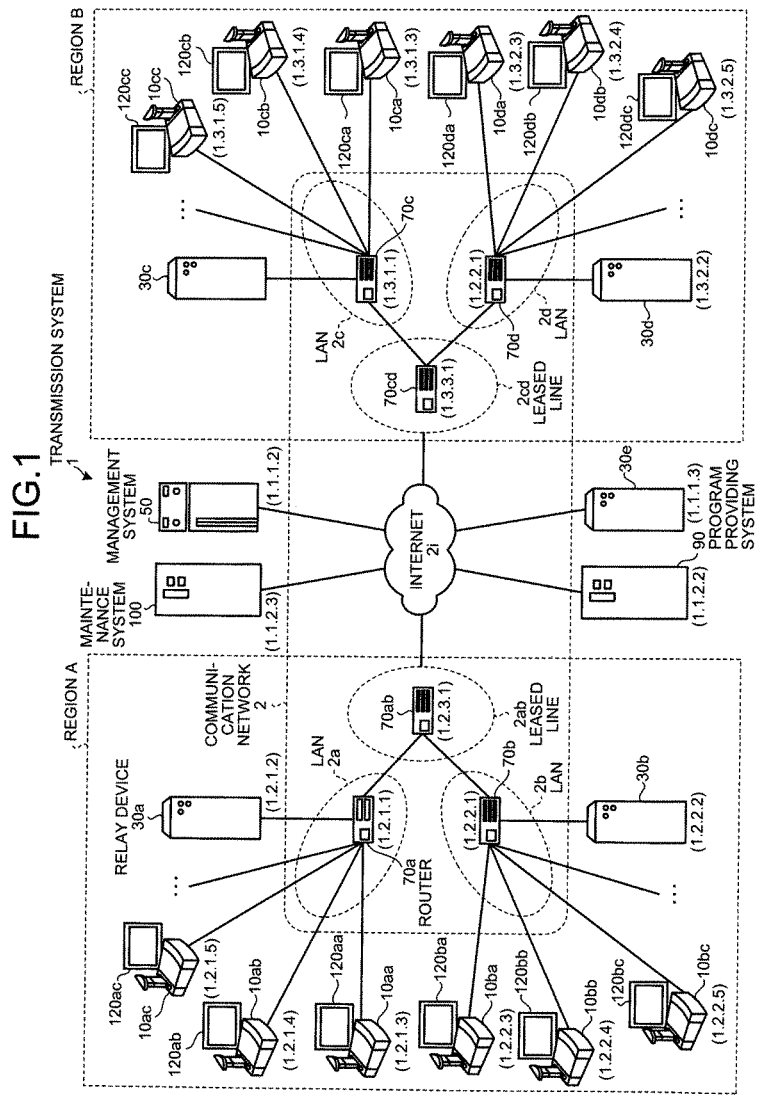
FIG. 1 is a schematic diagram of a transmission system.

Embodiments of a communication system and a program will now be described in detail with reference to the attached drawings. FIG. 1 is a block diagram illustrating a configuration of a communication system and a program according to an embodiment.

First Embodiment

<<Overall Configuration of Embodiment>>

Embodiments of a communication system and a program will now be described in detail with reference to FIGS. 1 to 43. FIG. 1 is a schematic diagram of a transmission system 1 serving as a communication system according to a first embodiment and will be used to first describe an overview of the present embodiment.

The transmission system 1 includes: a data providing system which transmits content data in one direction from one transmission terminal to another transmission terminal through a management system; and a communication system which mutually communicates information and emotions among a plurality of transmission terminals through the management system. The communication system is a system in which a plurality of communication terminals (equivalent to the "transmission terminal") communicates information and emotions with one another through a communication management system (equivalent to the "management system"), and can be a teleconference system, a videophone system, a voice conference system, a voice phone system, or a PC (Personal Computer) screen sharing system, for example.

The transmission system 1, a management system 50, and a transmission terminal 10 will be described in the present embodiment on the assumption that the teleconference system is given as an example of the communication system, a teleconference management system is given as an example of the communication management system, and a teleconference terminal is given as an example of the communication terminal. That is, the communication system according to the present embodiment is applied not only to the teleconference system but to the communication system and the transmission system.

The transmission system 1 illustrated in FIG. 1 includes: a plurality of transmission terminals (10aa, 10ab, etc); displays (120aa, 120ab, etc) provided for each of the transmission terminals (10aa, 10ab, etc); a plurality of relay devices (30a, 30b, 30c, 30d, and 30e); the management system 50; a program providing system 90; and a maintenance system 100. Note that the "transmission terminal" is hereinafter simply referred to as a "terminal", while the "management system" is simply referred to as a "management system".

Also in the present embodiment the "transmission terminal 10" is used to refer to any of the transmission terminals (10aa, 10ab, etc), a "display 120" is used to refer to any of the displays (120aa, 120ab, etc), and a "relay device 30" is used to refer to any of the relay devices (30a, 30b, 30c, 30d, and 30e).

The transmission terminal 10 transmits/receives various pieces of information to/from another device. The transmission terminal 10 establishes a session with another terminal 10, for example, and has a call therewith while transmitting/receiving content data including voice data and image data in the established session. Accordingly, a teleconference among the plurality of terminals 10 is realized in the transmission system 1.

The "image data and the voice data" will be hereinafter referred to as the "content data". Note that the content data transmitted among the terminals 10 is not limited to what is described in the embodiment but may be text data, for example, or content data including the text data in addition to the voice data and the image data, for example. The image data may be a moving image, a still image, or include both the moving image and the still image.

Moreover, when a teleconference is to be held in the transmission system 1 according to the present embodiment, a user who wishes to initiate the conference operates a predetermined terminal 10, which then transmits initiation requesting information to the management system 50.

The initiation requesting information here refers to information which makes a request to initiate a session used in the teleconference and includes information specifying the terminal 10 to be the other party in the session. The terminal 10 which transmits the initiation requesting information will be hereinafter referred to as an initiation requesting terminal.

Moreover, the terminal 10 of the other party specified as the other party in the session will be referred to as a destination terminal.

The destination terminal (the other party in the session) may be one of the terminals 10 or two or more of the terminals 10. This means that in the transmission system 1, a teleconference can be realized by using a session established not only between two of the terminals 10 but among three or more of the terminals 10.

Furthermore, in the transmission system 1 according to the present embodiment, another user can participate in a teleconference in the middle thereof, at which time a session has already been established and the teleconference has been initiated. A user who wishes to participate in a conference operates a predetermined terminal 10, which then transmits to the management system 50 participation requesting information specifying the session being established (hereinafter referred to as an established session) and used in the teleconference in which the user wishes to participate. The terminal 10 which transmits the participation requesting information will be hereinafter referred to as a participation requesting terminal.

The management system 50 manages the terminal 10 and the relay device 30 in an integrated manner. The management system 50 realizes a teleconference by means of a call or a like between the terminals 10 by establishing a session between the terminals 10.

Having received the initiation requesting information for a session from the predetermined terminal 10, the management system 50 establishes the session between the terminal 10 (initiation requesting terminal) which has transmitted the initiation requesting information and the destination terminal, and initiates the teleconference. Having received the participation requesting information for a session which has already been established (hereinafter referred to as the established session) from the predetermined terminal 10, on the other hand, the management system 50 determines whether or not to allow the participation requesting terminal to participate in the established session.

Furthermore, a plurality of routers (70a, 70b, 70c, 70d, 70ab, and 70cd) illustrated in FIG. 1 selects an optimal path for the content data. Note that in the present embodiment, a "router 70" is used to refer to any of the routers (70a, 70b, 70c, 70d, 70ab, and 70cd). The relay device 30 relays the content data among the plurality of terminals 10.

The program providing system 90 includes a HD (Hard Disk) which is not shown and stores a program for terminal provided to allow the terminal 10 to implement various functions or various means, and can transmit the program for terminal to the terminal 10. The HD in the program providing system 90 also stores a program for relay device provided to allow the relay device 30 to implement various functions or various means, whereby the program for relay device can be transmitted to the relay device 30. Furthermore, the HD in the program providing system 90 stores a program for transmission management provided to allow the management system 50 to implement various functions or various means, whereby the program for transmission management can be transmitted to the management system 50.

The maintenance system 100 is a computer which performs maintenance, management, or upkeep on at least one of the terminal 10, the relay device 30, the management system 50, and the program providing system 90. For example, the maintenance system 100 remotely performs maintenance, management or upkeep on at least one of the terminal 10, the relay device 30, the management system 50, and the program providing system 90 through a communication network 2 when the maintenance system 100 is installed within the country while the terminal 10, the relay device 30, the management system 50, or the program providing system 90 is installed outside the country. The maintenance system 100 further performs maintenance such as the management of a model number, a serial number, a sale destination, maintenance check, or a trouble history of at least one of the terminal 10, the relay device 30, the management system 50, and the program providing system 90 without passing through the communication network 2.

The terminals (10*aa*, 10*ab*, 10*ac*, etc), the relay device 30*a*, and the router 70*a* are connected by a LAN 2*a* to be able to communicate with one another. The terminals (10*ba*, 10*bb*, 10*bc*, etc), the relay device 30*b*, and the router 70*b* are connected by a LAN 2*b* to be able to communicate with one another. The LANs 2*a* and 2*b* are connected to be able to communicate with each other by a leased line 2*ab* including the router 70*ab* and are established within a predetermined region A. For example, the LAN 2*a* is established at a branch in Tokyo while the LAN 2*b* is established at a branch in Osaka where the region A corresponds to Japan.

On the other hand, the terminals (10*ca*, 10*cb*, 10*cc*, etc), the relay device 30*c*, and the router 70*c* are connected by a LAN 2*c* to be able to communicate with one another. The terminals (10*da*, 10*db*, 10*dc*, etc), the relay device 30*d*, and the router 70*d* are connected by a LAN 2*d* to be able to communicate with one another. The LANs 2*c* and 2*d* are connected to be able to communicate with each other by a leased line 2*cd* including the router 70*cd* and are established within a predetermined region B. For example, the LAN 2*c* is established at a branch in New York while the LAN 2*d* is established at a branch in Washington D.C. where the region B corresponds to the United States. The regions A and B are connected to be able to communicate with each other via Internet 2*i* by the respective routers (70*ab* and 70*cd*).

The management system 50 and the program providing system 90 are connected to the terminal 10 and the relay device 30 via the Internet 2*i* to be able to communicate with one another. The management system 50 and the program providing system 90 may be installed in the region A, the region B, or another region.

The relay device 30*e* is connected to the terminal 10 to be able to communicate therewith via the communication network 2. The relay device 30*e* is running at all times and thus installed in a region other than the region A or the region B in order to not be easily influenced by the traffic within a local area in the region A or B. Accordingly, the relay device 30*e* is used as a relay device which relays the content data when the terminal 10 calls a terminal installed in another local area. The relay device 30*e* is also used as an emergency relay device when a call is made between the terminals in the same local area in a case where the relay device installed in the local area is not running.

Note that the communication network 2 in the present embodiment is constructed by the LAN 2*a*, the LAN 2*b*, the leased line 2*ab*, the Internet 2*i*, the leased line 2*cd*, the LAN 2*c*, and the LAN 2*d*. In addition to the wire communication provided, the communication network 2 may have an area where wireless communication is provided.

As illustrated in FIG. 1, a set of four numbers at the bottom of each terminal 10, each relay device 30, the management system 50, each router 70, the program providing system 90 and the maintenance system 100 indicates a simplified IP address of a general IPv4. The IP address of the terminal 10*aa* is "1.2.1.3", for example. While IPv6 may be used instead of the IPv4, the IPv4 will be used to simplify the description.

<<Hardware Structure of Embodiment>>

Figure 2:
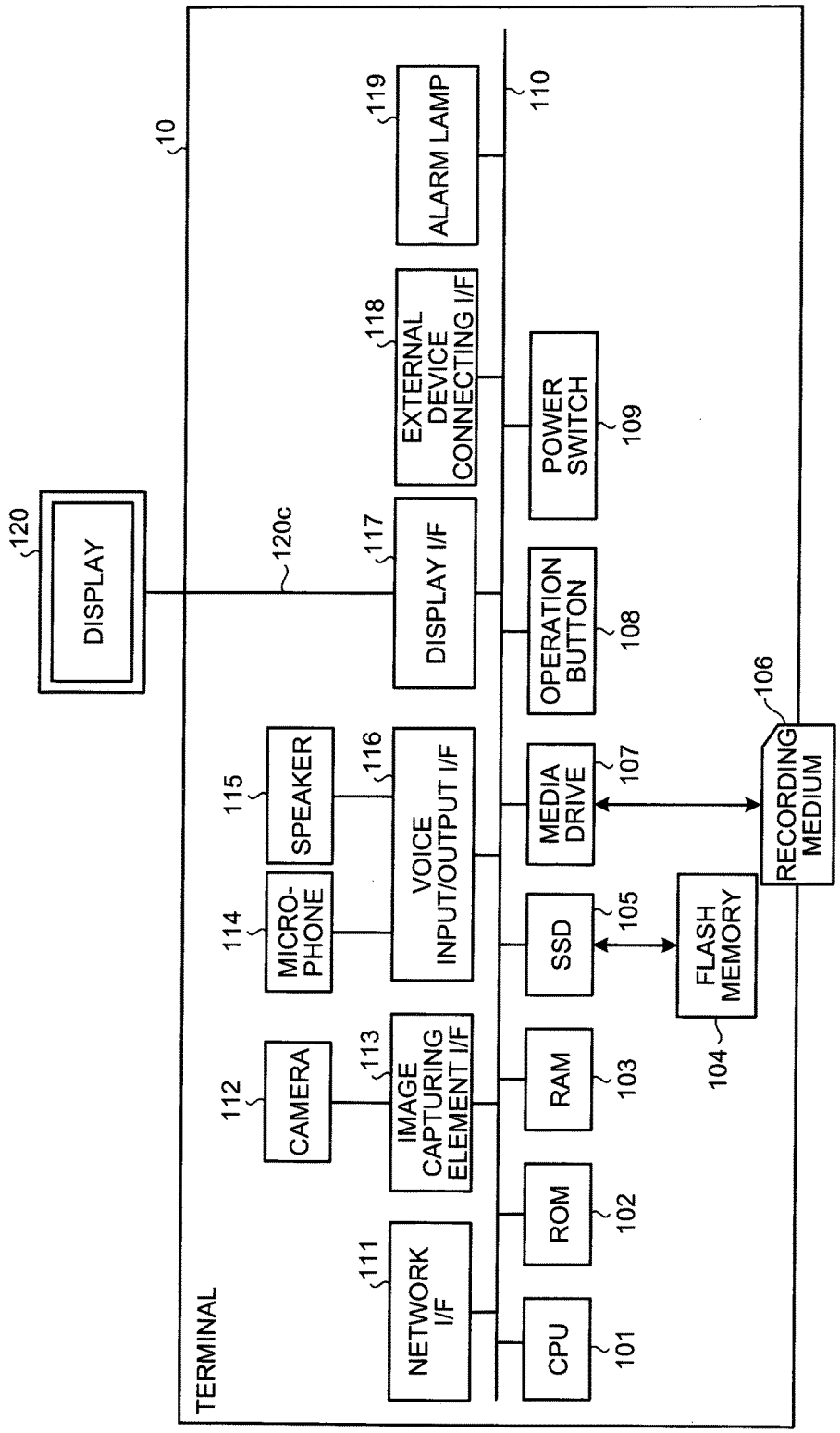
FIG. 2 is a diagram illustrating a hardware structure of a transmission terminal.

The hardware structure of the present embodiment will now be described. FIG. 2 is a diagram illustrating a hardware structure of the terminal 10 according to the present embodiment. As illustrated in FIG. 2, the terminal 10 according to the present embodiment includes: a CPU (Central Processing Unit) 101 which controls the overall operation of the terminal 10; a ROM (Read Only Memory) 102 in which the program for terminal is stored; a RAM (Random Access Memory) 103 which is used as a work area for the CPU 101; a flash memory 104 which stores various data such as the image data and the voice data; an SSD (Solid State Drive) 105 which controls reading or writing of the various data from/to the flash memory 104 under control of the CPU 101; a media drive 107 which controls reading or writing (storing) of data from/to a recording medium 106 such as a flash memory; an operation button 108 which is operated when selecting the destination terminal 10 or the like; a power switch 109 which switches a power source of the terminal 10 ON and OFF; and a network I/F (Interface) 111 which transmits data by using the communication network 2 to be described.

The terminal 10 further includes: a built-in camera 112 which captures an image of an object under control of the CPU 101 and obtains the image data; an image capturing element I/F 113 which controls drive of the camera 112; a built-in microphone 114 into which voice is input; a built-in speaker 115 which outputs the voice; a voice input/output I/F 116 which processes input/output of a voice signal between the microphone 114 and the speaker 115 under control of the CPU 101; a display I/F 117 which transmits the image data to the external display 120 under control of the CPU 101; an external device connecting I/F 118 which connects various external devices; an alarm lamp 119 which notifies of abnormality in various functions of the terminal 10; and a bus line 110 such as an address bus or a data bus which electrically connects each of the components as illustrated in FIG. 2.

The display 120 is a display unit which is formed of a liquid crystal or organic EL and on which an image of an object or an operation icon is displayed. The display 120 is connected to the display I/F 117 by a cable 120*c*. The cable 120*c* may be a cable adapted for an analog RGB (VGA) signal, component video, or an HDMI (High-Definition Multimedia Interface) or DVI (Digital Video Interactive) signal.

The camera 112 includes a lens and a solid image capturing element which converts light into an electrical charge to turn the image (video) of an object into an electronic form, where the solid image capturing element is formed of a CMOS (Complementary Metal Oxide Semiconductor) or a CCD (Charge Coupled Device), for example.

The external device connecting I/F 118 can electrically connect thereto an external device such as an external camera, an external microphone, or an external speaker by a USB (Universal Serial Bus) cable or the like. The external camera, when connected, is given priority over the built-in camera 112 and driven under control of the CPU 101. Likewise, the external microphone or the external speaker, when connected, is given priority over the built-in microphone 114 or the built-in speaker 115, respectively, and driven under control of the CPU 101. Note that the terminal 10 may be a general-purpose PC (Personal Computer), a smartphone, a tablet terminal, or a mobile phone. In this case, the camera 112 and the microphone 114 need not be built in but may be mounted externally.

The recording medium 106 is removable from the terminal 10. Moreover, the flash memory 104 may be replaced by an EEPROM (Electrically Erasable and Programmable ROM) or the like as long as it is a nonvolatile memory which reads or writes data under control of the CPU 101.

Furthermore, the program for terminal may be distributed while recorded in a recording medium (such as the recording medium 106) that can be read by a computer, the program having an installable or executable file format. The program for terminal may be stored not in the flash memory 104 but the ROM 102 instead.

Figure 3:
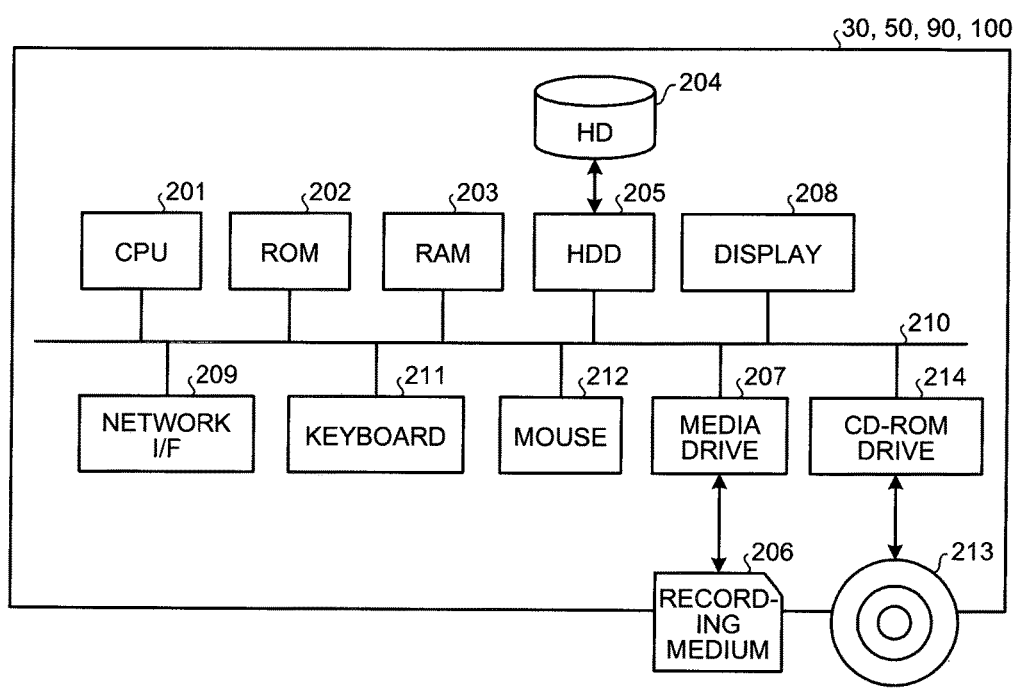
FIG. 3 is a diagram illustrating a hardware structure of a management system, a relay device, a program providing system, or a maintenance system.

FIG. 3 is a diagram illustrating a hardware structure of the management system according to the present embodiment. The management system 50 includes: a CPU 201 which controls the overall operation of the management system 50; a ROM 202 in which the program for transmission management is stored; a RAM 203 which is used as a work area for the CPU 201; an HD (Hard Disk) 204 in which various data is stored; an HDD (Hard Disk Drive) 205 which controls reading or writing of various data from/to the HD 204 under control of the CPU 201; a media drive 207 which controls reading or writing (storing) of data from/to a recording medium 206 such as a flash memory; a display 208 which displays various information such as a cursor, a menu, a window, a letter, or an image; a network I/F 209 which transmits data by using the communication network 2 to be described; a keyboard 211 which includes a plurality of keys to input a letter, a numerical value, various instructions and the like; a mouse 212 which selects and executes the various instructions, selects an object to be processed, and moves the cursor; a CD-ROM drive 214 which controls reading or writing of data from/to a CD-ROM (Compact Disc Read Only Memory) 213 as an example of a removable recording medium; and a bus line 210 such as an address bus or a data bus which electrically connects each of the components as illustrated in FIG. 3.

Note that the program for transmission management may be distributed while recorded in a recording medium such as the recording medium 206 or the CD-ROM 213 that can be read by a computer, the program having an installable or executable file format.

The description of the relay device 30 will be omitted since the hardware structure thereof is similar to that of the management system 50. Here, a program for relay device provided to control the relay device 30 is recorded in the ROM 202. In this case as well, the program for relay device may be distributed while recorded in a recording medium such as the recording medium 206 or the CD-ROM 213 that can be read by a computer, the program having an installable or executable file format.

Furthermore, the description of the program providing system 90 will be omitted since the hardware structure thereof is similar to that of the management system 50. A program for providing program which is provided to control the program providing system 90 is however recorded in the ROM 202. In this case as well, the program for providing program may be distributed while recorded in a recording medium such as the recording medium 206 or the CD-ROM 213 that can be read by a computer, the program having an installable or executable file format.

The description of the maintenance system 100 will be omitted since the hardware structure thereof is similar to that of the management system 50. A program for maintenance provided to control the maintenance system 100 is however recorded in the ROM 202. In this case as well, the program for maintenance may be distributed while recorded in a recording medium such as the recording medium 206 or the CD-ROM 213 that can be read by a computer, the program having an installable or executable file format.

Note that the aforementioned programs may be provided while recorded in a recording medium such as a CD-R (Compact Disc Recordable), a DVD (Digital Versatile Disk), or a Blu-ray disk that can be read by a computer as another example of the removable recording medium.

<<Functional Structure of Present Embodiment>>

Figure 4:
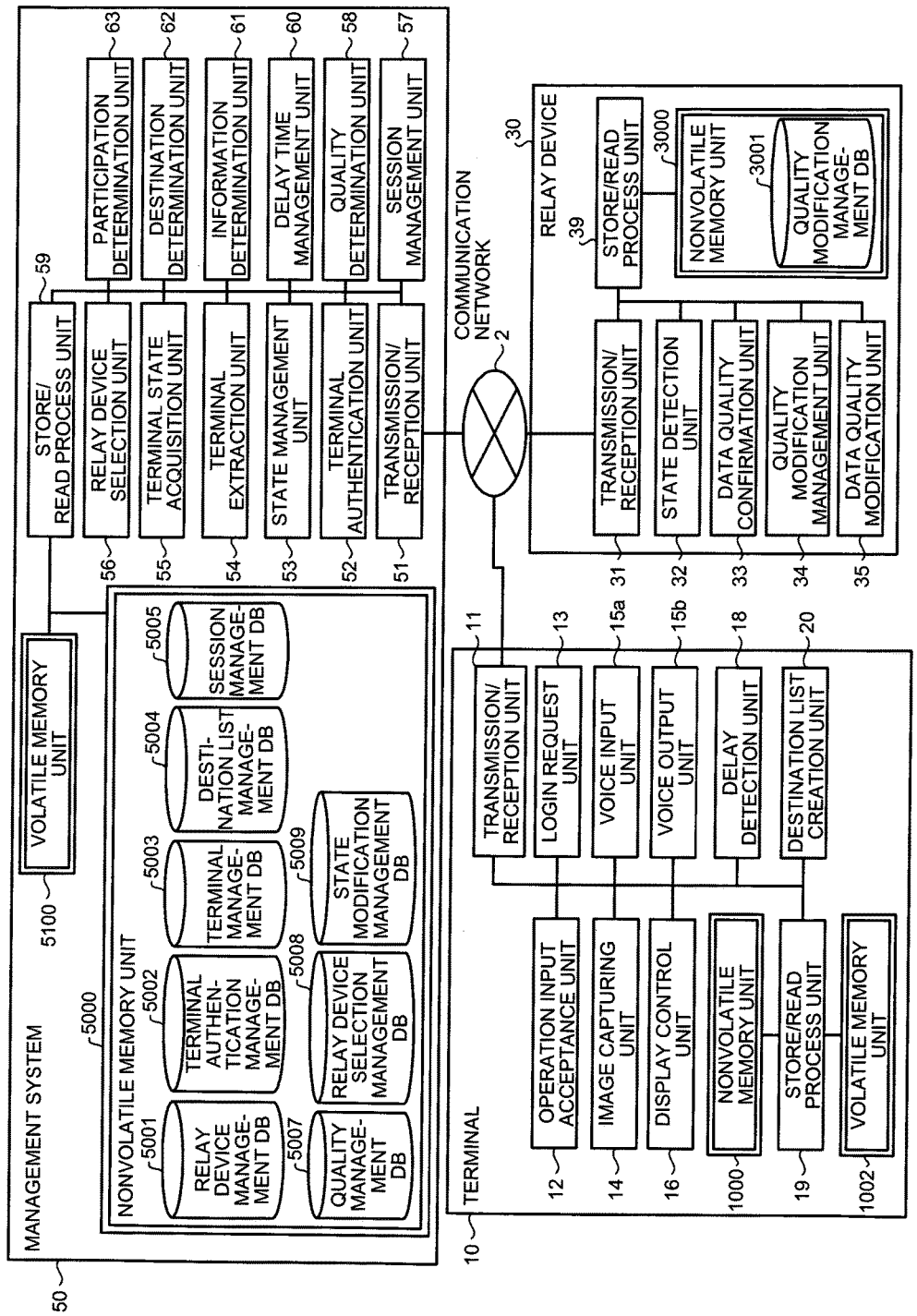
FIG. 4 is a functional block diagram illustrating each of a terminal, a device, and a system configuring the transmission system according to a first embodiment.

The functional structure of the present embodiment will now be described. FIG. 4 is a functional block diagram illustrating the functional structure of each of the terminals, the device and the system included in the transmission system 1 according to the present embodiment. As illustrated in FIG. 4, the terminal 10, the relay device 30 and the management system 50 are connected to be able to perform data communication with one another via the communication network 2. Here, the program providing system 90 and the maintenance system 100 illustrated in FIG. 1 are omitted from FIG. 4 since the systems are not directly relevant to teleconference communication.

<Functional Structure of Terminal>

The terminal 10 includes a transmission/reception unit 11, an operation input acceptance unit 12, a login request unit 13, an image capturing unit 14, a voice input unit 15a, a voice output unit 15b, a display control unit 16, a delay detection unit 18, a store/read process unit 19, and a destination list creation unit 20. Each of these units is a function or means implemented when any of the components illustrated in FIG. 2 is operated by a command from the CPU 101 according to the program stored in the ROM 102. The terminal 10 further includes a volatile memory unit 1002 constructed by the RAM 103 illustrated in FIG. 2 and a nonvolatile memory unit 1000 constructed by the flash memory 104 illustrated in FIG. 2.

<Each Functional Unit of Terminal>

Each unit of the terminal will now be described in detail. The transmission/reception unit 11 of the terminal 10 is implemented by the network I/F 111 illustrated in FIG. 2 and transmits/receives various data (or information) to/from another terminal, device or system via the communication network 2.

The transmission/reception unit 11 starts receiving from the management system 50 each state information representing the state of each terminal 10 as a destination terminal candidate before the concerned terminal 10 establishes a session with another terminal 10 and initiates a teleconference by placing a call.

The destination terminal candidate here refers to the terminal 10 that can be designated as the other party the concerned terminal 10 holds the teleconference with, or the other party in the session. In other words, the concerned terminal 10 cannot establish the session or hold the teleconference with a terminal that is not preset as the destination terminal candidate. The destination terminal candidate is a candidate for a partner terminal, namely a partner terminal candidate, which holds the teleconference with the concerned terminal.

The state information represents an operating status (an ON line or OFF line state) of each terminal 10 and, when the terminal is ON line, a detailed state (hereinafter referred to as a communication state) indicating whether the terminal is in call or on standby. The state information represents not only the operating status and the communication state of each terminal 10 but also a variety of states including a state where a cable is detached from the terminal 10, voice can be output but an image cannot, or the terminal is set to not output voice (MUTE). Described below is a case where the state information represents the operating status and the communication state.

The transmission/reception unit 11 further transmits the initiation requesting information to the management system 50 when the concerned terminal 10 operates as an initiation requesting terminal. Here, the initiation requesting information refers to information which makes a request to initiate a session used in the teleconference. The initiation requesting information specifically includes the information indicating the request to initiate the session, a terminal ID of the initiation requesting terminal from which the initiation requesting information is transmitted, a terminal ID which identifies the destination terminal to be the other party in the session, and restriction information indicating whether or not participation to the session by a terminal other than the destination terminal is restricted. Note that the terminal ID is a piece of information which identifies the terminal 10 or a user thereof, and may be stored in the terminal 10 in advance or input directly into the terminal 10 by the user.

The initiation requesting information specifically includes "Invite" or "Private Invite". Here, the "Invite" is the information which makes the request to initiate the session and, at the same time, is the restriction information indicating that participation is not restricted. On the other hand, the "Private Invite" is the information which makes the request to initiate the session and, at the same time, is the restriction information indicating that participation is restricted.

The restriction information is now described in detail. In the transmission system 1 according to the present embodiment, another terminal 10 can participate in the session that has already been established. There is however a conference such as a conference with high confidentiality where it is desired not to allow the other terminal 10 to participate. Now, in the transmission system 1 according to the present embodiment, the participation to the established session by the other terminal 10 is restricted in accordance with the restriction information indicating whether or not participation is restricted.

The transmission/reception unit 11 further transmits the participation requesting information to the management system 50 when the concerned terminal 10 operates as a participation requesting terminal. Here, the participation requesting information refers to information which makes a request for the participation to the established session used in the teleconference that has already been initiated. The participation requesting information specifically includes information "Call" indicating that it is the participation requesting information, a terminal ID of the participation requesting terminal from which the participation requesting information is transmitted, and a terminal ID of a participant terminal that is a terminal already participating in the established session in which the participation requesting terminal wishes to participate. Here, the participant terminal specifically refers to the initiation requesting terminal or the destination terminal which is indicated in the initiation requesting information transmitted when starting the established session. The transmission/reception unit 11 here functions as an initiation requesting information acquisition unit which acquires the initiation requesting information and a participation requesting information acquisition unit which acquires the participation requesting information.

The operation input acceptance unit 12 is implemented by the operation button 108 and the power switch 109 illustrated in FIG. 2 and accepts various inputs from a user. Once the user has turned on the power switch 109 illustrated in FIG. 2, for example, the operation input acceptance unit 12 illustrated in FIG. 4 accepts the power-on input and thus turns on the power source.

The login request unit 13 is implemented by a command from the CPU 101 illustrated in FIG. 2, triggered by the acceptance of the power-on input, and automatically transmits login requesting information indicating a request to login as well as a current IP address of the concerned terminal 10 to the management system 50 from the transmission/reception unit 11 via the communication network 2. Once the user has turned off the power switch 109 from the on state, the transmission/reception unit 11 transmits state information indicating that the power source is turned off to the management system 50, followed by the operation input acceptance unit 12 completely turning off the power source. The management system 50 can therefore figure out that the power source of the terminal 10 has been turned off from the on state.

The image capturing unit 14 is implemented by a command from the CPU 101 illustrated in FIG. 2 as well as the camera 112 and the image capturing element I/F 113 illustrated in FIG. 2, and captures an image of an object to output image data obtained by capturing the image. The voice input unit 15a is implemented by the voice input/output I/F 116 illustrated in FIG. 2 and, after the voice of the user has been converted into a voice signal by the microphone 114, inputs voice data corresponding to the voice signal. The voice output unit 15b is implemented by a command from the CPU 101 illustrated in FIG. 2 as well as the voice input/output I/F 116 illustrated in FIG. 2, and outputs the voice signal corresponding to the voice data to the speaker 115, from which voice is output.

The display control unit 16 is implemented by the display I/F 117 illustrated in FIG. 2 and performs control to transmit the image data to the external display 120. Before the terminal 10 as a requestor starts the teleconference call with the terminal 10 as a desired destination, the display control unit 16, displays a destination list on the display 120, the destination list reflecting the state information received by the transmission/reception unit 11, which has started receiving the information, and including the name of each destination.

The delay detection unit 18 is implemented by a command from the CPU 101 illustrated in FIG. 2 and detects a delay time (ms) generated when the image data or the voice data is transmitted from another terminal 10 via the relay device 30.

The store/read process unit 19 is implemented by a command from the CPU 101 illustrated in FIG. 2 as well as the SSD 105 or the like illustrated in FIG. 2 as an example, and performs a process to store various data in the nonvolatile memory unit 1000 and read the various data stored in the nonvolatile memory unit 1000. The nonvolatile memory unit 1000 stores the terminal ID (Identification) which identifies the terminal 10 and a password, for example. Furthermore, the store/read process unit 19 performs a process to store various data in the volatile memory unit 1002 and read the various data stored in the volatile memory unit 1002. The volatile memory unit 1002 stores the content data received when having a call with the destination terminal, the content data being overwritten and stored every time it is received. Among the content data received, the image corresponding to the image data before being overwritten is displayed on the display 120, while the voice corresponding to the voice data before being overwritten is output from the speaker 115.

Figure 17:
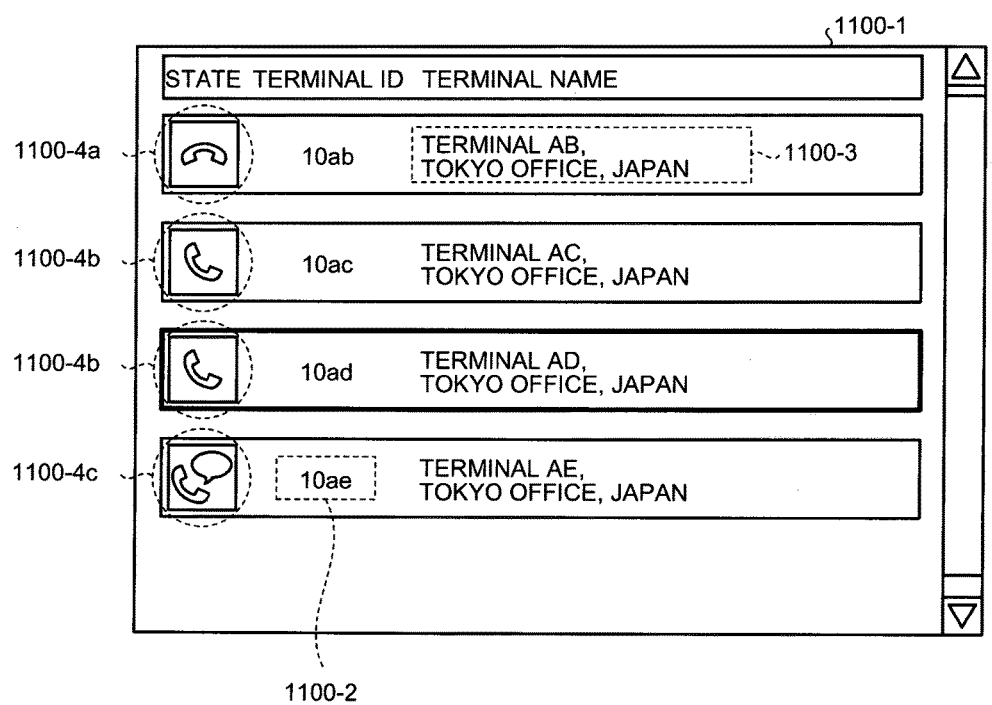
FIG. 17 is a diagram illustrating a display example of a destination list.

On the basis of destination list information to be described and the state information of the terminal 10 as each destination candidate to be described, the destination list creation unit 20 creates and updates a destination list in which the state of the destination candidate is indicated by an icon as illustrated in FIG. 17, the destination list information and the state information being received from the management system 50.

(Functional Structure of Relay Device)

Next, a function or means of the relay device 30 will be described. The relay device 30 includes a transmission/reception unit 31, a state detection unit 32, a data quality confirmation unit 33, a quality modification management unit 34, a data quality modification unit 35, and a store/read process unit 39. Each of these units is a function or means implemented when any of the components illustrated in FIG. 3 is operated by a command from the CPU 201 according to the program stored in the ROM 202. The relay device 30 further includes a nonvolatile memory unit 3000 which is constructed by the HD 204 illustrated in FIG. 3 and in which various data and information are kept stored even when the power source of the relay device 30 is turned off.

(Quality Modification Management Table)

The nonvolatile memory unit 3000 includes a quality modification management DB (Data Base) 3001 including a quality modification management table. The quality modification management table manages therein an IP address of the terminal 10 to which the image data is relayed in association with image quality of the image data relayed to its destination by the relay device 30.

The present embodiment includes a low-resolution image to be a base image formed of 160 pixels horizontally and 120 pixels vertically, a medium-resolution image formed of 320 pixels horizontally and 240 pixels vertically, and a high-resolution image formed of 640 pixels horizontally and 480 pixels vertically. The image data with low image quality formed solely of the low-resolution image data to be the base image is relayed in passing through a narrow-band path. The image data with medium image quality formed of the low-resolution image data to be the base image and the medium-resolution image data is relayed when the band is relatively wide. The image data with high image quality formed of the low-resolution image data to be the base image quality, the medium image-resolution image data, and the high-resolution image data is relayed when the band is very wide.

<Each Functional Unit of Relay Device>

Now, each functional structure of the relay device 30 will be described in detail. Note that a relationship between each unit of the relay device 30 and a main component, among the components illustrated in FIG. 3, which implements each unit will be described along with the description of each unit of the relay device 30.

The transmission/reception unit 31 of the relay device 30 illustrated in FIG. 4 is implemented by the network I/F 209 illustrated in FIG. 3 and transmits/receives various data (or information) to/from another terminal, device, or system via the communication network 2. The state detection unit 32 is implemented by a command from the CPU 201 illustrated in FIG. 3 and detects an operating status of the relay device 30 including the state detection unit 32. The operating status can be "ON line", "OFF line", or "out of order".

The data quality confirmation unit 33 is implemented by a command from the CPU 201 illustrated in FIG. 3, searches the quality modification management table by using the IP address of the destination terminal as a search key, extracts the image quality of the corresponding image data to be relayed, and confirms the image quality of the image data to be relayed. The quality modification management unit 34 is implemented by a command from the CPU 201 illustrated in FIG. 3 and modifies the content of the quality modification management table in the quality modification management DB 3001 on the basis of quality information (to be described) transmitted from the management system 50.

The data quality modification unit 35 is implemented by a command from the CPU 201 illustrated in FIG. 3 and modifies the image quality of the image data transmitted from the terminal 10 on the basis of the modified content of the quality modification management table in the quality modification management DB 3001. The store/read process unit 39 is implemented by the HDD 205 illustrated in FIG. 3 and performs a process to store various data in the nonvolatile memory unit 3000 and read the various data stored in the nonvolatile memory unit 3000.

<Functional Structure of Management System>

A function or means of the management system 50 will now be described. The management system 50 includes a transmission/reception unit 51, a terminal authentication unit 52, a state management unit 53, a terminal extraction unit 54, a terminal state acquisition unit 55, a relay device selection unit 56, a session management unit 57, a quality determination unit 58, a store/read process unit 59, a delay time management unit 60, a modification requesting information determination unit 61, a destination determination unit 62, and a participation determination unit 63. Each of these units is a function or means implemented when any of the components illustrated in FIG. 3 is operated by a command from the CPU 201 according to the program stored in the ROM 202. The management system 50 further includes a nonvolatile memory unit 5000 which is constructed by the HD 204 illustrated in FIG. 3 and in which various data and information are kept stored even when the power source of the management system 50 is turned off. The nonvolatile memory unit 5000 stores various information. Furthermore, the management system 50 includes a volatile memory unit 5100 constructed by the RAM 203 illustrated in FIG. 3.

(Relay Device Management Table)

The nonvolatile memory unit 5000 includes a relay device management DB 5001 including a relay device management table as illustrated in FIG. 5. Note that FIG. 5 is a conceptual diagram illustrating the relay device management table. For each relay device ID identifying each relay device 30, the relay device management table includes an operating status of each relay device 30, a date and time when the management system 50 receives the state information indicating the operating status, an IP address of the relay device 30, and a maximum data transmission rate (Mbps) of the relay device 30 that are all managed in association with one another in the table. For example, the relay device management table illustrated in FIG. 5 indicates that, for the relay device 30a with the relay device ID of "111a", the operating status is "ON line", the management system 50 has received the state information in "November 10, 2009 at 13:00", the IP address of the relay device 30a is "1.2.1.2", and the maximum data transmission rate of the relay device 30a is 100 Mbps.

(Terminal Authentication Management Table)

The nonvolatile memory unit 5000 further includes a terminal authentication management DB 5002 including a terminal authentication management table as illustrated in FIG. 6. FIG. 6 is a conceptual diagram illustrating the terminal authentication management table. The terminal authentication management table manages each terminal ID and each password in association therewith for all the terminals 10 managed by the management system 50. Here, the terminal ID is the information identifying the terminal 10, while the password is the information used to authenticate the terminal 10. For example, the terminal authentication management table illustrated in FIG. 6 indicates that the terminal 10*aa* has a terminal ID "10*aa*" and a password "aaaa".

The terminal ID and the relay device ID in the present embodiment represent identification information such as a language, a letter, a symbol, or various signs used to uniquely identify the terminal 10 and the relay device 30, respectively. The terminal ID and the relay device ID may also represent the identification information in which at least two of the language, the letter, the symbol and the various signs are combined.

(Terminal Management Table)

The nonvolatile memory unit 5000 further includes a terminal management DB 5003 including a terminal management table as illustrated in FIG. 7. FIG. 7 is a conceptual diagram illustrating the terminal management table. For each terminal ID of each terminal 10, the terminal management table includes a terminal name, the operating status of each terminal 10, a communication state established with another terminal, participation authentication information (a PIN code), a date and time when the management system 50 receives login requesting information to be described, and the IP address of the terminal 10 that are all managed in association with one another.

Here, the operating status includes: an ON line status with the power source turned on where the terminal is available for communication or currently in communication; and an OFF line status where the terminal is not available for communication because the power source is not turned on, for example.

The communication state includes: "Calling" indicating a state that the own terminal is calling the other terminal 10, namely transmitting the initiation requesting information for the session used in the teleconference to the other terminal 10 and Waiting for a response; "Ringing" indicating a state that the other terminal 10 is calling the own terminal, namely, the own terminal is receiving the initiation requesting information from the other terminal 10 and not having responded to the initiation requesting information received; "Accepted" indicating a state that the own terminal has responded approval for the initiation requesting information transmitted from the other terminal 10 but the session has not been established, or that the own terminal has received the response of approval for the initiation requesting information the own terminal has transmitted but the session has not been established; "Busy" indicating a state that the session has been established with the other terminal 10 and that the content data used in the TV conference is being transmitted; and "None" indicating a state that the own terminal is not communicating with the other terminal and is on standby.

Note that the aforementioned communication state corresponds to the session which is established in response to the initiation requesting information including the restriction information indicating no participation restriction and which, therefore, has no restriction on participation. The management system 50 according to the present embodiment manages the communication state corresponding to the session with participation restriction as the communication state different from the communication state corresponding to the session with no restriction on participation, the session with participation restriction being established in accordance with the initiation requesting information including the restriction information indicating participation restriction. That is, the communication state of the session with participation restriction includes "Private Calling", "Private Ringing", "Private Accepted", and "Private Busy" corresponding to the "Calling", the "Ringing", the "Accepted", and the "Busy", respectively, which are provided in the session with no restriction on participation. As a result, in the management system 50 according to the present embodiment, one can specify by the communication state whether there is participation restriction because the communication state is distinguishably managed in accordance with the presence of participation restriction.

The participation authentication information is the information that authenticates participation to the session with the participation restriction, and is thus registered for the terminal with the communication state including the "Private Calling", the "Private Ringing", the "Private Accepted", and the "Private Busy" indicating that the session involved has participation restriction. In the present embodiment, a PIN code which is a combination of an alphabet, a number, a symbol, and a number is used as the participation authentication information. The participation authentication information is not limited to what is described herein, however.

For example, the terminal management table illustrated in FIG. 7 indicates that, for the terminal 10*ad* with the terminal ID "10*ad*": the terminal name is "Japan, Tokyo branch, AD terminal"; the operating status is "ON line (in call)"; the communication state is "Private Busy" indicating that the content data is being transmitted in the session with participation restriction; the participation authentication information is "1234"; the management system 50 has received the login requesting information in "November 10, 2009 at 13:30"; and the IP address of the terminal 10*ad* is "1.2.1.6".

(Destination List Management Table)

The nonvolatile memory unit 5000 further includes a destination list management DB 5004 including a destination list management table as illustrated in FIG. 8. FIG. 8 is a conceptual diagram illustrating the destination list management table. The destination list management table manages the terminal ID of the initiation requesting terminal in association with the terminal ID identifying the destination terminal candidate that is the terminal 10 to be the destination candidate for the content data transmitted from the initiation requesting terminal which is the terminal 10 transmitting the initiation requesting information for the session used in the teleconference including a call managed by the management system 50. For example, the destination list management table illustrated in FIG. 8 indicates that the terminal (terminal 10*aa*) with the terminal ID "10*aa*" can make a request to initiate the teleconference to the destination terminal candidate including the terminal 10*ab* with the terminal. ID "10*ab*", the terminal 10*ac* with the terminal ID "10*ac*", the terminal 10*ad* with the terminal ID "10*ad*", and the terminal 10*ae* with the terminal ID "10*ae*". The destination terminal candidate is updated when a terminal is added or deleted according to an addition/deletion request made to the management system 50 by the initiation requesting terminal.

(Session Management Table)

The nonvolatile memory unit 5000 further includes a session management DB 5005 including a session management table as illustrated in FIG. 9. FIG. 9 is a conceptual diagram illustrating the session management table. For every session ID identifying the session in which the content data is transmitted between the terminals, the session management table manages, in association with one another, the relay device ID of the relay device 30 used to relay the content data in the session, the terminal ID of the initiation requesting terminal which transmits the initiation requesting information for the session, the terminal ID of the destination terminal specified as the other party in the initiation requesting information for the session, the delay time (ms) generated when the image data is received by the destination terminal, and a date and time when the management system 50 receives delay information indicating the delay time transmitted from the destination terminal. For example, the session management table illustrated in FIG. 9 indicates that the relay device 30e (with the relay device ID "111e") selected in the session executed by using the session ID "se1" relays the content data between the initiation requesting terminal (the terminal 10aa) with the terminal ID "10aa" and the destination terminal (the terminal 10db) with the terminal ID "10db", and that the delay time generated when the destination terminal (the terminal 10db) has received the image data as of "November 10, 2009 at 14:00" is 200 (ms). Note that the reception date and time of the delay information may be managed on the basis of the delay information transmitted from not the destination terminal but the initiation requesting terminal when the teleconference is held between two of the terminals 10. When the teleconference is held among three or more of the terminals 10, however, the reception date and time of the delay information is managed on the basis of the delay information transmitted from the terminal 10 which receives the content data.

(Quality Management Table)

The nonvolatile memory unit 5000 further includes a quality management DB 5007 including a quality management table. The quality management table manages the image quality of the image data (quality of the image) relayed by the relay device 30 in association with the delay time (ms) generated in transmitting/receiving the image data with respect to the initiation requesting terminal or the destination terminal.

(Relay Device Selection Management Table)

The nonvolatile memory unit 5000 further includes a relay device selection management DB 5008 including a relay device selection management table. The relay device selection management table manages the relay device ID of the relay device 30 used in relaying the content data in association with each terminal ID of all the terminals 10 managed by the management system 50.

(State Modification Management Table)

The nonvolatile memory unit 5000 further includes a state modification management DB 5009 including a state modification management table as illustrated in FIGS. 10 and 11. Each of FIGS. 10 and 11 is a conceptual diagram illustrating the state modification management table. The state modification management table illustrated in FIG. 10 includes modification requesting information indicating a request to modify the communication state between the terminals, pre-modification state information indicating the communication state before it is modified by the state management unit 53 to be described, and modified information indicating the communication state that has been modified by the state management unit 53, where the modification requesting information, the pre-modification state information, and the modified information are managed in association with one another. Moreover, the state modification management table illustrated in FIG. 11 includes the modification requesting information, terminal information identifying the initiation requesting terminal and the destination terminal, the pre-modification state information, and the modified information that are all managed in association with one another.

The state modification management table illustrated in FIG. 11 indicates that the management system 50, having received the modification requesting information "Invite", modifies the communication state of the initiation requesting terminal from "None" before modification to "Calling" and at the same time modifies the communication state of the destination terminal from "None" before modification to "Ringing". The modification requesting information includes "Invite", "Private Invite", and "Accept" illustrated in FIG. 11 as well as "Join", "Call", and "Leave" illustrated in FIG. 10.

The "Invite" is the information included in the initiation requesting information and is the modification requesting information transmitted along with the initiation requesting information. The "Accept" is the modification requesting information received along with a response to the initiation requesting information and indicates approval for initiating a communication, namely, establishing a session. The "Join" is the modification requesting information accompanying the establishment of the session corresponding to the initiation requesting information and indicates a request to start relaying the content data. The "Call" is the modification requesting information included in the participation request and transmitted along with the participation request, and indicates a request for participation in the established session. The "Leave" is the modification requesting information indicating a request to complete the session.

(Each Functional Unit of Management System)

Now, each functional unit of the management system 50 will be described in detail. Note that the relationship between each unit of the management system 50 and a main component, among the components illustrated in FIG. 3, which implements each unit will be described at the same, time each unit of the management system 50 will be described below.

The transmission/reception unit 51 is implemented by the network I/F 209 illustrated in FIG. 3 and transmits/receives various data (or information) to/from another terminal, device, or system via the communication network 2. The terminal authentication unit 52 searches the terminal authentication management table (refer to FIG. 6) in the nonvolatile memory unit 5000 by using, as a search key, the terminal ID and the password included in the login requesting information received via the transmission/reception unit 51, and performs terminal authentication by determining whether the same terminal ID and password are managed in the terminal authentication management table.

The state management unit 53 manages the operating status and the communication state in the terminal management table illustrated in FIG. 7. In order to manage the operating status of the terminal 10 (the login requesting terminal) which has made the login request, the state management unit 53 stores and manages the terminal ID of the login requesting terminal, the operating status of the login requesting terminal, the participation authentication information (when there is participation restriction), the date and time when the management system 50 receives the login requesting information, and the IP address of the login requesting terminal all in the terminal management table (refer to FIG. 7) in association with one another. When the user of the terminal 10 has turned on the power switch 109 of the terminal 10 from the off state, the state management unit 53 sets the operating status in the terminal management table (refer to FIG. 7) from OFF line to ON line on the basis of the information which is transmitted from the terminal 10 and indicates that the power source is turned on. When the user has turned off the power switch 109 of the terminal 10 from the on state, on the other hand, the state management unit sets the operating status in the terminal management table (refer to FIG. 7) from ON line to OFF line on the basis of the information which is transmitted from the terminal 10 and indicates that the power source is turned off.

Once the transmission/reception unit 51 has received the modification requesting information transmitted from the initiation requesting terminal or the destination terminal relevant to the initiation requesting information for the teleconference, the state management unit 53 appropriately modifies at least one of the communication state and the operating status of at least one of the initiation requesting terminal and the destination terminal in the terminal management table (refer to FIG. 7) on the basis of the modification requesting information.

Figure 12:
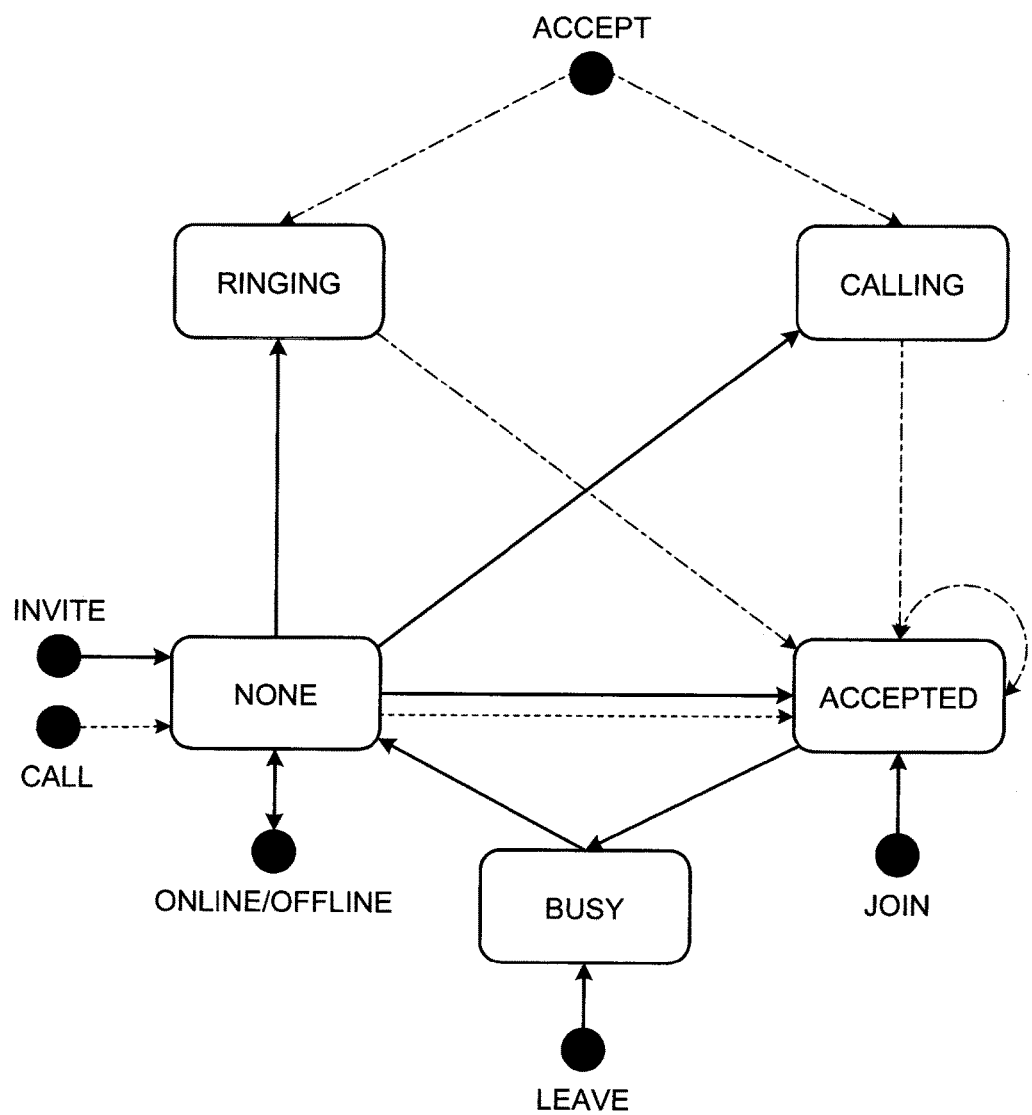
FIG. 12 is a state transition diagram of a communication state.
Figure 13:
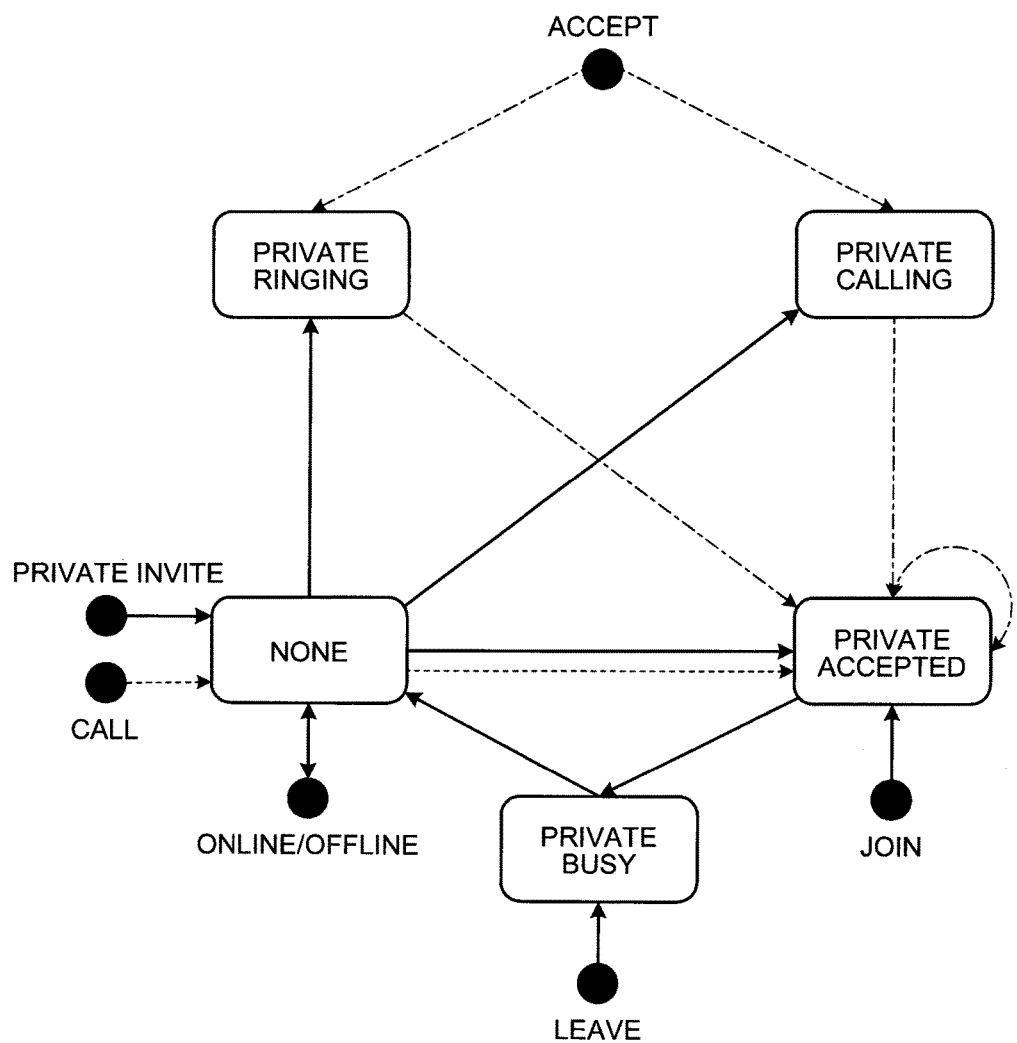
FIG. 13 is a state transition diagram of a communication state.

Each of FIGS. 12 and 13 is a state transition diagram of the communication state managed by the state management unit 53. The state management unit 53 modifies the communication state of the terminal 10 according to a rule of modifying the communication state (refer to FIGS. 12 and 13) that is implemented by referring to the state modification management table illustrated in FIGS. 10 and 11.

As illustrated in FIG. 12, for example, the state management unit 53 modifies the communication state to "Accepted" when the communication state of the terminal 10 is "Ringing" or "Calling", or leave's the communication state as "Accepted" when the communication state of the terminal 10 is "Accepted" in a case where the modification requesting information "Accept" is received.

As illustrated in FIG. 13, for example, the state management unit 53 modifies the communication state to "Private Accepted" when the communication state of the terminal 10 is "Private Ringing" or "Private Calling", or leaves the communication state as "Private Accepted" when the communication state of the terminal 10 is "Private Accepted" in a case where the modification requesting information "Accept" is received.

The state modification management tables (refer to FIGS. 10 and 11) are used to implement state modification by the state management unit 53 in the present embodiment, which is described as an example and not limited thereto. In this case, it may be specified by the program for management system such that the state management unit 53 can modify the communication state according to the rule of transition of the communication state illustrated in the state transition diagram illustrated in each of FIGS. 12 and 13.

The terminal extraction unit 54 searches the destination list management table (refer to FIG. 8) by using, as a search key, the terminal ID of a target terminal to be involved in a process such as the terminal 10 which has made a login request, and extracts the terminal ID by reading the terminal ID of the destination terminal candidate that can have a call, namely, establish a session, with the target terminal. Specifically, the terminal extraction unit 54 reads the terminal ID of the destination terminal candidate corresponding to the terminal ID of the initiation requesting terminal that matches the terminal ID of the target terminal in the destination list management table (refer to FIG. 8).

Furthermore, the terminal extraction unit 54 searches the destination list management table by using the terminal ID of the target terminal as a key and extracts the terminal ID of another terminal 10 which registers the terminal ID of the target terminal as the destination terminal candidate. Specifically, the terminal extraction unit 54 reads the terminal ID of the initiation requesting terminal corresponding to the terminal ID of the destination terminal candidate that matches the terminal ID of the target terminal in the destination list management table (refer to FIG. 8).

The terminal state acquisition unit 55 searches the terminal management table (refer to FIG. 7) by using the terminal ID as a search key and reads the operating status and the communication state for each terminal ID. The terminal state acquisition unit 55 can accordingly acquire the operating status of the candidate for the destination terminal which can have a call with the terminal which has made the login request. The terminal state acquisition unit 55 further searches the terminal management table and acquires the operating status of the terminal which has made the login request.

The relay device selection unit 56 performs a process to select one of the plurality of relay devices 30. Specifically, the relay device selection unit 56 generates the session ID identifying the session in which the content data is transmitted between the terminals. The relay device selection unit 56 further searches the relay device selection table in the relay device selection management DB 5008 on the basis of the terminal ID of the initiation requesting terminal and the terminal ID of the destination terminal included in the initiation requesting information transmitted from the initiation requesting terminal, and then extracts each corresponding relay device ID. Moreover, the relay device selection unit 56 selects the relay device 30 by selecting the relay device ID of the relay device 30 that is in the "ON line" operating status among the relay devices 30 managed in the relay device management table (refer to FIG. 5).

The session management unit 57 stores and manages the session ID generated by the relay device selection unit 56, the terminal ID of the terminal making the request, and the terminal ID of the destination terminal in association with one another into the session management table (refer to FIG. 9) of the nonvolatile memory unit 5000. The session management unit 57 further stores and manages the relay device ID of the one relay device 30 selected in the end into the session management table for each session ID.

Furthermore, the session management unit 57 searches the session management table (refer to FIG. 9) by using, as a search key, the terminal ID of the terminal already participating in the target session to which the participation is requested, and then extracts the session ID of the session to be the target to which the participation request is transmitted, the terminal ID being included in the participation requesting information. Specifically, the session management unit searches the terminal ID of the initiation requesting terminal or the terminal ID of the destination terminal that matches the terminal ID of the participant terminal in the session management table (FIG. 9), and then extracts the session ID corresponding to the matching terminal ID.

The quality determination unit 58 searches the quality management table in the quality management DB 5007 by using the delay time as a search key and determines the image quality of the image data relayed by the relay device 30 by extracting the image quality of the corresponding image data. The store/read process unit 59 is implemented by the HDD 205 illustrated in FIG. 3 and performs a process to store various data in the nonvolatile memory unit 5000 and read the various data stored in the nonvolatile memory unit 5000. The store/read process unit 59 further performs a process to store various data in the volatile memory unit 5100 and read the various data stored in the volatile memory unit 5100.

The delay time management unit 60 searches the terminal management table (refer to FIG. 7) by using the IP address of the destination terminal as a search key and extracts the corresponding terminal ID. The delay time management unit further stores and manages the delay time indicated in the delay information into a field corresponding to the delay time of a record including the extracted terminal ID in the session management table (refer to FIG. 9).

The modification requesting information determination unit 61 refers to the modification requesting information and determines whether or not the modification requesting information is specific modification requesting information. The specific modification requesting information here refers to "Invite", "Private Invite", and "Accept". In other words, the specific modification requesting information is the modification requesting information stored in the state modification management table illustrated in FIG. 11.

The destination determination unit 62 refers to the destination list management table (refer to FIG. 8) and determines whether or not the destination terminal ID of the terminal 10, which is extracted by the terminal extraction unit 54 and is participating in a content data session sed, includes the destination terminal ID of the terminal 10 making the request for participation.

When the transmission/reception unit 51 has received the participation request for the established session from a predetermined terminal, the participation determination unit 63 refers to the restriction information corresponding to the established session and determines whether or not to allow the participation requesting terminal having transmitted the participation requesting information to participate in the established session. More specifically, when the participation requesting information indicates the request for participation to the established session that is established by the initiation requesting information specifying participation restriction, the participation determination unit 63 compares the participation authentication information received from the initiation requesting terminal with the participation authentication information received from the participation requesting terminal and prohibits the participation requesting terminal from participating in the established session when the two pieces of the participation authentication information do not correspond with each other. On the other hand, the participation determination unit 63 allows the participation requesting terminal to participate in the established session when the two pieces of the participation authentication information correspond with each other. The participation determination unit 63 also allows the participation requesting terminal to participate in the established session when the participation requesting information indicates the request for participation to the established session that is established by the initiation requesting information specifying no participation restriction.

<<Process and Operation in Present Embodiment>>

Figure 14:
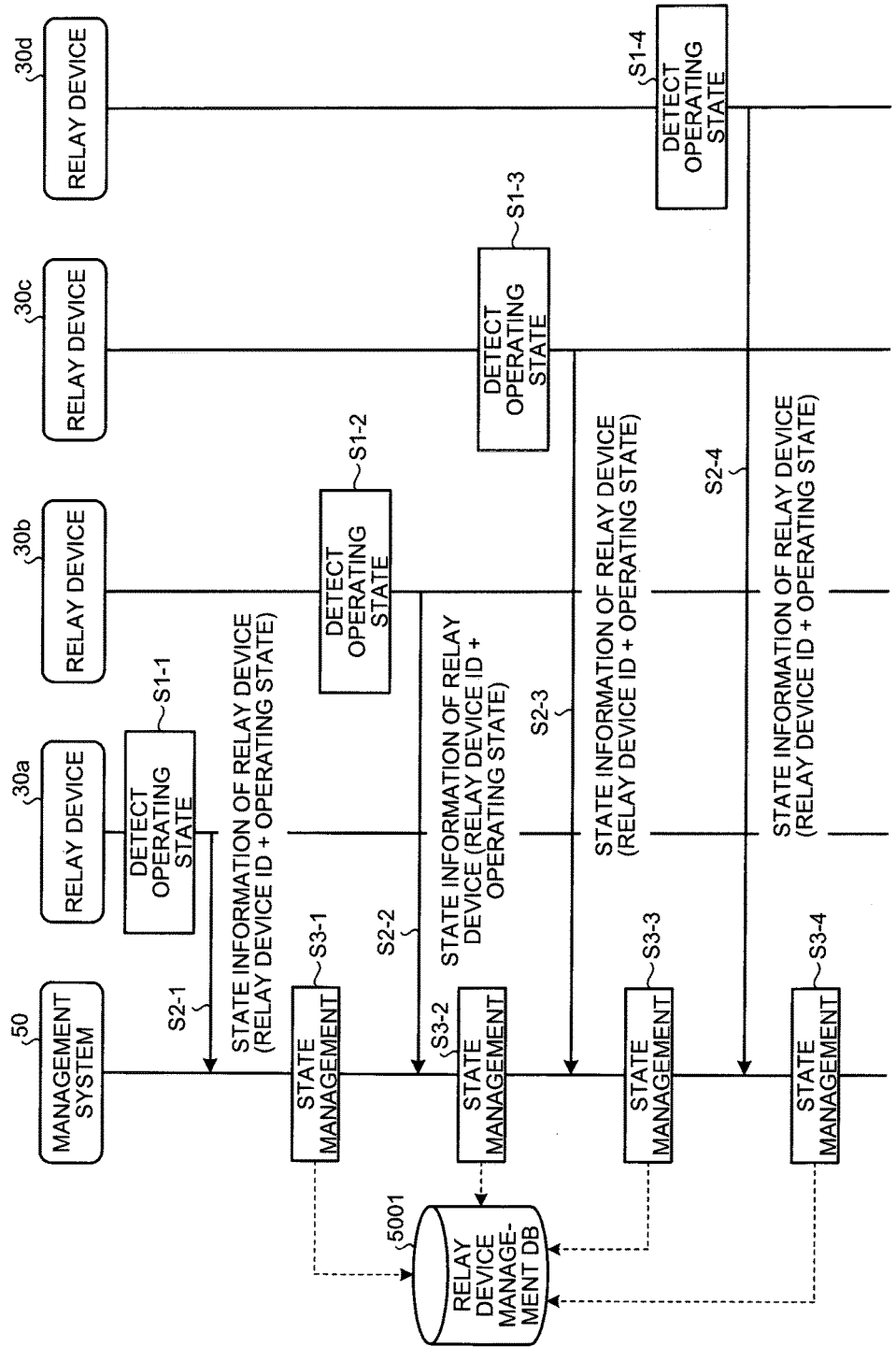
FIG. 14 is a sequence diagram illustrating a process which manages state information indicating an operating status of each relay device.
Figure 15:
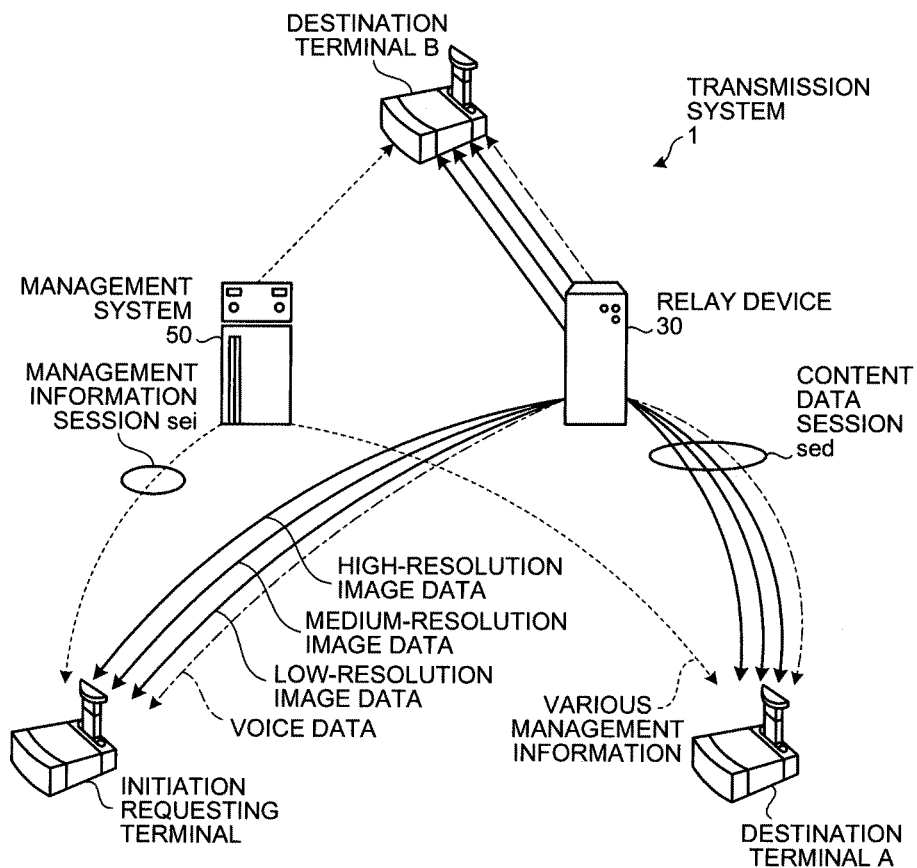
FIG. 15 is a conceptual diagram illustrating a transmission/reception state of content data and various pieces of management information in the transmission system.
Figure 16:
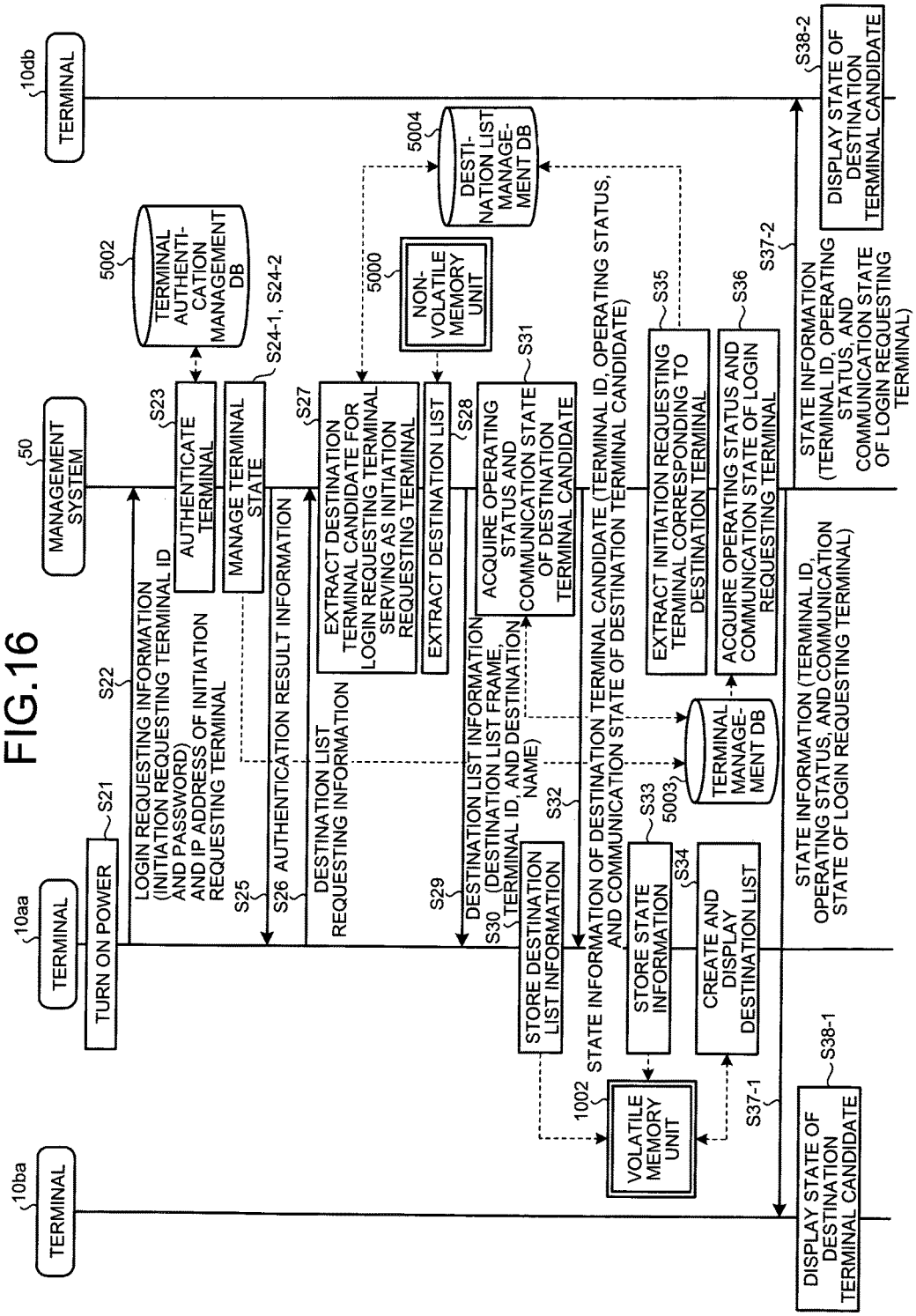
FIG. 16 is a sequence diagram illustrating a process performed in a preparatory phase before a call is initiated between transmission terminals.
Figure 18:
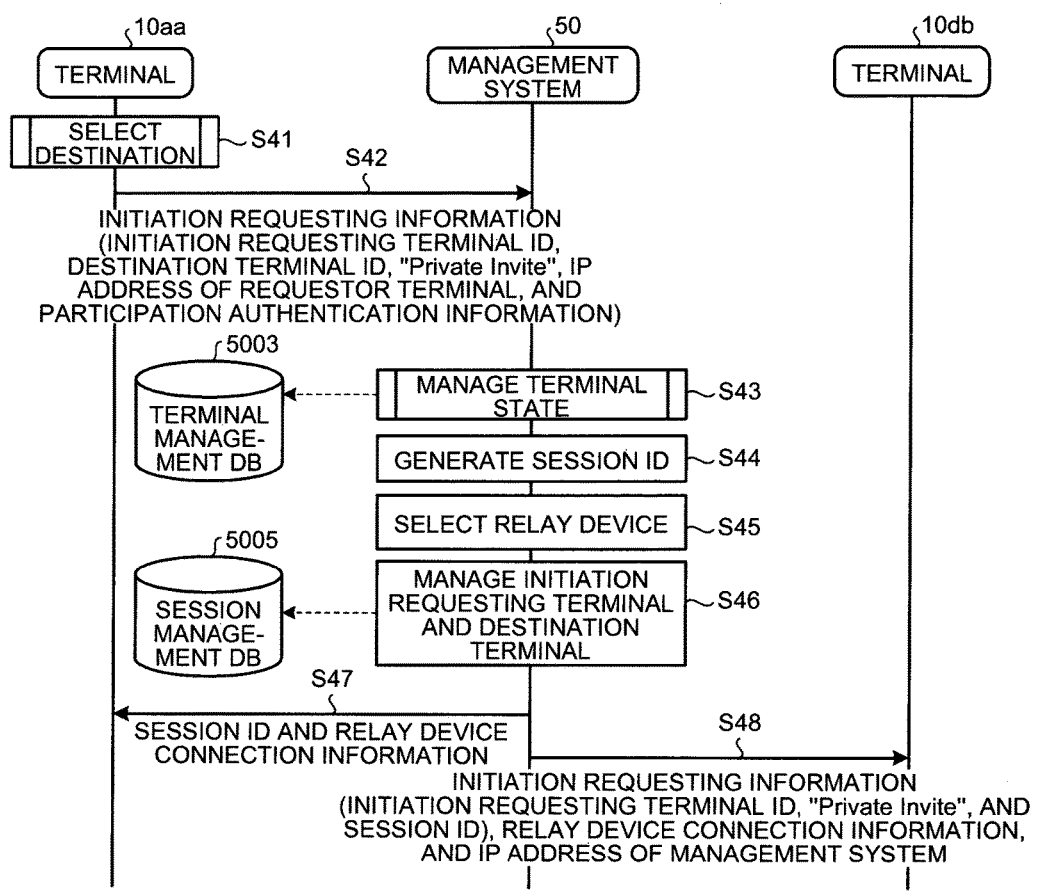
FIG. 18 is a sequence diagram illustrating a process which makes a request to initiate a communication.
Figure 19:
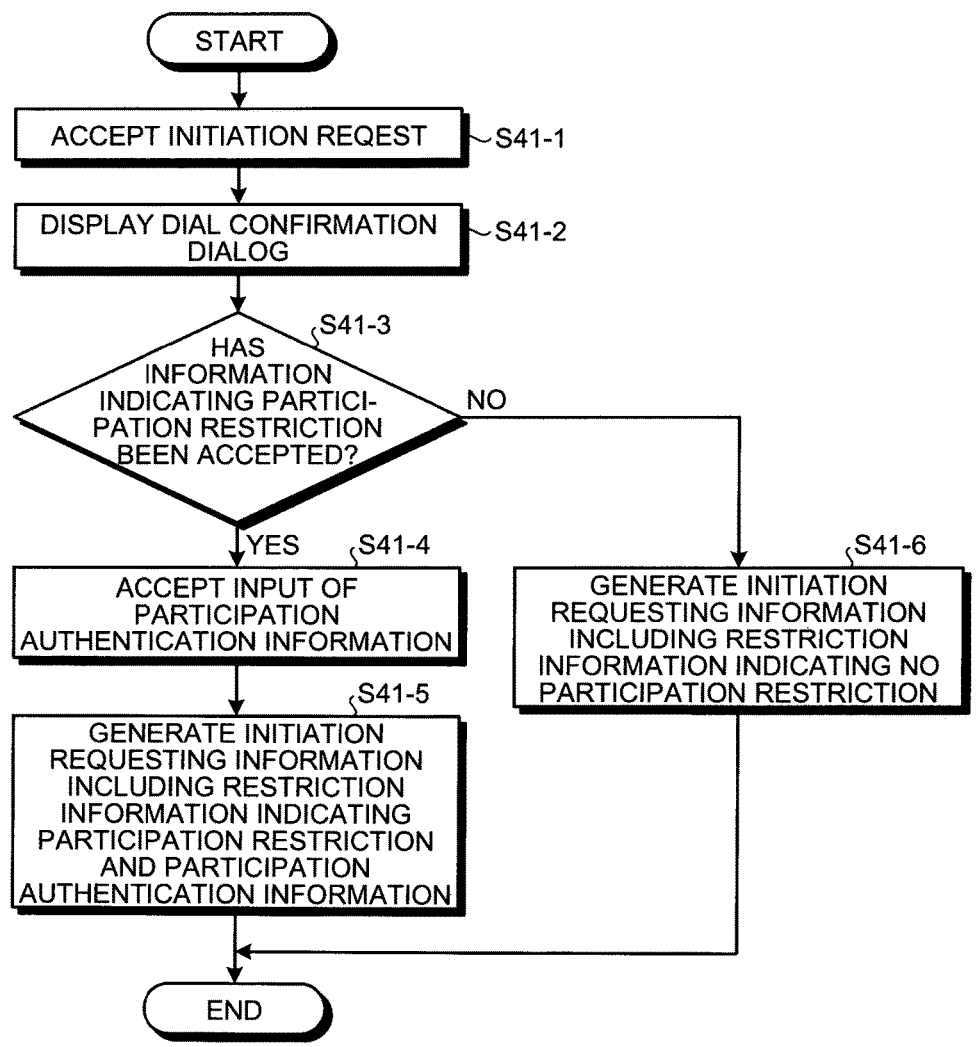
FIG. 19 is a flowchart illustrating a detailed process performed by an initiation requesting terminal in a destination selection process.
Figure 20:
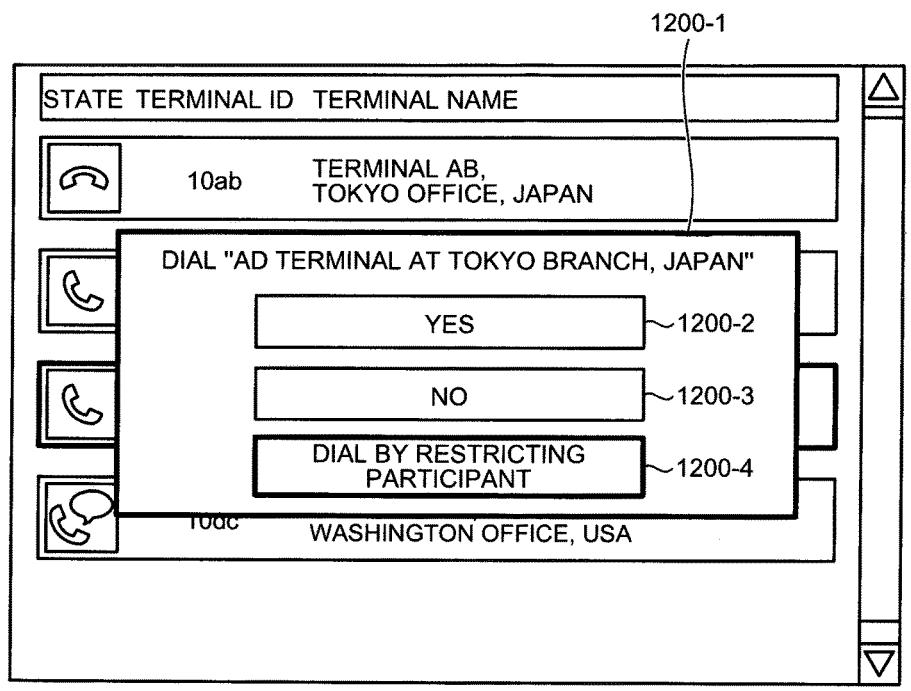
FIG. 20 is a diagram illustrating a display example of a dial confirmation dialog.
Figure 21:
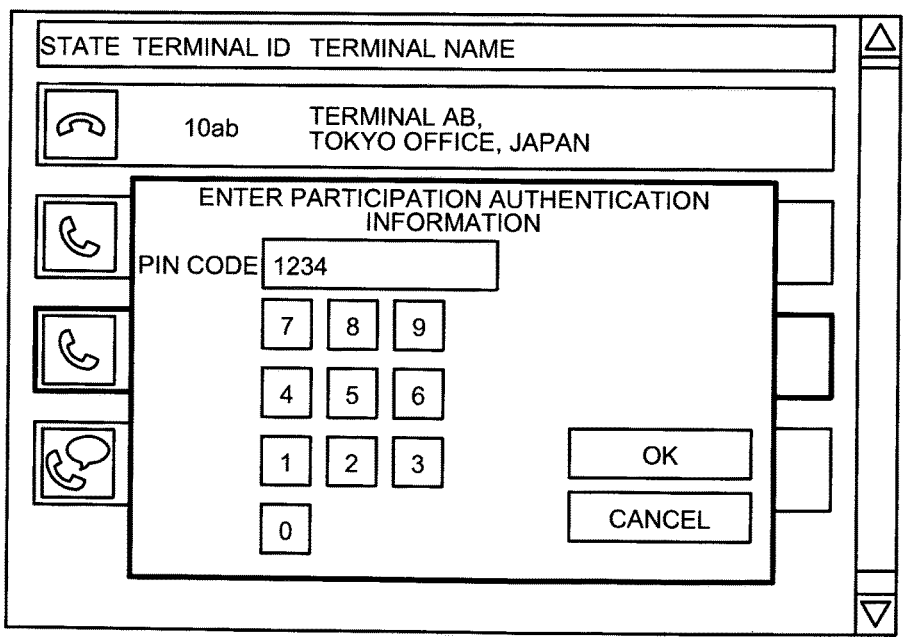
FIG. 21 is a diagram illustrating a display example of a participation authentication information entry screen.
Figure 22:
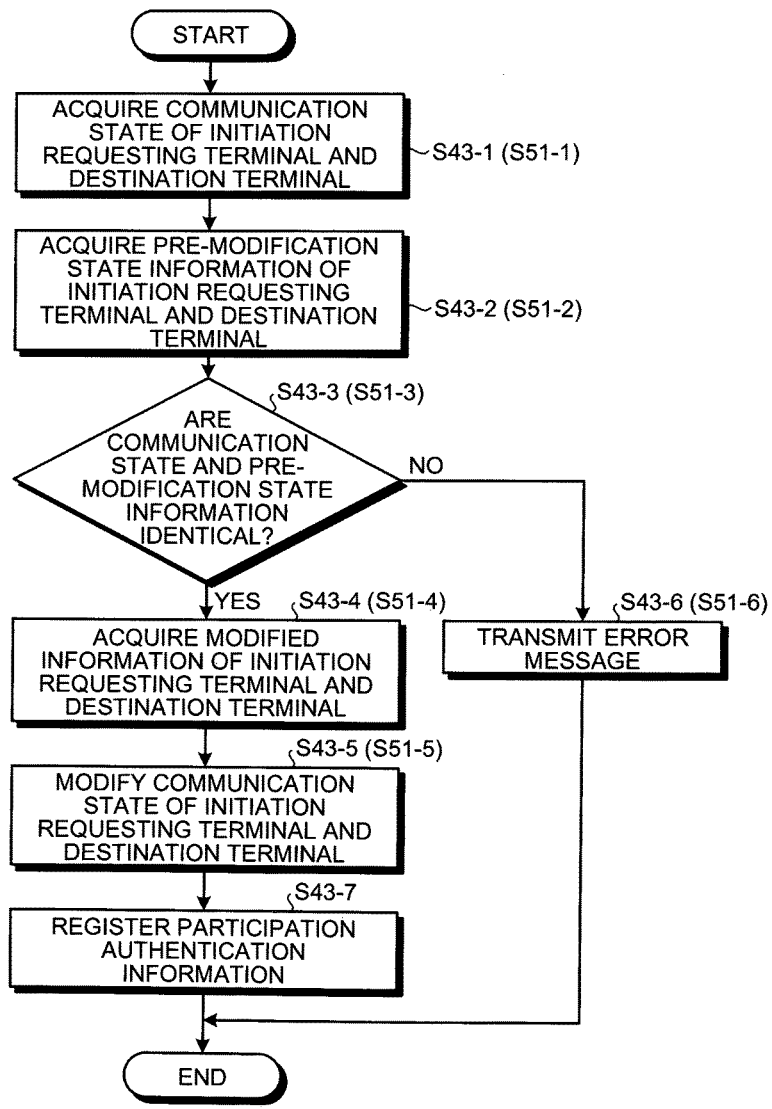
FIG. 22 is a process flowchart illustrating a process which modifies a communication state.
Figure 23:
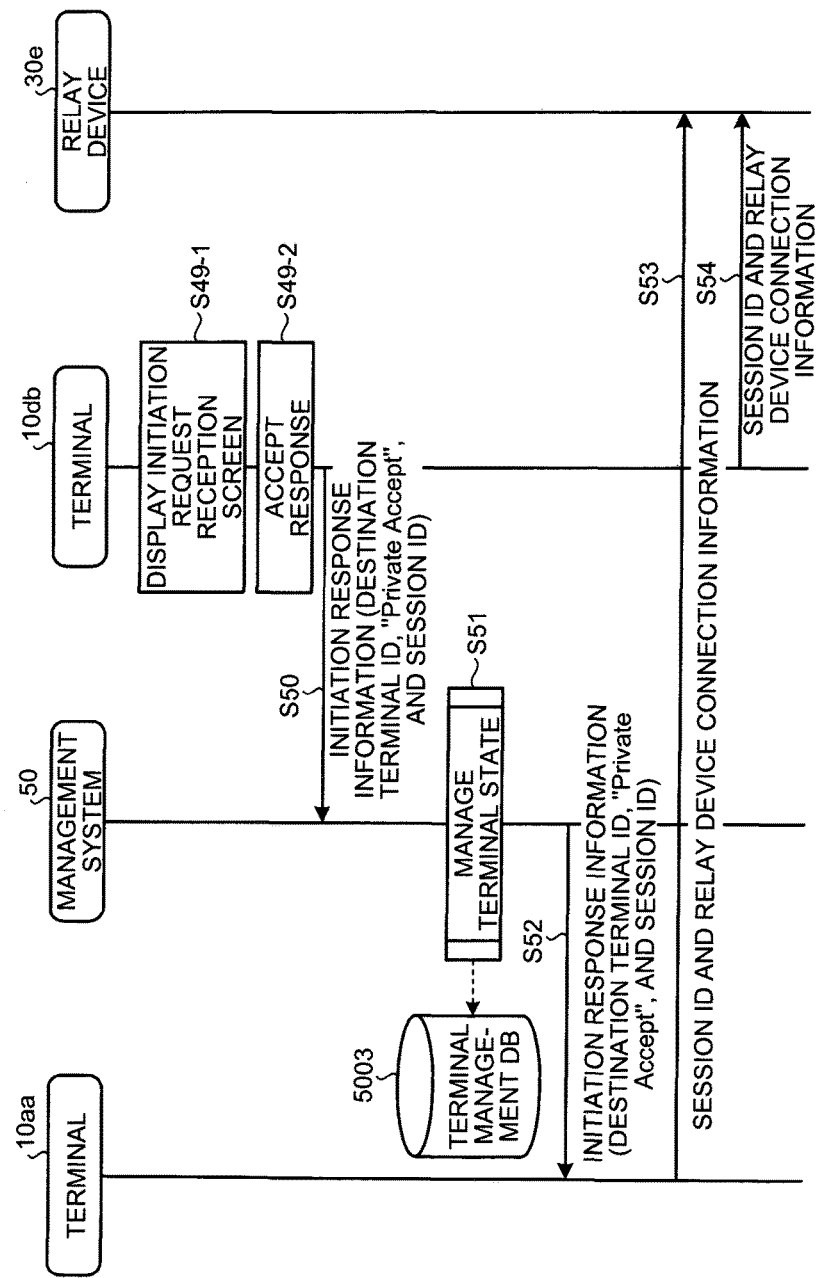
FIG. 23 is a sequence diagram illustrating a process which authorizes a request to initiate a communication.
Figure 25:
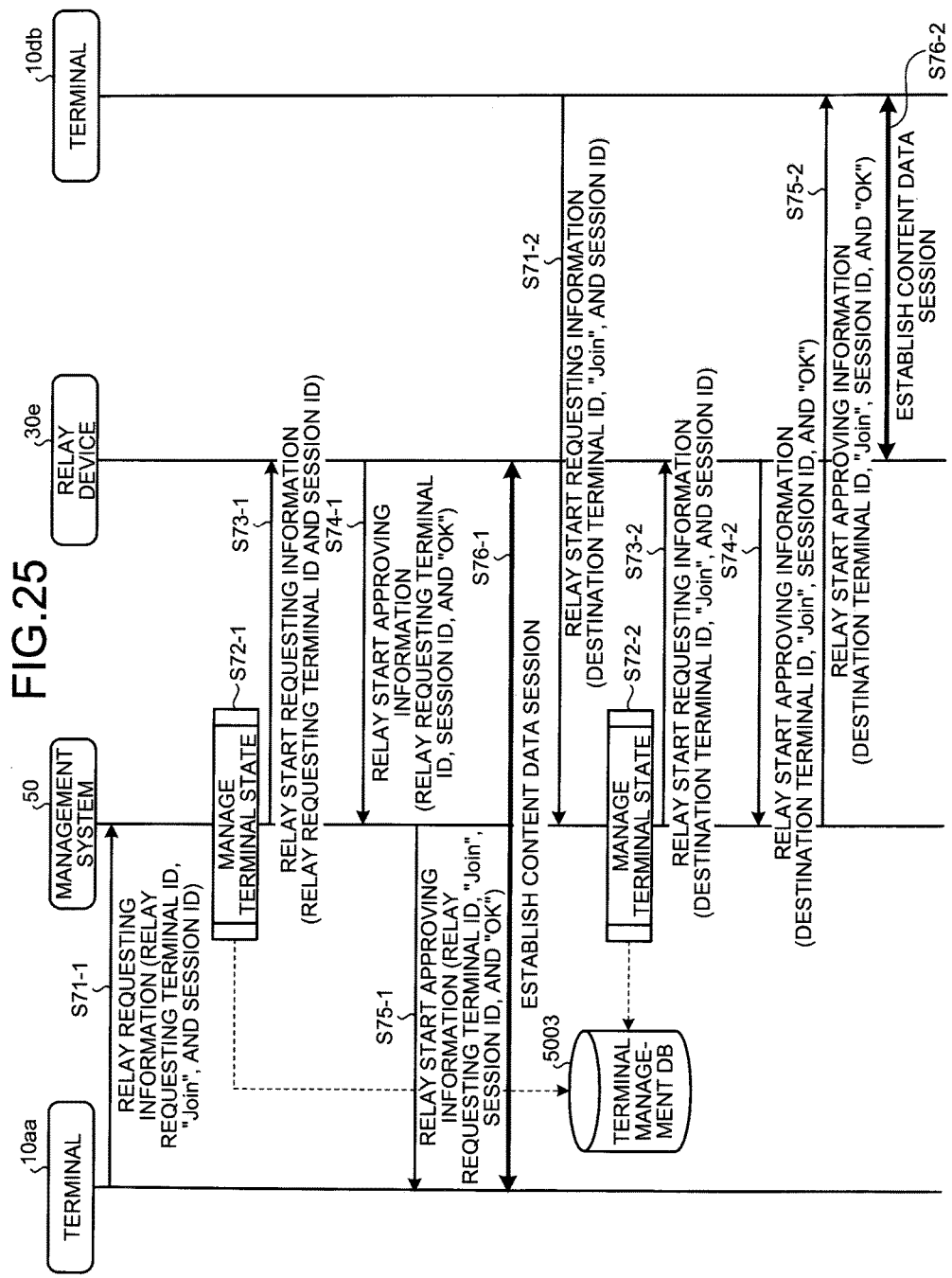
FIG. 25 is a sequence diagram illustrating a process which makes a request to relay content data.
Figure 26:
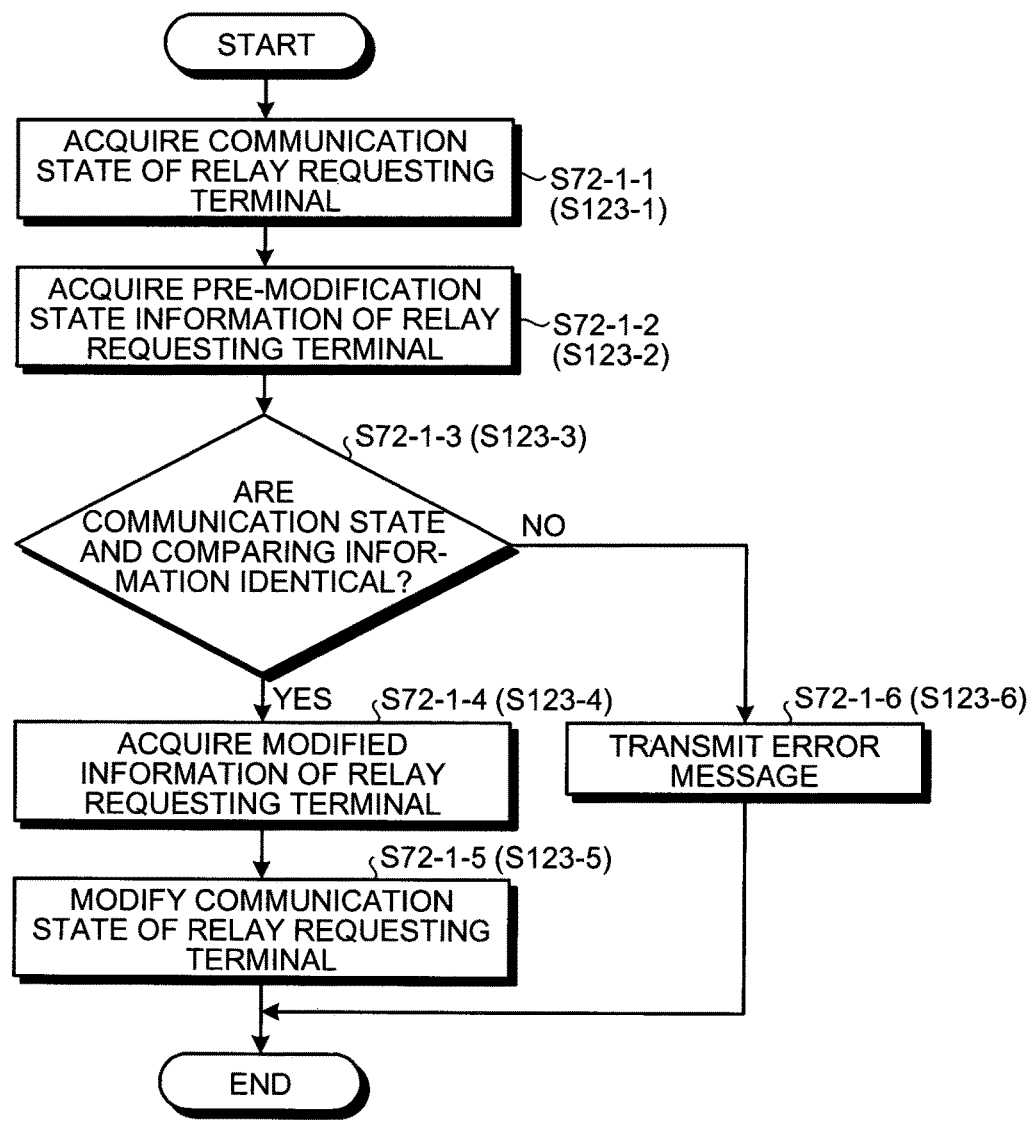
FIG. 26 is a process flowchart illustrating a process which modifies a communication state.
Figure 27:
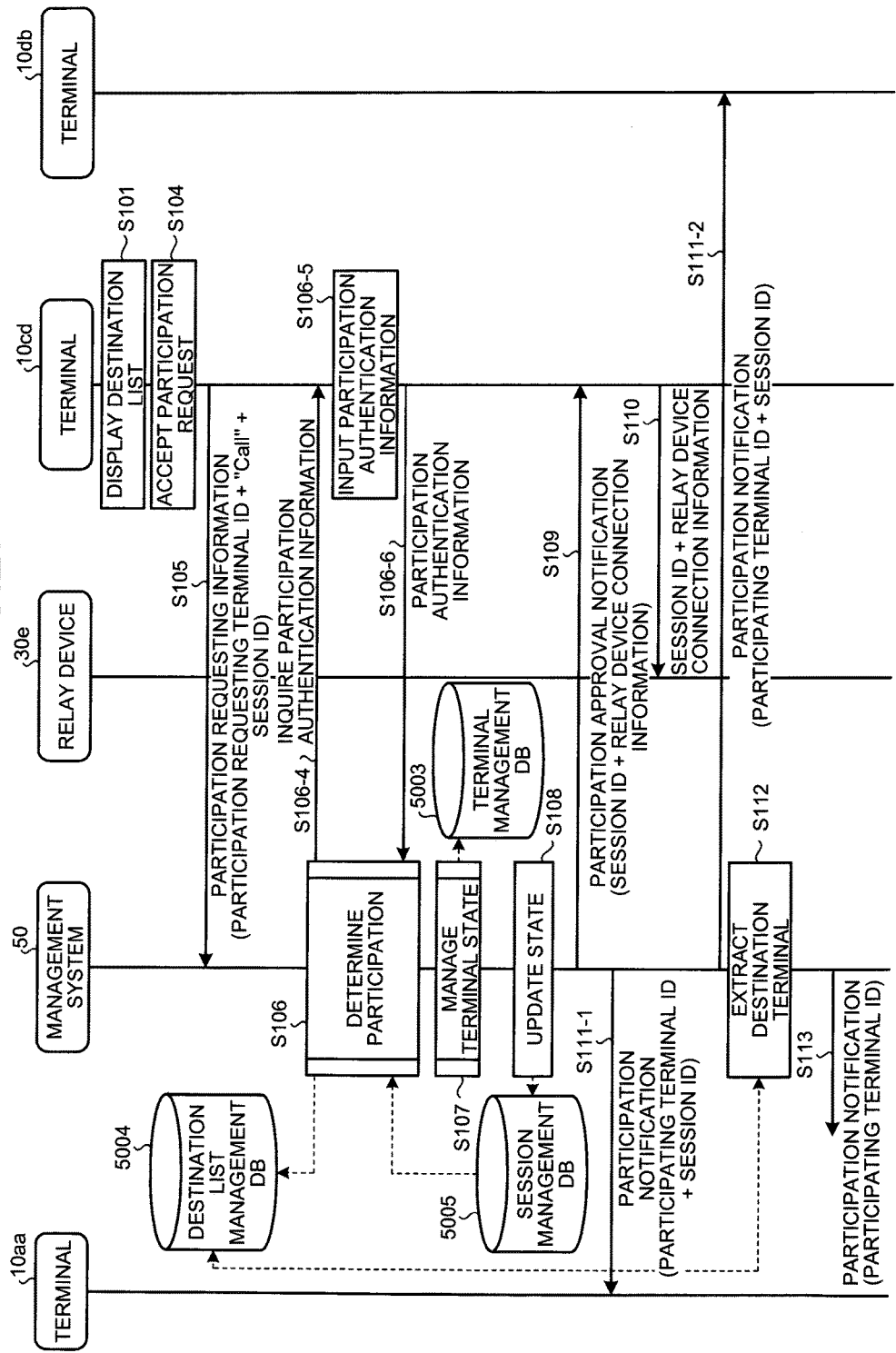
FIG. 27 is a sequence diagram illustrating a process which transmits participation requesting information for a content data session.
Figure 28:
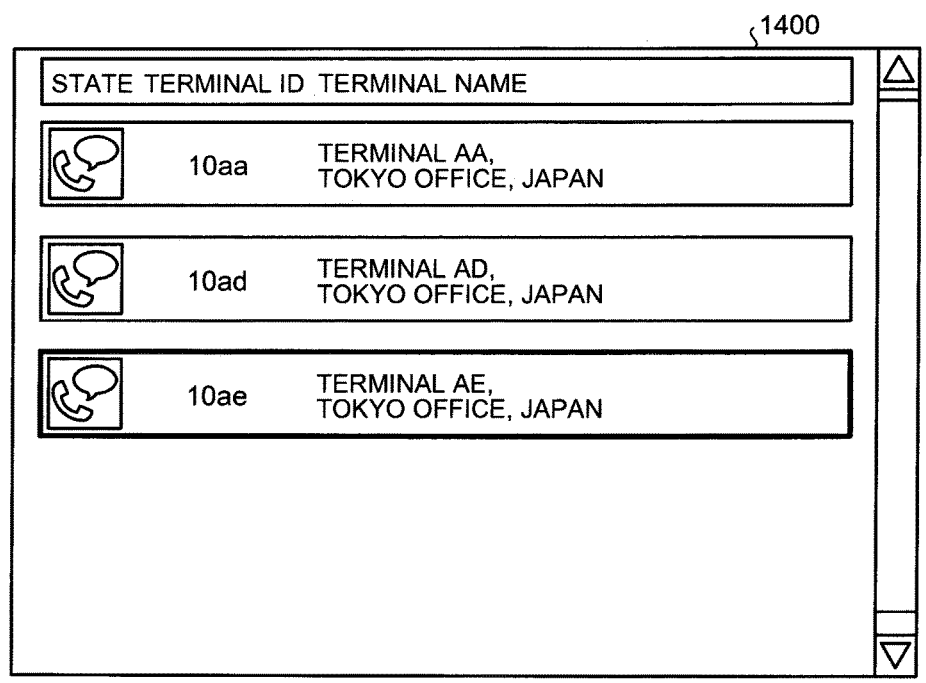
FIG. 28 is a diagram illustrating a display example of a destination list.
Figure 29:
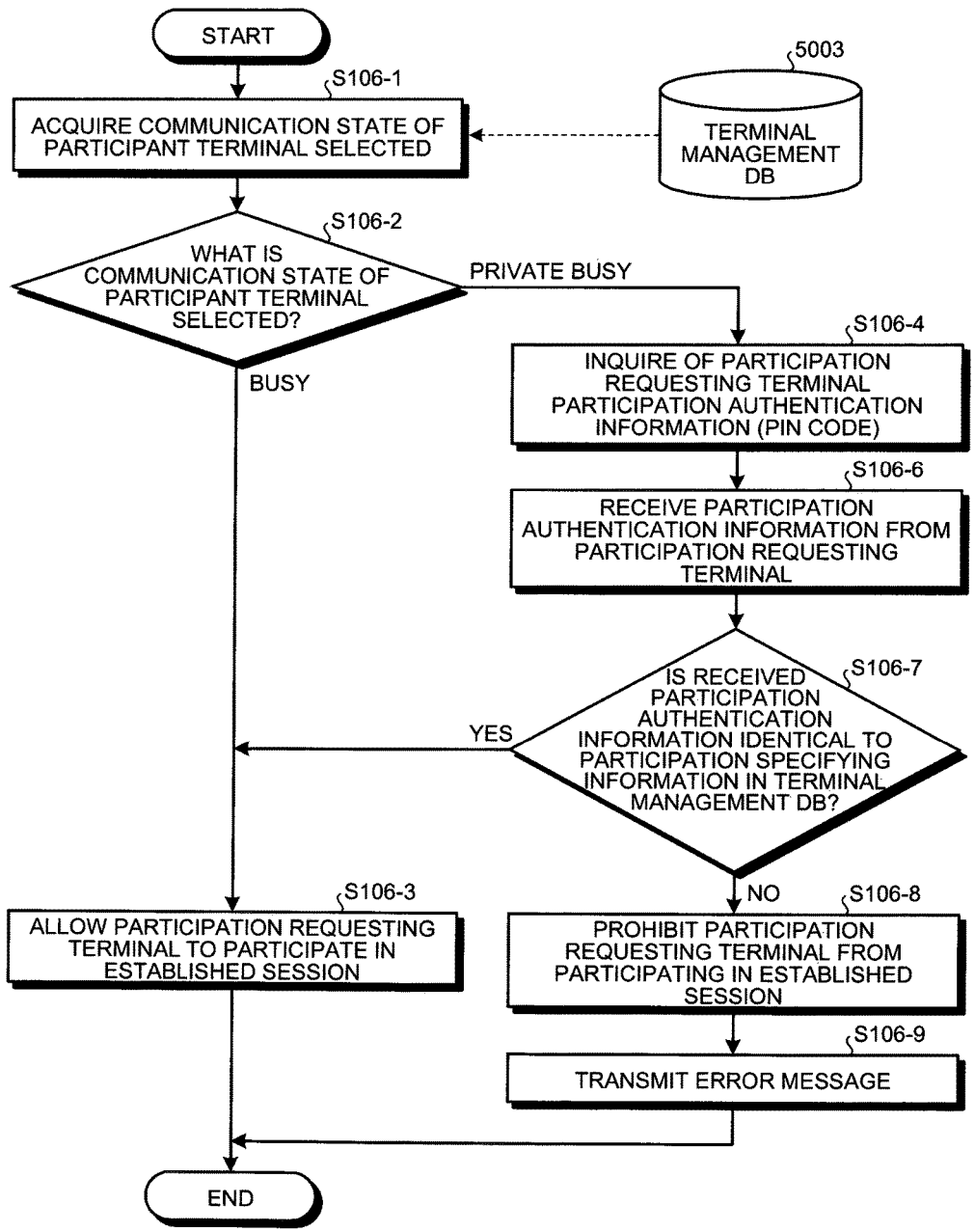
FIG. 29 is a process flowchart illustrating a process which makes determination on participation on the basis of a communication state.
Figure 30:
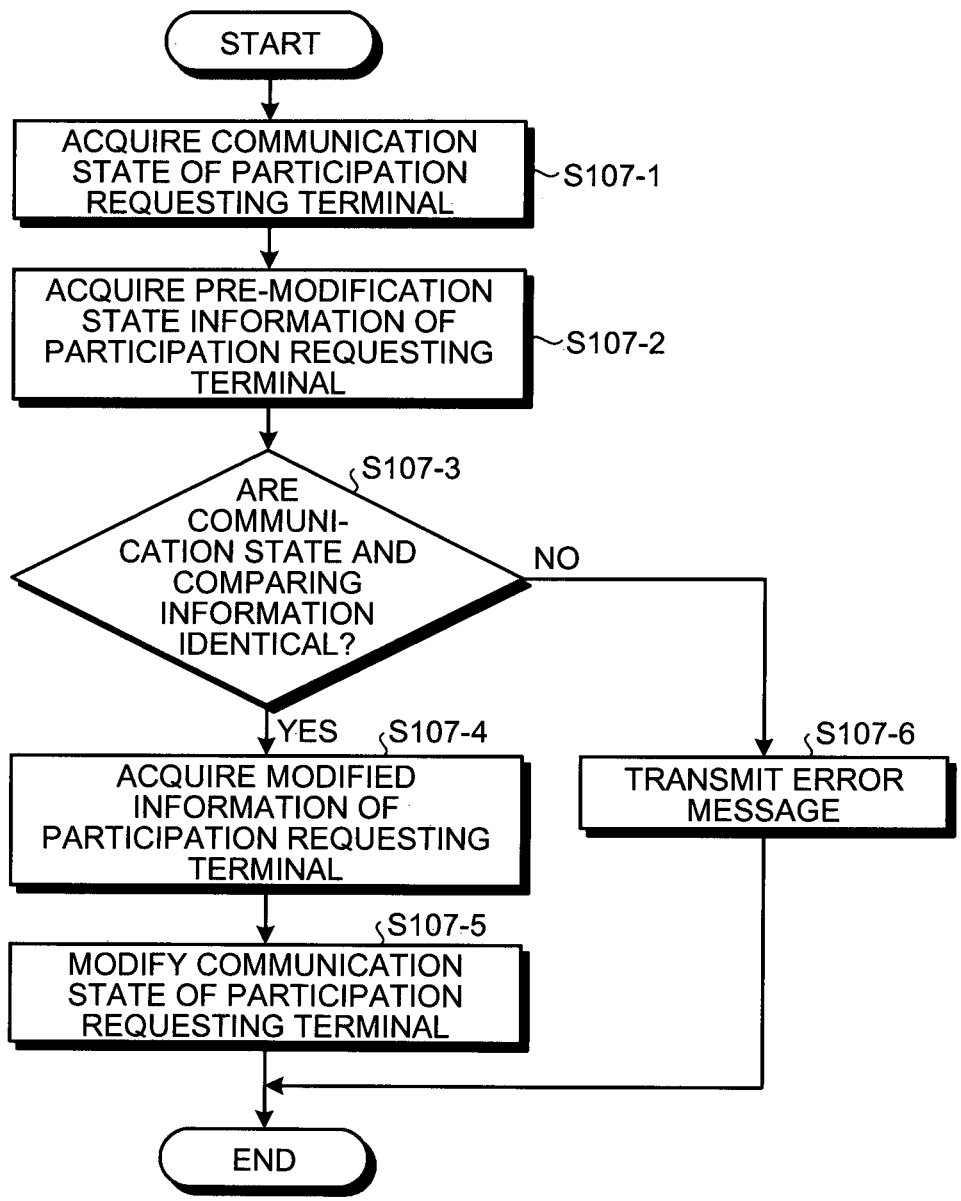
FIG. 30 is a process flowchart illustrating a process which modifies a communication state.

While the configuration and the function (or means) of the transmission system 1 according to the present embodiment have been described above, a processing method performed in the transmission system 1 according to the present embodiment will now be described with reference to FIGS. 14 to 30. FIG. 14 is a sequence diagram illustrating a process which manages the state information indicating the operating status of each relay device. FIG. 15 is a conceptual diagram illustrating a transmission/reception state of the image data, the voice data and various pieces of management information in the transmission system. FIG. 16 is a sequence diagram illustrating a process performed in a preparatory phase before a call is initiated between transmission terminals. FIG. 17 is a diagram illustrating a display example of a destination list according to the present embodiment. FIG. 18 is a sequence diagram illustrating a process which makes a request to initiate a communication. FIG. 19 is a flowchart illustrating a detailed process performed by the initiation requesting terminal in a destination selection process. FIG. 20 is a diagram illustrating a display example of a dial confirmation dialog. FIG. 21 is a diagram illustrating a display example of a participation authentication information entry screen. FIG. 22 is a process flowchart illustrating a process which modifies the communication state. FIG. 23 is a sequence diagram illustrating a process which authorizes the request to initiate a communication. FIG. 24 is a diagram illustrating a display example of an initiation request acceptance screen. FIG. 25 is a sequence diagram illustrating a process which makes a request to relay the content data. FIG. 26 is a process flowchart illustrating a process which modifies the communication state. FIG. 27 is a sequence diagram illustrating a process which transmits the participation requesting information for the content data session. FIG. 28 is a diagram illustrating a display example of the destination list. FIG. 29 is a process flowchart illustrating a process which makes determination on participation on the basis of the communication state. FIG. 30 is a process flowchart illustrating a process which modifies the communication state.

First, FIG. 14 will be used to describe the process which manages the state information transmitted to the management system 50 from each relay device 30 and indicating the state of each relay device 30. The state detection unit 32 illustrated in FIG. 4 of each relay device 30 detects the operating status of the own relay device 30 on a regular basis (steps S1-1 to S1-4). Then, in order for the management system 50 to manage the operating status of each relay device 30 in real time, the transmission/reception unit 31 of each relay device 30 transmits each state information to the management system 50 on a regular basis via the communication network 2 (steps S2-1 to S2-4). Each state information includes the relay device ID of each relay device 30 and the operating status of the relay device 30 corresponding to each relay device ID, the operating status being detected by the state detection unit 32. Note that in the present embodiment, the relay devices (30*a*, 30*b*, and 30*d*) are operating normally and "ON line", whereas the relay device 30*c* is operating but "OFF line" due to some kind of problem generated in the program which executes the relaying operation of the relay device 30*c*, as illustrated in FIG. 5.

Next, in the management system 50, the transmission/reception unit 51 receives each state information transmitted from each relay device 30 so that the state information is stored and managed in the relay device management table (refer to FIG. 5) of the nonvolatile memory unit 5000 for every relay device ID through the store/read process unit 59 (steps S3-1 to S3-4). As a result, one of the operating statuses including "ON line"; "OFF line" and "out of order" is stored and managed for every relay device ID in the relay device management table as illustrated in FIG. 5. Also stored and managed at this time for every relay device ID is the date and time when the management system 50 has received the state information. Note that when no state information is transmitted from the relay device 30, a field corresponding to the operating status and a field corresponding to the reception date and time of each record in the relay device management table illustrated in FIG. 5 are left blank or indicate the operating status and the reception date and time from the last time the information was received, respectively.

FIG. 15 will now be used to describe the overview representing the transmission/reception state of the content data and the various pieces of management information within the transmission system 1. As illustrated in FIG. 15, a management information session sei provided to transmit/ receive the various management information is established among the initiation requesting terminal, a destination terminal A, and a destination terminal B via the management system 50 in the transmission system 1. Moreover, four sessions for transmitting/receiving each of the high-resolution image data, the medium-resolution image data, the low-resolution image data, and the voice data are established among the initiation requesting terminal, the destination terminal A, and the destination terminal B via the relay device 30. Here, the four sessions are collectively indicated as the content data session sed. In other words, the content data session sed is the session used in the teleconference. Note that the concept of the session is merely provided as an example, whereby the session of the image data need not be divided by the resolution. The number of sessions may be three or less or five or more, for example.

FIG. 16 will now be used to describe a process of transmitting/receiving each management information performed in a preparatory phase before the terminal 10*aa* initiates a call. Note that FIG. 16 illustrates a process where the various pieces of management information are all transmitted/received in the management information session sei.

First, the user of the terminal 10*aa* turns on the power switch 109 illustrated in FIG. 2, so that the operation input acceptance unit 12 illustrated in FIG. 4 accepts the power-on input and turns on the power source (step S21). The login request unit 13 is triggered by the reception of the power-on input and automatically transmits the login requesting information indicating the login request to the management system 50 from the transmission/reception unit 11 via the communication network 2 (step S22). The login requesting information includes the terminal ID identifying the own terminal 10*aa* as a requestor terminal and the password. The terminal ID and the password are data read from the nonvolatile memory unit 1000 through the store/read process unit 19 and transmitted to the transmission/reception unit 11. Note that the management system 50 on the receiver side can get hold of the IP address of the terminal 10*aa* on the transmitter side at the time the terminal 10*aa* transmits the login requesting information to the management system 50.

Next, the terminal authentication unit 52 of the management system 50 searches the terminal authentication management table (refer to FIG. 6) included in the nonvolatile memory unit 5000 by using, as a search key, the terminal ID and the password included in the login requesting information received through the transmission/reception unit 51, thereby performing terminal authentication by determining whether the same terminal ID and password are managed in the terminal authentication management DB 5002 (step S23).

When the terminal authentication unit 52 determines that the same terminal. ID and password are managed and that the login request comes from the terminal 10 having a legitimate right of use, the state management unit 53 stores in the terminal management table (refer to FIG. 7) the date and time when the login requesting information has been received in association with the IP address of the terminal 10*aa* in each record indicated by the terminal ID and the terminal name of the terminal 10*aa* (step S24-1). As a result, the terminal management table illustrated in FIG. 7 manages therein the reception date and time "2009.11.10.13:40" in association with the terminal IP address "1.2.1.3" in the record corresponding to the terminal ID "10*aa*".

The state management unit 53 subsequently sets the operating status "ON line" and the communication state "None" of the terminal 10*aa* and stores in the terminal management table (refer to FIG. 7) the operating status in association with the communication state in each record indicated by the terminal ID and the terminal name of the terminal 10*aa* (step S24-2). As a result, the terminal management table illustrated in FIG. 7 manages therein the operating status "ON line" in association with the communication state "None" in the record corresponding to the terminal, ID "10*aa*".

The transmission/reception unit 51 of the management system 50 then transmits authentication result information indicating the authentication result obtained by the terminal authentication unit 52 to the login requesting terminal (terminal 10*aa*) having made the login request, via the communication network 2 (step S25). The description will be continued below in the present embodiment assuming the terminal authentication unit 52 has determined that the terminal has the legitimate right of use.

After the terminal 10*aa* has received the authentication result information indicating the result that the terminal has been determined to have the legitimate right of use, the transmission/reception unit 11 transmits the destination list requesting information indicating the request for the destination list, to the management system 50 via the communication network 2 (step S26). Accordingly, the transmission/reception unit 51 of the management system 50 receives the destination list requesting information.

Next, the terminal extraction unit 54 searches the destination list management table (refer to FIG. 8) by using, as a search key, the terminal ID "10*aa*" of the login requesting terminal (terminal 10*aa*) having made the login request, and reads and extracts the terminal ID of the destination terminal candidate with which the login requesting terminal (terminal 10*aa*) as the initiation requesting terminal can have a call, namely, establish a session (step S27). The terminal extraction unit 54 further searches the terminal management table (refer to FIG. 7) by using the extracted terminal ID as a search key, and reads and extracts the terminal name corresponding to the terminal ID, namely, the terminal name of the destination terminal candidate. Extracted here are the terminal IDs ("10*ab*", "10*ac*", "10*ad*", and "10*ae*") of the destination terminal candidates (terminals (10*ab*, 10*ad*, and 10*ae*)) corresponding to the terminal ID "10*aa*" of the initiation requesting terminal (terminal 10*aa*), and the terminal names ("Japan, Tokyo branch, AB terminal", "Japan, Tokyo branch, AC terminal", "Japan, Tokyo branch, AD terminal", and "Japan, Tokyo branch, AE terminal") corresponding to the terminal IDs.

Now, the transmission/reception unit 51 of the management system 50 reads data of a destination list frame (data of a portion corresponding to a destination list frame 1100-1 illustrated in FIG. 17) from the nonvolatile memory unit 5000 through the store/read process unit 59 (step S28) and, at the same time, transmits to the initiation requesting terminal (terminal 10*aa*) "destination list information (the destination list frame, the terminal ID, and the terminal name)" including the destination list frame as well as the terminal ID and the terminal name of the destination terminal candidate extracted by the terminal extraction unit 54 (step S29). Accordingly, the transmission/reception unit 11 of the initiation requesting terminal (terminal 10*aa*) receives the destination list information, so that the store/read process unit 19 stores the destination list information into the volatile memory unit 1002 (step S30).

In the present embodiment, as described above, the management system 50 collectively manages the destination list information of all the terminals instead of each terminal 10 managing the destination list information. As a result, the management system 50 collectively deals with a situation where a new terminal 10 is to be included in the transmission system 1, a terminal 10 of a new model is to be included in place of the terminal 10 already included, or the appearance of the destination list frame is to be modified, thereby saving each terminal 10 time and effort of modifying the destination list information.

The terminal state acquisition unit 55 of the management system 50 then searches the terminal management table (refer to FIG. 7) by using, as a search key, the terminal IDs ("10ab", "10ac", "10ad", and "10ae") of the destination terminal candidate extracted by the terminal extraction unit 54, and acquires the operating status and the communication state of each of the terminals (10ab, 10ac, 10ad, and 10ae) as the destination terminal candidates by reading the operating status and the communication state corresponding to each terminal ID extracted by the terminal extraction unit 54 (step S31).

Next, the transmission/reception unit 51 transmits the state information including the terminal ID as the search key used in step S31 as well as the operating status and the communication state of the corresponding destination terminal candidate to the login requesting terminal via the communication network 2 (step S32). Specifically, in step S32, the transmission/reception unit transmits the state information including the terminal ID "10ab" as the search key and the operating status "OFF line" of the destination terminal candidate (terminal 10ab) to the login requesting terminal (terminal 10aa). Note that the state information does not include the communication state when the operating status is "OFF line". Also as a part of step S32, the transmission/reception unit 51 transmits the state information relevant to all the destination terminal candidates to the login requesting terminal (terminal 10aa), the state information including the terminal ID "10ac" as well as the operating status "ON line" and the communication state "Calling" of the corresponding destination terminal candidate (terminal 10ac).

Now, the store/read process unit 19 of the login requesting terminal (terminal 10aa) stores the state information received from the management system 50 one by one into a volatile memory unit 1002 (step S33). By receiving the state information of each terminal, the login requesting terminal (terminal 10aa) can acquire the current operating status and communication state of the terminal 10ab and the like as the destination terminal candidate which can have a call with the login requesting terminal (terminal 10aa) as the initiation requesting terminal.

The destination list creation unit 20 of the login requesting terminal (terminal 10aa) thereafter creates the destination list reflecting the operating status and the communication state of the terminal 10 as the destination terminal candidate, on the basis of the destination list information and the state information of the terminal stored in the volatile memory unit 1002. The display control unit 16 then displays the destination list on the display 120aa illustrated in FIG. 1 at a predetermined timing (step S34).

FIG. 17 is a diagram illustrating a display example of the destination list. As illustrated in FIG. 17, the destination list is a display screen including, within the destination list frame 1100-1, a terminal ID 1100-2 of the destination terminal candidate, a terminal name 1100-3, and icons 1100-4a to 1100-4c reflecting the state information.

The icon includes the OFF line icon 1100-4a indicating that the terminal is OFF line and unavailable for a call, the call available icon 1100-4b indicating that the terminal is ON line and available for a call, and the in-call icon 1100-4c indicating that the terminal is ON line and in a call.

The destination list creation unit 20 assigns the call available icon 1100-4b to the destination terminal candidate when the operating status thereof is "ON line" and the communication state thereof is "None". The destination list creation unit 20 assigns the in-call icon 1100-4c to the destination terminal candidate when the operating status thereof is "ON line" and the communication state thereof is anything other than "None". Moreover, the destination list creation unit 20 assigns the OFF line icon 1100-4a to the destination terminal candidate when the operating status thereof is "OFF line".

Referring back to FIG. 16, the terminal extraction unit 54 of the management system 50 searches the destination list management table (refer to FIG. 8) by using the terminal ID "10aa" of the login requesting terminal (terminal 10aa) as a search key, and extracts the terminal ID of another terminal (initiation requesting terminal) which registers the terminal ID "10aa" of the login requesting terminal (terminal 10aa) as the destination terminal candidate (step S35). The terminal ID of the other requestor terminal extracted from the destination list management table illustrated in FIG. 8 includes "10ab", "10ac", and "10db".

Next, the terminal state acquisition unit 55 of the management system 50 searches the terminal management table (refer to FIG. 7) by using the terminal ID "10aa" of the login requesting terminal (terminal 10aa) as the search key, and acquires the operating status and the communication state of the login requesting terminal (terminal 10aa) (step S36).

The transmission/reception unit 51 then transmits the state information including the terminal ID "10aa", the operating status "ON line", and the communication state "Private Busy" of the login requesting terminal (terminal 10aa) acquired in step S36 to the terminal that has an "ON line" operating status in the terminal management table (refer to FIG. 7) (here, the operating status of each of the terminal 10ac and the terminal 10db is "ON line") among the terminals (10ab, 10ac, and 10db) corresponding to the terminal IDs ("10ab", "10ac", and "10db") extracted in step S35 (steps S37-1 and S37-2). Subsequently, each of the terminal 10ac and the terminal 10db displays the state information of the destination terminal candidate on the display 120 (steps S38-1 and S38-2). Note that, on the basis of each of the terminal IDs ("10ac" and "10db"), the transmission/reception unit 51 refers to the IP address of the terminal managed in the terminal management table illustrated in FIG. 7 when transmitting the state information to the terminals (10ac and 10db). As a result, the transmission/reception unit can transmit the terminal ID "10aa", the operating status "ON line", and the communication state "None" of the login requesting terminal (terminal 10aa) to each of the terminals (terminals (10ac and 10db)) that can have a call with the login requesting terminal (terminal 10aa) as the destination terminal.

On the other hand, a process similar to the process described in steps S22 to S38-1, S38-2 is executed when the user of another terminal 10 turns on the power switch 109 illustrated in FIG. 2 and the operation input acceptance unit 12 illustrated in FIG. 4 accepts the power-on input, as described in step S21. The description of the process will thus be omitted.

FIG. 18 will now be used to describe a process where the terminal makes a request to initiate a communication with another terminal. Note that FIG. 18 illustrates a process where the various pieces of management information are all transmitted/received in the management information session sei.

Described in FIG. 18 is an example where the terminal 10*aa* which is allowed to log in in FIG. 16 transmits the initiation requesting information, namely, where the terminal 10*aa* operates as the initiation requesting terminal. On the basis of the state information of the destination terminal candidate received in step S32 described in FIG. 16, the terminal 10*aa* as the initiation requesting terminal can communicate with at least one of the destination terminal candidates that has an "ON line" operating status and in the communication state "None".

In the present embodiment, the initiation requesting terminal (terminal 10*aa*) can have a call with the terminal 10*db* that has an "ON line" and in the communication state "None" as indicated in the state information of the terminal received in step S32 among the terminals (10*ab*, 10*ba*, 10*db*, and 10*dc*) as the destination terminal candidates. Described below is a case where the user of the initiation requesting terminal (terminal 10*aa*) has selected to initiate a call with the destination terminal (terminal 10*db*).

Prior to starting the process illustrated in FIG. 18, the destination list illustrated in FIG. 17 is displayed on the display 120*aa* of the terminal 10*aa* as the initiation requesting terminal, where the user of the initiation requesting terminal can select a desired party with whom to have a call, namely the other party in the session, from the destination list.

First, in the process illustrated in FIG. 18, a destination selection process is performed when the user of the initiation requesting terminal depresses the operation button 108 illustrated in FIG. 2 and selects the destination terminal (terminal 10*db*) (step S41).

FIG. 19 is a flowchart illustrating a detailed process performed by the initiation requesting terminal in the destination selection process (step S41). Once the user has depressed the operation button 108 and selected the destination terminal (terminal 10*db*) on the destination list as described above, the operation input acceptance unit 12 illustrated in FIG. 4 accepts the request to initiate a call in which the destination terminal (terminal 10*db*) is designated, namely, the request to initiate the session (step S41-1). The display control unit 16 then displays the dial confirmation dialog 1200-1 illustrated in FIG. 20 on top of the destination list (step S41-2).

The dial confirmation dialog 1200-1 serves as a user interface which confirms the initiation request accepted in step S41-1 and specifies whether or not to restrict the terminal that can participate in the session pertaining to the initiation request. The dial confirmation dialog 1200-1 includes a "YES" button 1200-2 which determines the transmission of the initiation requesting information, a "NO" button 1200-3 which cancels the transmission of the initiation requesting information, and a "DIAL BY RESTRICTING PARTICIPANT" button 1200-4 which designates a session with participation restriction.

Here, the operation input acceptance unit 12 accepts the input to designate a session with no participation restriction when the "YES" button 1200-2 is selected. On the other hand, the operation input acceptance unit 12 accepts the input to designate a session with participation restriction when the "DIAL BY RESTRICTING PARTICIPANT" button 1200-4 is selected.

When the input designating participation restriction is accepted. (YES in step S41-3), the display control unit 16 displays the participation authentication information entry screen on the display 120. FIG. 21 is a diagram illustrating an example of the participation authentication information entry screen.

The user of the terminal 10*aa* inputs the PIN code as the participation authentication information through the participation authentication information entry screen illustrated in FIG. 21. That is, the terminal 10*aa* voluntarily (without an inquiry from the management system 50) inputs the participation authentication information and transmits it to the management system 50 before establishing the session. Referring back to FIG. 19, the operation input acceptance unit 12 of the terminal 10*aa* accepts the input of the PIN code as the participation authentication information by the user through the participation authentication information entry screen, whereby the participation authentication information (PIN code) is accepted once it is received by the management system 50 (step S41-4).

Then, the transmission/reception unit 51 of the management system 50 generates the initiation requesting information including the restriction information indicating the participation restriction and the participation authentication information (PIN code) (step S41-5). The initiation requesting information generated in step S41-5 includes: "Private Invite" which is the information indicating a request to initiate a session and at the same time the restriction information indicating the participation restriction; the terminal ID "10*aa*" of the initiation requesting terminal; the terminal ID "10*db*" of the destination terminal; and the PIN code "1234" as the participation authentication information.

On the other hand, when the input designating no participation restriction is accepted (NO in step S41-3), the transmission/reception unit 11 generates the initiation requesting information including the restriction information indicating no participation restriction (step S41-6). The initiation requesting information generated in step S41-6 is in particular the information indicating the request to initiate a session and includes: "Invite" indicating that the restriction information has no participation restriction; the terminal ID "10*aa*" of the initiation requesting terminal; and the terminal ID "10*db*" of the destination terminal.

Described here in FIG. 18 is an example where "Private Invite" that is the restriction information indicating participation restriction is designated as the initiation requesting information. As illustrated in FIG. 18, the transmission/reception unit 11 of the terminal 10*aa* transmits to the management system 50 the initiation requesting information including the terminal ID "10*aa*" of the initiation requesting terminal (terminal 10*aa*), the terminal ID "10*db*" of the destination terminal (terminal 10*db*), "Private Invite" that is the information indicating the request to initiate the session and includes the restriction information indicating participation restriction, and the PIN code (participation authentication information) along with the IP address of the initiation requesting terminal (step S42). The transmission/reception unit 51 of the management system 50 thereby receives the initiation requesting information and at the same time gets hold of the IP address "1.2.1.3" of the initiation requesting terminal (terminal 10*aa*) from which the information has been transmitted.

Then, on the basis of the terminal ID "10*aa*" of the initiation requesting terminal (terminal 10*aa*) and the terminal ID "10*db*" of the destination terminal (terminal 10*db*) included in the initiation requesting information, the state management unit 53 modifies the field corresponding to the communication state of each record including the terminal ID "10*aa*" and the terminal ID "10*db*" in the terminal management table of the terminal management DB 5003 (refer to FIG. 7) (step S43).

Now, FIG. 22 will be used to describe the process performed in step S43 in detail. The state management unit 53 illustrated in FIG. 4 first acquires the communication state of the terminal managed in the terminal management DB 5003 (step S43-1). In this case, "Private Invite" (or "Invite") included in the initiation requesting information received by the transmission/reception unit 51 is specified as the modification requesting information for the communication state. The modification requesting information "Private Invite" (or "Invite") is determined in advance to be the specific modification requesting information by the modification requesting information determination unit 61. As a result, the state management unit 53 acquires the communication state of not only the initiation requesting terminal (terminal 10*aa*) but also the destination terminal (terminal 10*db*). In this case, the state management unit 53 searches the terminal management table (refer to FIG. 7) by using the terminal ID "10*aa*" of the initiation requesting terminal (terminal 10*aa*) as the search key, and acquires the communication state "None" of the initiation requesting terminal (terminal 10*aa*) which has transmitted the initiation requesting information. The communication state "None" of the destination terminal (terminal 10*db*) is acquired likewise.

Next, the state management unit 53 acquires the pre-modification state information of the initiation requesting terminal and the destination terminal corresponding to the modification requesting information "Private Invite" (or "Invite") (step S43-2). In this case, the state management unit 53 searches the state modification management table (refer to FIG. 11) by using, as a search key, the modification requesting information "Private Invite" (or "Invite") and the terminal information "initiation requesting terminal", and acquire's the pre-modification state information "None" of the initiation requesting terminal. Likewise, the state management unit 53 searches the state modification management table (refer to FIG. 11) by using, as a search key, the modification requesting information "Private Invite" (or "Invite") and the terminal information "destination terminal", and acquires the pre-modification state information "None" of the destination terminal.

Subsequently, the state management unit 53 compares the acquired communication state with the acquired pre-modification state information to determine whether or not they are identical (step S43-3). In this case, the state management unit 53 compares the acquired communication state "None" of the initiation requesting terminal (terminal 10*aa*) with the acquired pre-modification state information "None" of the initiation requesting terminal to determine whether or not they are identical. Likewise, the state management unit 53 compares the acquired communication state of the destination terminal (terminal 10*db*) with the acquired pre-modification state information of the destination terminal to determine whether or not they are identical.

When it is determined in step S43-3 that the communication state and the pre-modification state information of the initiation requesting terminal are identical as well as the communication state and the pre-modification state information of the destination terminal are identical (YES in step S43-3), the state management unit 53 acquires the modified information for each of the initiation requesting terminal and the destination terminal corresponding to the modification requesting information "Private Invite" (or "Invite") (step S43-4). In this case, the state management unit 53 searches the state modification management table (refer to FIG. 11) by using, as a search key, the modification requesting information "Private Invite" (or "Invite") and the terminal information "initiation requesting terminal", and acquires the modified information "Private Calling" (or "Calling") of the initiation requesting terminal. Likewise, the state management unit 53 searches the state modification management table (refer to FIG. 11) by using, as a search key, the modification requesting information "Private Invite" (or "Invite") and the terminal information "destination terminal", and acquires the modified information "Private Ringing" (or "Ringing") of the destination terminal.

Then, on the basis of the terminal ID "10*aa*" of the initiation requesting terminal (terminal 10*aa*) and the terminal ID "10*db*" of the destination terminal (terminal 10*db*), the state management unit 53 modifies the field corresponding to the communication state of each record including the terminal ID "10*aa*" and the terminal ID "10*db*" in the terminal management table (refer to FIG. 7) (step S43-5). In this case, the state management unit modifies the field corresponding to the communication state of the record including the terminal ID "10*aa*" in the terminal management table to "Private Calling" (or "Calling") on the basis of the acquired modified information of the initiation requesting terminal. Likewise, the state management unit modifies the field corresponding to the communication state of the record including the terminal ID "10*db*" to "Private Ringing" (or "Ringing") on the basis of the acquired modified information of the destination terminal.

When the restriction information indicating participation restriction is specified in the initiation requesting information, the state management unit 53 registers the terminal participation authentication information (PIN code) in the field corresponding to the participation authentication information of each record including the terminal ID "10*aa*" of the initiation requesting terminal (terminal 10*aa*) and the terminal ID "10*db*" of the destination terminal (terminal 10*db*) in the terminal management table (step S43-7).

On the other hand, when it is determined in step S43-3 that the communication state and the pre-modification state information of the requestor terminal are not identical or that the communication state and the pre-modification state information of the destination terminal are not identical (NO in step S43-3), the state management unit 53 does not modify the field corresponding to the communication state of each record including the terminal ID "10*aa*" and the terminal ID "10*db*" in the terminal management table (refer to FIG. 7). This is because either the initiation requesting terminal (terminal 10*aa*) or the destination terminal (terminal 10*db*) is not in the state capable of initiating a call. In this case, the transmission/reception unit 51 generates a predetermined error message and transmits it to the initiation requesting terminal (terminal 10*aa*) to complete the process (step S43-6). Note that the error message is displayed on the display 120 of the initiation requesting terminal at this time.

Referring back to FIG. 18, there will be described a process following the case where the communication state is modified in step S43-5. First, the session ID generation unit 56*a* generates a session ID "se1" identifying the session (content data session sed) which executes the communication between the initiation requesting terminal (terminal 10*aa*) and the destination terminal requested by the initiation requesting terminal (step S44). Once the session ID has been generated, the session management unit 57 stores the session ID "se1" in the volatile memory unit 5100.

Next, the relay device selection unit 56 of the management system 50 selects the relay device 30 which relays the content data in the content data session between the initiation requesting terminal (terminal 10*aa*) and the destination terminal (terminal 10*db*) (step S45). In this case, a relay device extraction unit 56*b* first searches the relay device selection management table on the basis of the terminal ID "10*aa*" of the initiation requesting terminal (terminal 10*aa*)

and the terminal ID "10*db*" of the destination terminal (terminal 10*db*) included in the initiation requesting information transmitted from the initiation requesting terminal (10*aa*), and extracts the relay device IDs ("111*a*" and "111*d*") corresponding to the terminals (10*aa* and 10*db*).

When each of the extracted relay device IDs is identical, the relay device selection unit 56 refers to the operating status of the extracted relay device ID among the operating statuses of the relay devices 30 managed in the relay device management table (refer to FIG. 5). Here, the relay device selection unit 56 selects the extracted relay device as the relay device used to relay the content data when the operating status of the relay device ID is "ON line". When each of the extracted relay device IDs is not identical or the operating status of the relay device ID referred is "OFF line" as a result of the referring, the relay device selection unit selects the relay device 30*e* with the relay device ID "111*e*" as the relay device used to relay the content data. The description will be continued below in the p-resent embodiment assuming a case where the relay device 30*e* is selected by the relay device selection unit 56.

Upon completing the process of selecting the relay device 30, the session management unit 57 stores and manages the relay device ID "111*e*" of the selected relay device, the terminal ID "10*aa*" of the initiation requesting terminal (terminal 10*aa*), and the terminal ID "10*db*" of the destination terminal (terminal 10*db*) in the field corresponding to each of the relay device ID, the terminal ID of the initiation requesting terminal, and the terminal ID of the destination terminal, respectively, of the record including the session ID "se1" in the session management table (refer to FIG. 9) of the nonvolatile memory unit 5000 (step S46).

Next, the transmission/reception unit 51 illustrated in FIG. 4 transmits, to the initiation requesting terminal (terminal 10*aa*) through the communication network 2, the session ID generated by the session ID generation unit 56*a* and relay device connection information used to connect to the relay device 30*e* selected by a selection unit 56*c* (step S47). The relay device connection information can include the IP address "1.1.1.3" of the relay device 30*e*, authentication information, and a port number, for example. The terminal 10*aa* can thus get hold of the relay device connection information used to connect to the relay device 30*e* which is used in relaying the content data in executing the session with the session ID "se1".

The transmission/reception unit 51 subsequently transmits to the destination terminal (terminal 10*db*) the initiation requesting information including the terminal ID "10*aa*" of the initiation requesting terminal (terminal 10*aa*), "Private Invite", and the session ID "se1" as well as the relay device connection information used to connect to the relay device 30*e* and the IP address of the management system 50 (step S48). Accordingly, the transmission/reception unit 11 of the destination terminal (terminal 10*db*) receives the initiation requesting information and at the same time gets hold of the relay device connection information used to connect to the relay device 30*e* that is used in relaying the content data as well as the IP address "1.1.1.2" of the management system 50 from which the information has been transmitted.

FIGS. 23 and 22 will now be used to describe a process performed when the user of the destination terminal (terminal 10*db*) which has received the initiation requesting information depresses the operation button 108 illustrated in FIG. 2 to accept the response indicating the approval to initiate a communication (establish a session) with the initiation requesting terminal (terminal 10*aa*). Note that FIG. 23 will be used to describe the case where the restriction information indicating participation restriction is specified as the initiation requesting information.

An initiation request reception screen indicating that the initiation requesting information has been received is displayed on the display 120 of the destination terminal (terminal 10*db*) at the start of the transmission/reception process illustrated in FIG. 23 (step S49-1). As illustrated in FIG. 24, an initiation request acceptance screen 1300-1 indicates that the initiation requesting information has been received. Moreover, the initiation request acceptance screen indicates that the conference has participation restriction by saying, for example, "This conference has participation restriction" on the screen when the initiation requesting information includes the restriction information indicating participation restriction.

The user can confirm that the initiation request has been received by viewing this initiation request reception screen and further check whether or not the teleconference pertaining to the session requested to be initiated is the conference with participation restriction in which participation restriction is specified.

The operation input acceptance unit 12 accepts the response indicating the approval to initiate a communication (establish a session) with the initiation requesting terminal (terminal 10*aa*) when the operation button 108 of the destination terminal (terminal 10*db*) is operated by the user of the destination terminal (step S49-2). The transmission/reception unit 11 of the destination terminal (terminal 10*db*) thereafter transmits, to the management system 50, initiation response information including the terminal ID "10*db*" of the destination terminal (terminal 10*db*), the terminal ID "10*aa*" of the initiation requesting terminal (terminal 10*aa*), the modification requesting information "Private Accept" indicating the approval for establishing a session with participation restriction, and the session ID "se1" (step S50).

After the transmission/reception unit 51 of the management system 50 has received the initiation response information, the state management unit 53 modifies the field corresponding to the communication state of each record including the terminal ID "10*aa*" and the terminal ID "10*db*" in the terminal management table (refer to FIG. 7), on the basis of the terminal ID "10*aa*" of the requestor terminal (terminal 10*aa*) and the terminal ID "10*db*" of the destination terminal (terminal 10*db*) (step S51).

Now, FIG. 22 will be used to describe the process performed in step S51 in detail. After the transmission/reception unit 51 of the management system 50 has received the initiation response information, the state management unit 53 first acquires the communication state of the terminal managed in the terminal management table (refer to FIG. 7) in a manner similar to that in the process performed in step S43-1 (step S51-1). In this case, the modification requesting information "Accept" received by the transmission/reception unit 51 is determined in advance to be the specific modification requesting information by the modification requesting information determination unit 61. As a result, the state management unit 53 acquires not only the communication state "Ringing" or "Private Ringing" of the destination terminal (terminal 10*db*) but also the communication state "Calling" or "Private Calling" of the initiation requesting terminal (terminal 10*aa*).

Similar to the process performed in step S43-2, the state management unit 53 then acquires the pre-modification state information "Private Calling" and "Private Accepted" of the initiation requesting terminal corresponding to the modification requesting information "Private Accept" managed in the state modification management table (refer to FIG. 11).

Likewise, the state management unit 53 acquires the pre-modification state information "Private Ringing" of the destination terminal corresponding to the modification requesting information "Private Accept" managed in the state modification management table (refer to FIG. 11) (step S51-2).

Subsequently, the state management unit 53 compares the acquired communication state with the acquired pre-modification state information to determine whether or not they are identical (step S51-3). In this case, the state management unit 53 determines whether or not the acquired communication state "Private Calling" of the initiation requesting terminal (terminal 10aa) is identical to either the pre-modification state information "Private Calling" or "Private Accepted" of the initiation requesting terminal. Likewise, the state management unit 53 determines whether or not the acquired communication state "Private Ringing" of the destination terminal (terminal 10db) is identical to the pre-modification state information "Private Ringing" of the destination terminal.

When it is determined in step S51-3 that the communication state and the pre-modification state information of the initiation requesting terminal are identical as well as the communication state and the pre-modification state information of the destination terminal are identical (YES in step S51-3), the state management unit 53 acquires the modified information of the initiation requesting terminal and the destination terminal corresponding to the response information "Private Accept" (step S51-4). In this case, the state management unit 53 searches the state modification management table (refer to FIG. 11) by using, as a search key, the response information "Private Accept", the terminal information "initiation requesting terminal" indicating the initiation requesting terminal, and the pre-modification state "Private Calling" indicating the pre-modification communication state of the initiation requesting terminal, and acquires the modified information "Private Accepted" of the initiation requesting terminal. Likewise, the state management unit 53 searches the state modification management table (refer to FIG. 11) by using, as a search key, the response information "Private Accept", the terminal information "destination terminal" indicating the destination terminal, and the pre-modification state "Private Ringing" indicating the pre-modification communication state of the destination terminal, and acquires the modified information "Private Accepted" of the destination terminal.

Then, on the basis of the terminal ID "10aa" of the initiation requesting terminal (terminal 10aa) and the terminal ID "10db" of the destination terminal (terminal 10db) included in the initiation response information, the state management unit 53 modifies the field corresponding to the communication state of each record including the terminal ID "10aa" and the terminal ID "10db" in the terminal management table (refer to FIG. 7) (step S51-5). In this case, the state management unit modifies the field corresponding to the communication state of the record including the terminal ID "10aa" in the terminal management table to "Private Accepted" on the basis of the acquired modified information of the initiation requesting terminal. Likewise, the state management unit modifies the field corresponding to the communication state of the record including the terminal ID "10db" in the terminal management table to "Private Accepted" on the basis of the acquired modified information of the destination terminal.

When it is determined in step S51-3 that the communication state and the pre-modification state information of the initiation requesting terminal (10aa) are not identical or that the communication state and the pre-modification state information of the destination terminal (terminal 10db) are not identical (NO in step S51-3), the state management unit 53 does not modify the field corresponding to the communication state of each record including the terminal ID "10aa" and the terminal ID "10db" in the terminal management table (refer to FIG. 7). In this case, the transmission/reception unit 51 generates an error message and transmits it to the destination terminal (terminal 10db) to complete the process (step S51-6).

Referring back to FIG. 23, there will be described a process following the case where the communication state is modified in step S51-5. The transmission/reception unit 51 transmits, to the initiation requesting terminal (terminal 10aa), the initiation response information including the terminal ID "10db" of the destination terminal (terminal 10db), the modification requesting information "Private Accept" indicating the approval for the request to initiate a call with the destination terminal, and the session ID "se1" (step S52). Upon receiving the initiation response information, the initiation requesting terminal (terminal 10aa) transmits the session ID "se1" and the relay device connection information acquired in step S47 to the relay device 30e from the transmission/reception unit 11, thereby connecting to the relay device 30e (step S53). On the other hand, the destination terminal (terminal 10db) transmits the session ID "se1" and the relay device connection information acquired in step S48 to the relay device 30e from the transmission/reception unit 11, thereby connecting to the relay device 30e (step S54).

FIG. 25 will now be used to describe a process in which the relay device 30e starts relaying the content data transmitted between the initiation requesting terminal (terminal 10aa) and the destination terminal (terminal 10db). Note that FIG. 25 illustrates a process where the various pieces of management information are all transmitted/received in the management information session sei.

At a predetermined timing after connecting to the relay device 30e (refer to step S53), the initiation requesting terminal (terminal 10aa) first transmits relay requesting information including the terminal ID "10aa" of the initiation requesting terminal (terminal 10aa), the session ID "se1", and the modification requesting information "Join" indicating a request to start relaying to the management system 50 from the transmission/reception unit 11 (step S71-1).

Once the transmission/reception unit 51 of the management system 50 has received the relay requesting information, the state management unit 53 modifies the field corresponding to the communication state of the record including the terminal ID "10aa" in the terminal management table (refer to FIG. 7), on the basis of the terminal ID "10aa",of the initiation requesting terminal (terminal 10aa) included in the relay requesting information (step S72-1).

Here, FIG. 26 will be used to describe the process performed in step S72-1 in detail. Note that in FIG. 26 the initiation requesting terminal is referred to as a relay requesting terminal as a terminal which transmits the relay requesting information. The state management unit 53 illustrated in FIG. 4 first acquires the communication state of the terminal managed in the terminal management DB 5003 (step S72-1-1). In this case, the modification requesting information "Join" received by the transmission/reception unit 51 is determined in advance to be not the specific modification requesting information by the modification requesting information determination unit 61. As a result, the state management unit 53 only acquires the communication state of the relay requesting terminal (terminal 10aa). The state management unit 53 then searches the terminal management table (refer to FIG. 7) by using the terminal ID "10aa" of the relay requesting terminal (terminal 10aa) as a search key and acquires the communication state "Private Accepted" (or "Accepted") of the relay requesting terminal (terminal 10aa) which has requested to start relaying.

Next, the state management unit 53 acquires the pre-modification state information corresponding to the modification requesting information "Join" (step S72-1-2). The state management unit 53 in this case searches the state modification management table (refer to FIG. 10) by using the modification requesting information "Join" as a search key and acquires the pre-modification state information "Private Accepted" (or "Accepted").

The state management unit 53 thereafter compares the acquired communication state with the acquired pre-modification state information to determine whether or not they are identical (step S72-1-3). In this case, the state management unit 53 compares the acquired communication state "Private Accepted" (or "Accepted") of the relay requesting terminal (terminal 10aa) with the pre-modification state information "Private Accepted" (or "Accepted") acquired by the state management unit 53, and determines whether or not they are identical.

When it is determined in step S72-1-3 that the communication state and the pre-modification state information of the relay requesting terminal are identical (YES in step S72-1-3), the state management unit 53 acquires the modified information corresponding to the modification requesting information "Join" (step S72-1-4). In this case, the state management unit 53 searches the state modification management table (refer to FIG. 10) by using the modification requesting information "Join" as a search key and acquires the modified information "Private Busy" (or "Busy").

Next, the state management unit 53 modifies the field corresponding to the communication state of the record including the terminal ID "10aa" in the terminal management table (refer to FIG. 7), on the basis of the terminal ID "10aa" of the initiation requesting terminal (terminal 10aa) (step S72-1-5). The state management unit here modifies the field corresponding to the communication state of the record including the terminal ID "10aa" in the terminal management table to "Private Busy" (or "Busy") on the basis of the acquired modified information.

On the other hand, when it is determined in step S72-1-3 that the communication state and the pre-modification state information of the requestor terminal are not identical (NO in step S72-1-3), the state management unit 53 does not modify the field corresponding to the communication state of the record including the terminal ID "10aa" in the terminal management table (refer to FIG. 7). In this case, the transmission/reception unit 51 completes the process by transmitting the error message to the initiation requesting terminal (terminal 10aa) (step S72-1-6).

Referring back to FIG. 25, there will be described a process following the case where the communication state is modified in step S72-1-5. The management system 50 first transmits relay initiation requesting information including the terminal ID "10aa" of the relay requesting terminal (terminal 10aa) and the session ID "se1" to the relay device 30e (step S73-1). Upon receiving the relay initiation requesting information, the relay device 30e transmits to the management system 50 relay start approval information including notification information "OK" which indicates the approval to start relaying (step S74-1). The transmission/reception unit 51 of the management system 50 having received the response then transmits the relay start approval information to the relay requesting terminal (terminal 10aa) (step S75-1). The content data session sed between the relay requesting terminal (terminal 10aa) and the relay device 30e is established as a result (step S76-1).

At a predetermined timing after connecting to the relay device 30e (refer to step S54 in FIG. 23), on the other hand, the destination terminal (terminal 10db) transmits the relay requesting information including the terminal ID "10db" of the destination terminal (terminal 10db), the session ID "se1", and the modification requesting information "Join" indicating the request to start relaying to the management system 50 from the transmission/reception unit 11 (step S71-2).

A process similar to that in steps S72-1, S73-1, S74-1, and S75-1 is performed by the management system 50 and the relay device 30e, thereby establishing the content data session sed between the destination terminal (terminal 10db) and the relay device 30a (steps S72-2, S73-2, S74-2, S75-2, and S76-2). Note that in step S72-2, the destination terminal is treated as a terminal transmitting the relay requesting information, namely, a relay requesting terminal. The relay device 30e can relay low-resolution, medium-resolution, and high-resolution image data as well as the voice data between the terminals (10aa and 10db) once the content data session sed between the relay requesting terminal (terminal 10aa) and the relay device 30e and the content data session sed between the destination terminal (terminal 10aa) and the relay device 30e have been established. The terminals (10aa and 10db) can start the teleconference as a result.

FIG. 27 will now be used to describe a process in which the terminal 10cb transmits the participation requesting information indicating a request to participate in the content data session after the content data session has been established between the initiation requesting terminal (terminal 10aa) and the destination terminal (terminal 10db). That is, the terminal 10cb operates as a participation requesting terminal which transmits the participation requesting information. Note that FIG. 27 illustrates a process where the various pieces of management information are all transmitted/received in the management information session sei.

When the user wishes to participate in the established session that has already been established and participate in the teleconference using the session, he/she displays the destination list on the display 120cd of the terminal 10cd by performing the login process described while referring to FIG. 16 in the terminal (in this case, terminal 10cb) used by the user (step S101).

As illustrated in FIG. 28, the display 120cd of the terminal 10cd displays a destination list 1400 in which a list of destination terminals that can establish a session with the terminal 10cd as the initiation requesting terminal is displayed.

The user of the participation requesting terminal (terminal 10cb) operates the operation button 108 illustrated in FIG. 2 to select from the destination list 1400 the terminal (hereinafter referred to as a participant terminal) already participating in the desired session. The operation input acceptance unit 12 in response accepts the participation request for the content data session that is already being established (step S104). Described below is a case where the terminal 10db as a participant terminal is selected.

The transmission/reception unit 11 of the participation requesting terminal (terminal 10cb) making the request for participation thereafter transmits to the management system 50 the participation requesting information including the terminal ID "10cb" of the participation requesting terminal (terminal 10*cb*), the modification requesting information "Call" indicating the request for participation to the content data session, and the terminal ID "10*db*" of the selected participant terminal (step S105).

After receiving the session participation requesting information, the management system 50 uses the destination list management table (FIG. 8) to determine whether to continue the process that connects the participation requesting terminal (terminal 10*cb*) and the participant terminals (terminals 10*aa* and 10*db*) participating in the content data session sed (step S106). Here, FIG. 29 will be used to describe the process performed in step S106 in detail. FIG. 29 is a process flowchart illustrating a process which makes determination on participation on the basis of the communication state.

The state management unit 53 first refers to the terminal management table (FIG. 7) and acquires the communication state of the participant terminal (terminal 10*db*) by using, as a search key, the terminal ID "10*db*" of the selected participant terminal (terminal 10*db*) indicated in the participation requesting information (step S106-1). The participation determination unit 63 thereafter refers to the communication state acquired. The participation determination unit 63 allows the participation requesting terminal to participate in the established session when the acquired communication state is "Busy" ("Busy" in step S106-2) (step S106-3).

On the other hand, the transmission/reception unit 51 inquires of the participation requesting terminal (terminal cd) the participation authentication information when the acquired communication state is "Private Busy" ("Private Busy" in step S106-2) (step S106-4). Accordingly, the participation requesting terminal displays the participation authentication information entry screen on the display 120*cd* by the display control unit 16, thereby accepting the input of the participation authentication information by the user (refer to step S106-5 in FIG. 27). The participation requesting terminal then transmits the accepted participation authentication information to the management system 50 from the transmission/reception unit 11, whereby the transmission/reception unit 51 of the management system 50 receives the information (step S106-6).

Next, the participation determination unit 63 of the management system 50 compares the content of the participation authentication information received from the participation requesting terminal with the content of the participation authentication information registered in association with each terminal ID of the participant terminals (terminals 10*aa* and 10*db*) in the terminal management table, and determines whether or not the two pieces of information are identical (step S106-7).

The process proceeds to step S106-3 when the two pieces of information are identical (YES in step S106-7), where the participation determination unit 63 allows the participation requesting terminal to participate in the established session (step S106-3).

On the other hand, the participation determination unit 63 prohibits the participation requesting terminal from participating in the established session when it is determined the two pieces of information are not identical in step S106-7 (NO in step S106-7) (step S106-8). The transmission/reception unit 11 then transmits to the participation requesting terminal (terminal 10*cd*) the error message notifying that the terminal cannot participate in the session (step S106-9). Note that the participation requesting terminal (terminal 10*cd*) displays the error message on the display 120 after receiving it.

Referring back to FIG. 27, there will be described a process following a case where the participation requesting terminal (terminal 10*cb*) has been approved to participate in the established session and a process of connecting the participation requesting terminal with the participant terminals (terminals (10*aa* and 10*db*)) is continued. On the basis of the terminal ID "10*cb*" of the participation requesting terminal (terminal 10*cb*) included in the participation requesting information, the state management unit 53 of the management system 50 first modifies the field corresponding to the communication state of the record including the terminal ID "10*cb*" in the terminal management table (refer to FIG. 7) (step S107).

Here, FIG. 30 will be used to describe the process performed in step S107 in detail. The state management unit 53 illustrated in FIG. 4 first acquires the communication state of the participation requesting terminal managed in the terminal management DB (step S107-1). In this case, the modification requesting information "Call" received by the transmission/reception unit 51 is determined in advance to be not the specific modification requesting information by the modification requesting information determination unit 61. Accordingly, the state management unit 53 only acquires the communication state of the participation requesting terminal (terminal 10*cb*). The state management unit 53 here searches the terminal management table (refer to FIG. 7) by using the terminal ID "10*cb*" of the participation requesting terminal (terminal 10*cb*) as a search key and acquires the communication state "None" of the participation requesting terminal (terminal 10*cb*).

The state management unit 53 thereafter acquires the pre-modification state information of the destination terminal corresponding to the modification requesting information "Call" (step S107-2). The state management unit 53 in this case searches the state modification management table (refer to FIG. 10) by using the modification requesting information "Call" as a search key and acquires the pre-modification state information "None".

Next, the state management unit 53 compares the acquired communication state with the acquired pre-modification state information of the participation requesting terminal to determine whether or not they are identical (step S107-3). Here, the state management unit 53 compares the communication state "None" with the pre-modification state information "None" of the participation requesting terminal (terminal 10*cb*) and determines whether or not they are identical.

When it is determined in step S107-3 that the communication state and the pre-modification state information of the participation requesting terminal are identical (YES in step S107-3), the state management unit 53 acquires the modified information corresponding to the modification requesting information "Call" (step S107-4). The state management unit 53 in this case searches the state modification management table (refer to FIG. 10) by using the modification requesting information "Call" as a search key and acquires the modified information "Accepted".

Then, the state management unit 53 modifies the field corresponding to the communication state of the record including the terminal ID "10*cb*" in the terminal management table (refer to FIG. 7), on the basis of the terminal ID "10*cb*" of the participation requesting terminal (terminal 10*cb*) (step S107-5). The state management unit in this case modifies the field corresponding to the communication state of the record including the terminal ID "10*cb*" in the terminal management table to "Accepted", on the basis of the acquired modified information.

On the other hand, when it is determined in step S107-3 that the communication state and the pre-modification state information of the terminal requesting participation are not identical (NO in step S107-3), the state management unit 53 does not modify the field corresponding to the communication state of the record including the terminal ID "10*cb*" in the terminal management table (refer to FIG. 11). In this case, the transmission/reception unit 51 completes the process by transmitting the error message to the participation requesting terminal (terminal 10*cb*) (step S107-6).

Referring back to FIG. 27, there will be described a process following the case where the communication state is modified in step S107-5. The session management unit 57 first adds the terminal ID "10*cb*" of the participation requesting terminal (terminal 10*cb*) to the field corresponding to the destination terminal of the record including the session ID "se1" in the session management table (refer to FIG. 9) included in the nonvolatile memory unit 5000 (step S108).

Then, when the participation requesting terminal has been approved to participate in the established session (content data session sed) in step S106-3 illustrated in FIG. 29, the transmission/reception unit 51 of the management system 50 transmits to the participation requesting terminal (terminal 10*cb*) a participation approval notification including the session ID "se1" and the relay device connection information used to connect to the relay device 30*e* (step S109).

Upon receiving the participation approval notification, the terminal 10*cb* connects to the relay device 30*e* by transmitting the session ID "se1" and the relay device connection information included in the participation approval notification to the relay device 30*e* from the transmission/reception unit 11 (step S110). At a predetermined timing after connecting to the relay device 30*e*, the participating terminal (terminal 10*cb*) further transmits the relay requesting information including the terminal ID "10*cb*" of the terminal 10*cb*, the session ID "se1", and the modification requesting information "Join" indicating the request to start relaying, to the management system 50 from the transmission/reception unit 11. The management system 50 and the relay device 30*e* thereafter perform a process similar to that in steps S72-1, S73-1, S74-1, and S75-1, thereby establishing the content data session sed between the terminal 10*cb* and the relay device 30*e*. The relay device 30*e* can relay the low-resolution, medium-resolution, and high-resolution image data as well as the voice data among the terminals (10*aa*, 10*cb*, and 10*db*) once the content data session sed has been established. The terminals (10*aa*, 10*cb*, and 10*db*) can start the teleconference as a result.

The transmission/reception unit 51 of the management system 50 further transmits a participation notification including the terminal ID "10*cb*" of the participation requesting terminal (terminal 10*cb*) and the session ID "se1" to the participating terminals (terminal 10*aa* and terminal 10*db*) that have already initiated the content data session sed (steps S111-1 and S111-2). The participating terminals (terminal (10*aa*, terminal 10*db*) can thus be aware that the participation requesting terminal (terminal 10*cb*) is participating in the content data session.

Moreover, the terminal extraction unit 54 searches the destination list management table (refer to FIG. 8) by using, as a search key, the terminal ID of the participation requesting terminal (terminal 10*cb*) included in the session participation requesting information and extracts the terminal IDs "10*aa*, 10*bb*, and 10*db*" by reading the terminal ID of the destination terminal corresponding to the participation requesting terminal (step S112). The transmission/reception unit 51 of the management system 50 transmits a participation notification including the terminal ID "10*cb*" (an example of participation information) to the terminal 10*bb* to which the participation notification has not been transmitted among the terminals (10*aa*, 10*bb*, and 10*db*) identified by the extracted terminal IDs (step S113). The terminal 10*bb* can thus be aware that the participation requesting terminal (terminal 10*cb*) is participating in the content data session.

<<Main Effects of Embodiment>>

In the present embodiment as described above, the transmission/reception unit 51 of the management system 50 accepts the request from a third terminal (terminal 10*cb*) to participate in the session for transmitting the content data when the session has been established between a first terminal (terminal 10*aa*) and a second terminal (terminal 10*db*). Here, the management system 50 pre-registers the participation authentication information input by the first terminal when the first terminal (terminal 10*aa*) and the second terminal (terminal 10*db*) initiate the session with participation restriction. The participation determination unit 63 of the management system 50 causes the third terminal to input the participation authentication information when the established session has the participation restriction, thereby prohibiting the third terminal from participating in the session when the participation restriction information that has been input does not match the participation authentication information registered at the start of the session or allowing the third terminal to participate in the session when the two participation authentication information match each other or when the session has no participation restriction. Accordingly, the management system 50 of the present embodiment can easily and appropriately restrict the participation to the session in the middle thereof when the session is used in the conference or the like involving exchange of highly-confidential information and, at the same time, can improve the security by allowing the specific third terminal that knows the participation authentication information to participate in the session in the middle thereof, thereby suiting the convenience of the user.

The management system 50 further performs control to connect the first terminal (terminal 10*aa*), the second terminal (terminal 10*db*), and the third terminal (terminal 10*cb*). In this case, the transmission/reception unit 51 transmits, to the third terminal, the relay device connection information used to connect to the relay device 30*e* which relays the content data transmitted from the first terminal to the second terminal. The third terminal can therefore connect to the relay device 30*e* by using the relay device connection information.

Second Embodiment

In the first embodiment, the initiation requesting terminal voluntarily inputs the participation authentication information before transmitting the initiation requesting information to the management system 50 when the session with participation restriction is to be initiated. In a second embodiment, on the other hand, a management system 50 sends a request to an initiation requesting terminal to input participation authentication information when the initiation requesting terminal has transmitted initiation requesting information to the management system 50, whereby the initiation requesting terminal inputs the participation authentication information, which is registered in the management system 50.

The network structure of a transmission system 1, the hardware structure of a terminal 10, the management system 50, a relay device 30, a program providing system 90, or a maintenance system 100, and the functional structure of each terminal, device and system included in the transmission system 1 according to the present embodiment are similar to those in the first embodiment.

A transmission/reception unit 51 of the management system 50 according to the present embodiment receives the initiation requesting information from the initiation requesting terminal, inquires of the initiation requesting terminal the participation authentication information when the initiation requesting information specifies participation restriction, and receives the participation authentication information from the initiation requesting terminal in response to the inquiry.

When a transmission/reception unit 11 of the terminal 10 receives the inquiry about the participation authentication information from the management system 50, a display control unit 16 displays a participation authentication information entry screen on a display 120, thereby causing a user to input the participation authentication information through the participation authentication information entry screen. The transmission/reception unit 11 then transmits the participation authentication information that has been input to the management system 50.

Figure 31:
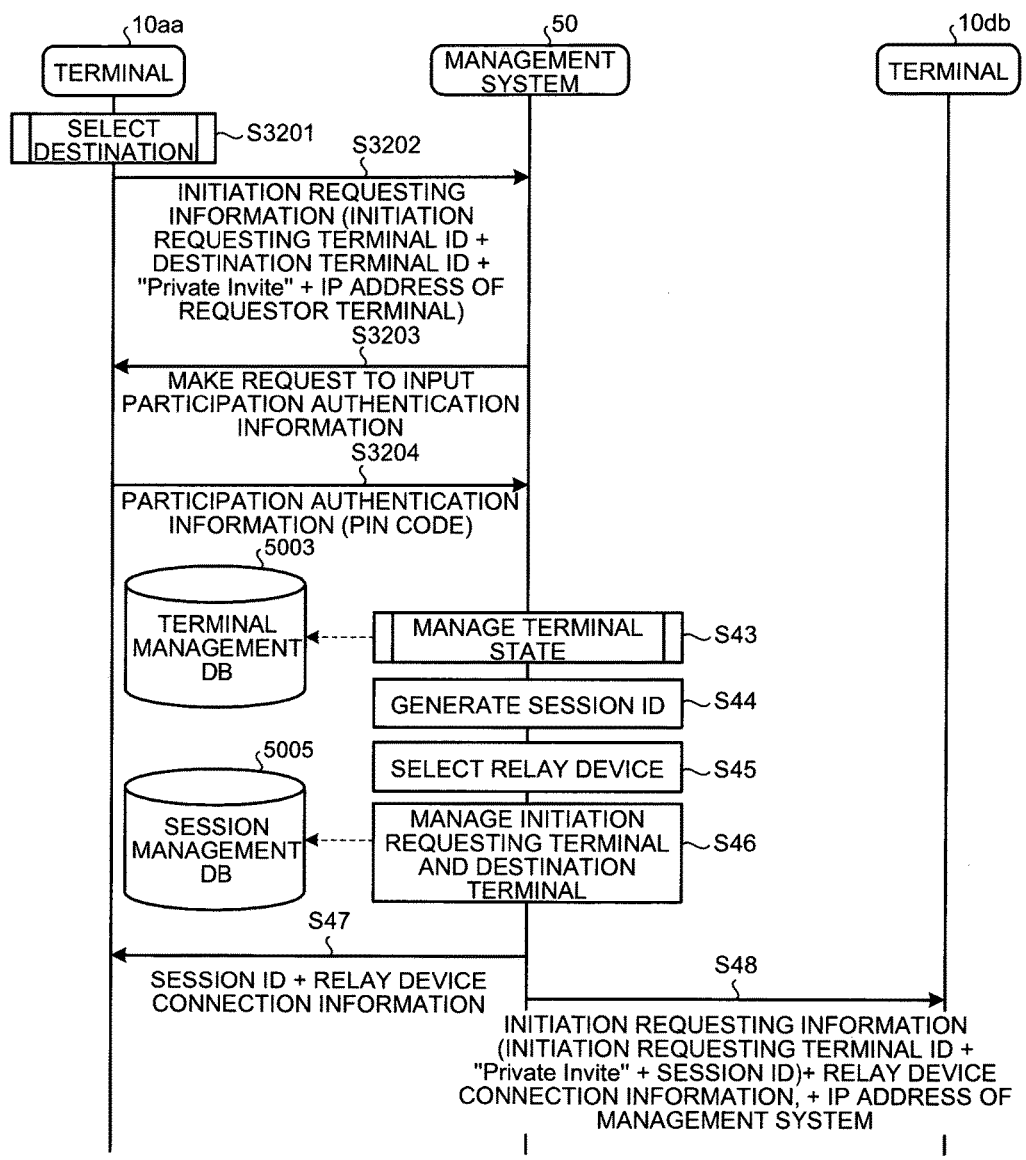
FIG. 31 is a sequence diagram illustrating a process which makes a request to initiate a communication in a second embodiment.
Figure 32:
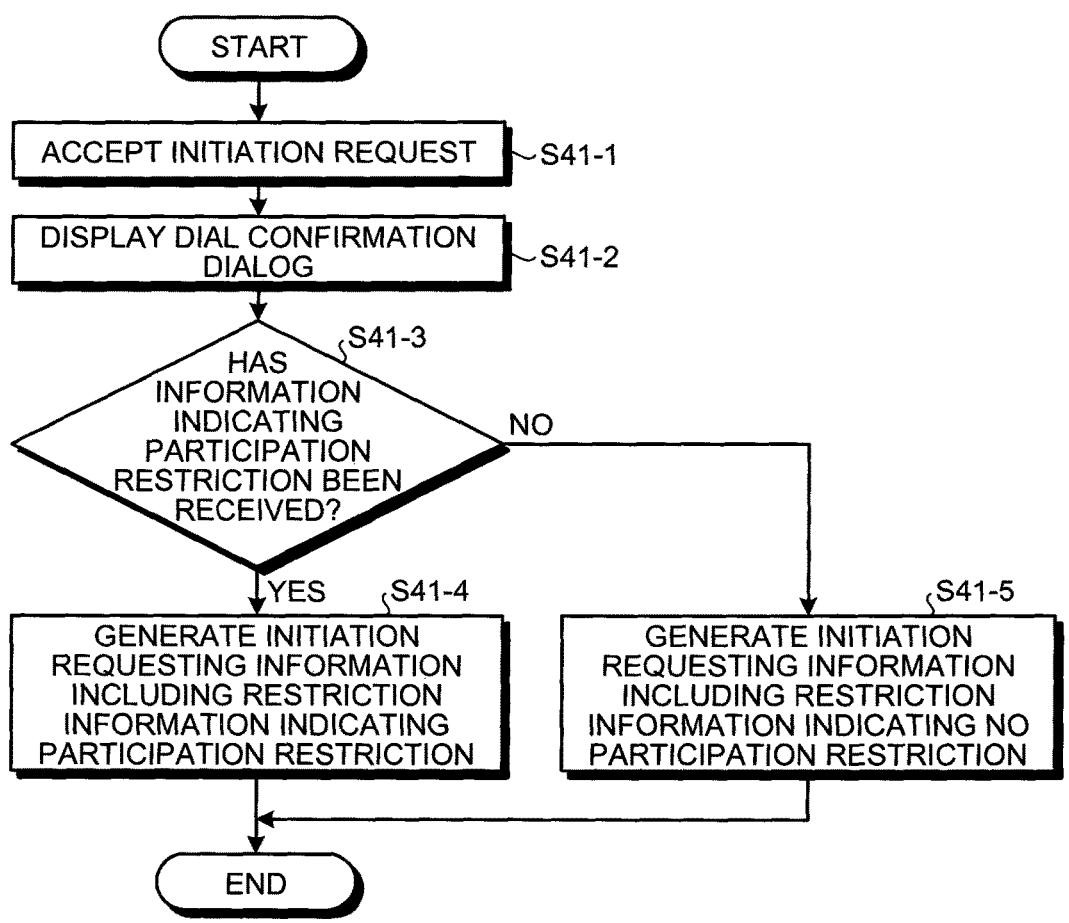
FIG. 32 is a flowchart illustrating a detailed process performed by an initiation requesting terminal in a destination selection process according to the second embodiment.

Now, there will be described a process in which a terminal makes a request to initiate a communication with another terminal. FIG. 31 is a sequence diagram illustrating a process which makes a request to initiate a communication in the second embodiment. FIG. 32 is a flowchart illustrating a detailed process performed by the initiation requesting terminal in a destination selection process according to the second embodiment.

FIG. 31 illustrates a case where a terminal 10aa which has been approved to log in in FIG. 16 transmits the initiation requesting information, namely, where the terminal 10aa operates as the initiation requesting terminal. On the basis of the state information of the destination terminal candidate received in step S32 described in FIG. 16, the terminal 10aa serving as the initiation requesting terminal can communicate with at least one of the destination terminal candidates that has an "ON line" operating status and is in the communication state "None".

Moreover, in the present embodiment, the initiation requesting terminal (terminal 10aa) can have a call with a terminal 10db among terminals (10ab, 10ba, 10db, and 10dc) as the destination terminal candidates that has an "ON line" operating status and is in the communication state "None" according to the state information of the terminal received in step S32. Accordingly, there will be described a case where a user of the initiation requesting terminal (terminal 10aa) selects to start a call with the destination terminal (terminal 10db).

Prior to starting the process illustrated in FIG. 31, a destination list illustrated in FIG. 17 is displayed on a display 120aa of the terminal 10aa serving as the initiation requesting terminal. The user of the initiation requesting terminal can thus select from the destination list a desired party with whom the user wishes to have the call, namely, the other party in a session.

In the process illustrated in FIG. 31, the destination selection process is performed when the user of the initiation requesting terminal selects the destination terminal (terminal 10db) by depressing the operation button 108 illustrated in FIG. 2 (step S3201).

FIG. 32 is the flowchart illustrating the detailed process performed by the initiation requesting terminal in the destination selection process (step S3201). The destination selection process according to the present embodiment is similar to the embodiment described in FIG. 19 in terms of accepting the selection of the destination and generating the initiation requesting information. The present embodiment does not include the step of accepting the input of the participation authentication information (step S41-4) as described in the first embodiment and is thus different from the first embodiment in that the generated initiation requesting information does not include the participation authentication information in the present embodiment.

Note that FIG. 31 describes a case where restriction information indicating participation restriction, "Private Invite", is specified as the initiation requesting information. As illustrated in FIG. 31, the transmission/reception unit 11 of the terminal 10aa transmits the initiation requesting information along with an IP address of the initiation requesting terminal to the management system 50, the initiation requesting information including a terminal ID "10aa" of the initiation requesting terminal (terminal 10aa), a terminal ID "10db" of the destination terminal (terminal 10db), and "Private Invite" that is the information indicating the request to initiate the session and includes the restriction information indicating participation restriction (step S3202).

The transmission/reception unit 51 of the management system 50 receives the initiation requesting information including "Private Invite" which represents the restriction information indicating participation restriction, and thus inquires of the terminal 10aa the participation authentication information (step S3203).

After receiving the inquiry about the participation authentication information, the terminal 10aa inputs the participation authentication information through the participation authentication information entry screen (refer to FIG. 21) displayed by the display control unit 16 and transmits the participation authentication information that has been input to the management system 50 (step S3204). The process from this point on is performed similarly to that in the first embodiment.

The present embodiment has the effect similar to that of the first embodiment, because the management system 50 sends the request to input the participation authentication information to the initiation requesting terminal when the initiation requesting terminal has transmitted the initiation requesting information to the management system 50 so that the initiation requesting terminal inputs the participation authentication information which is registered by the management system 50.

Third Embodiment

While the destination terminal does not input the participation authentication information at the start of the session in the first embodiment, the participation authentication information is input by the destination terminal at the start of the session in a third embodiment, so that it is determined whether the information matches the participation authentication information input by the initiation requesting terminal.

The network structure of a transmission system 1, the hardware structure of a terminal 10, a management system 50, a relay device 30, a program providing system 90, or a maintenance system 100, and the functional structure of each terminal, device and system included in the transmission system 1 according to the present embodiment are similar to those in the first embodiment.

Figure 33:
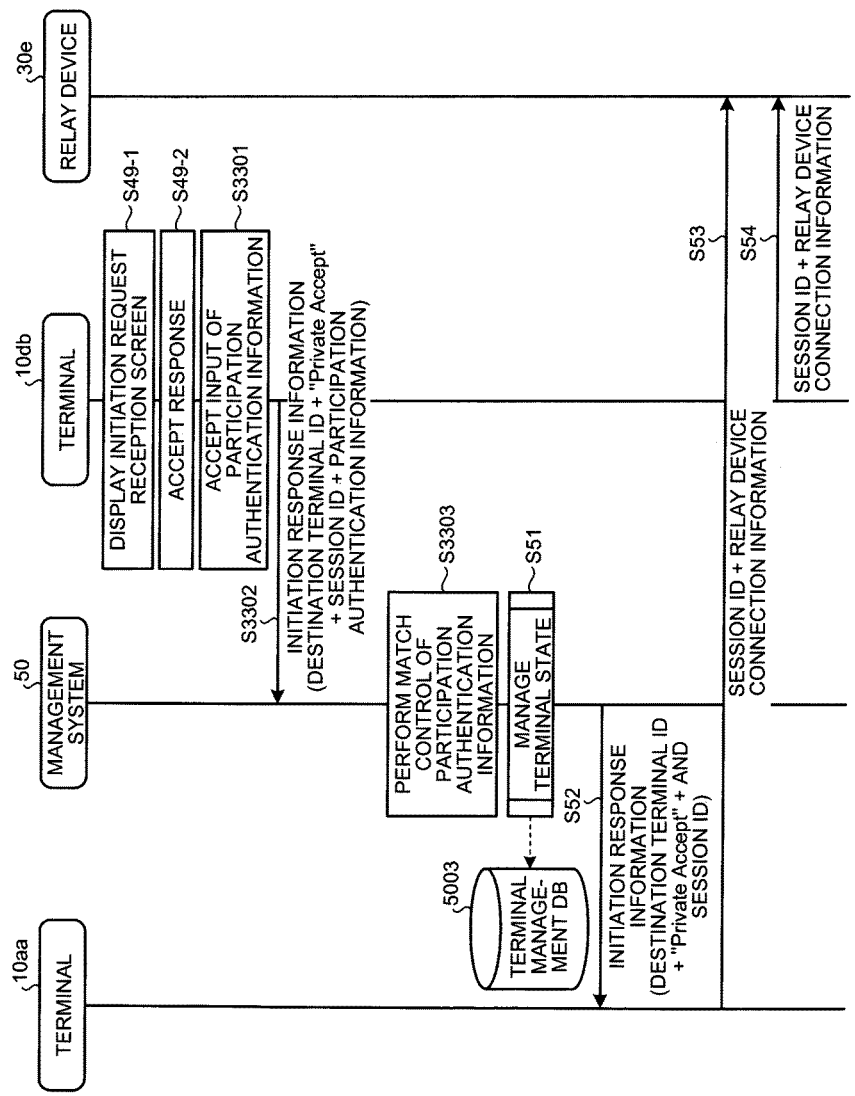
FIG. 33 is a sequence diagram illustrating a process which authorizes a request to initiate a communication in a third embodiment.

FIG. 33 is a sequence diagram illustrating a process which approves a request to initiate a communication in the third embodiment. Similar to the first embodiment, an initiation request reception screen is displayed on a display 120 of a destination terminal (step S49-1), whereby an operation input acceptance unit 12 accepts a response indicating the approval to initiate the communication (establish a session) with an initiation requesting terminal (terminal 10*aa*) (step S49-2).

Next, a display control unit 16 displays a participation authentication information entry screen illustrated in FIG. 21 on the display 120 so that the operation input acceptance unit 12 accepts the participation authentication information input by the user through the screen (step S3301).

A transmission/reception unit 11 of a destination terminal (terminal 10*db*) thereafter transmits to the management system 50 initiation response information including a terminal ID "10*db*" of the destination terminal (terminal 10*db*), a terminal ID of the initiation requesting terminal (terminal 10*aa*), modification requesting information "Private Accept" indicating the approval to establish a session with participation restriction, a session ID "se1", and the participation authentication information (step S3302).

After the initiation response information has been received by a transmission/reception unit 51 of the management system 50, it is determined whether or not the received participation authentication information matches the participation authentication information received from the initiation requesting terminal (terminal 10*aa*) (step S3303). The process is completed when the two pieces of information do not match each other, whereas the process is continued when the two pieces of information match each other. The process performed from this point on when the two pieces of information match is similar to that in the first embodiment.

Security can be further improved in the present embodiment because the participation authentication information is input by the destination terminal at the start of the session in order to determine whether the information matches the participation authentication information input by the initiation requesting terminal.

Fourth Embodiment

While the participation restriction information is not displayed on the destination list displayed in the participation requesting terminal in the first embodiment, the participation restriction information is displayed on the destination list displayed in the participation requesting terminal in a fourth embodiment, whereby the participation authentication information is input in selecting a terminal with participation restriction.

The network structure of a transmission system 1, the hardware structure of a terminal 10, a management system 50, a relay device 30, a program providing system 90, or a maintenance system 100, and the functional structure of each terminal, device and system included in the transmission system. 1 according to the present embodiment are similar to those in the first embodiment.

Figure 35:
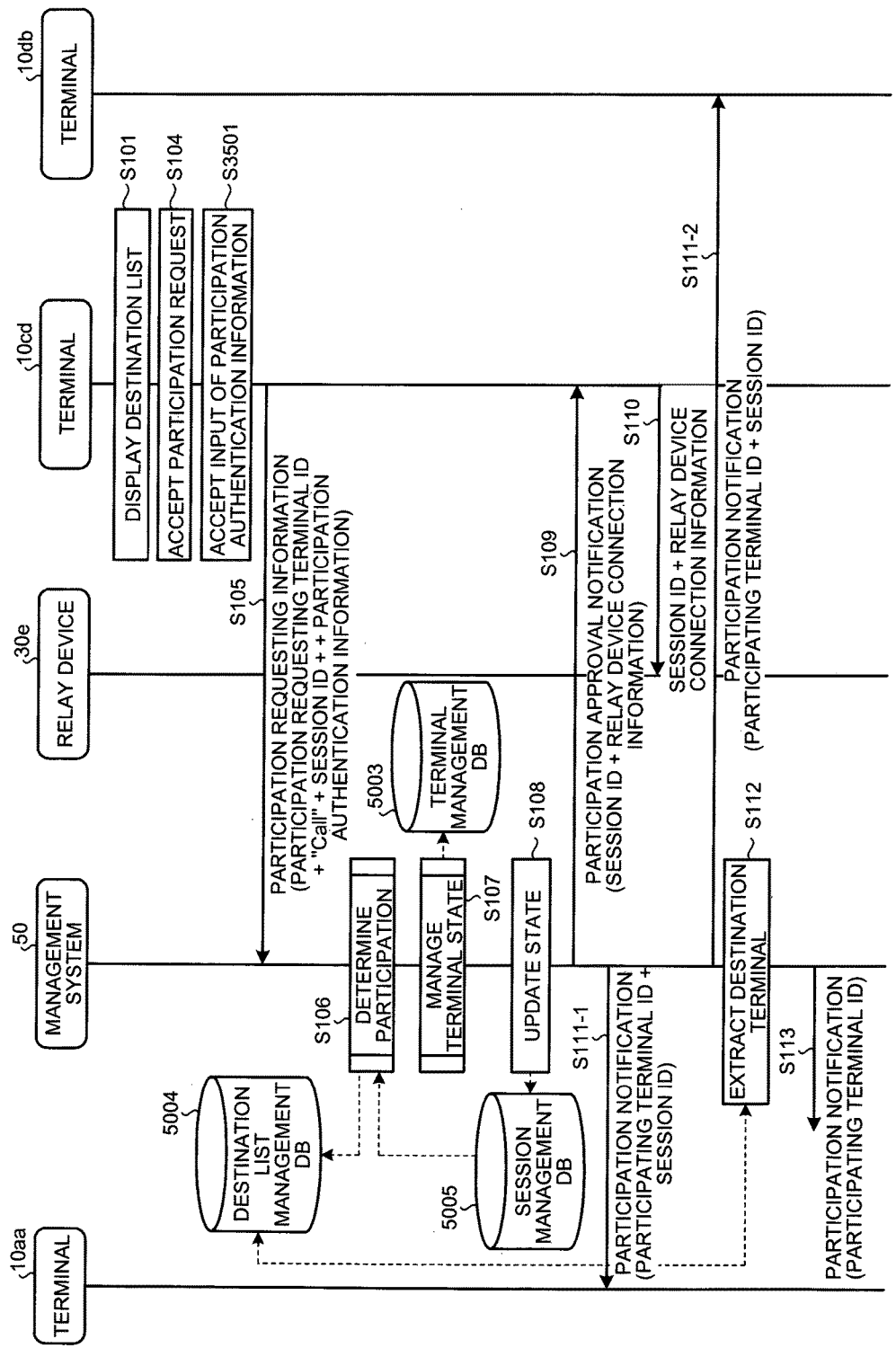
FIG. 35 is a sequence diagram illustrating a process which transmits participation requesting information for a content data session according to a fourth embodiment.

There will be described a process where, in the present embodiment, a terminal 10*cb* transmits participation requesting information indicating a request for participation to a content data session after the content data session has been established between an initiation requesting terminal (terminal 10*aa*) and a destination terminal (terminal 10*db*). That is, the terminal 10*cb* operates as a participation requesting terminal which transmits the participation requesting information. FIG. 35 is a sequence diagram illustrating a process which transmits the participation requesting information for the content data session according to the fourth embodiment.

Where the terminal 10 of the present embodiment is to be the participation requesting terminal, a destination list creation unit 20 creates a destination list including a destination terminal, which is similar to that in the first embodiment, in association with whether or not there is participation restriction in the session of the destination terminal, and a display control unit 16 displays the destination list on a display 120 (step S101). Note that whether or not there is participation restriction is determined from the communication state of each terminal transmitted from the management system 50.

FIG. 34 is a diagram illustrating an example of the destination list displayed on the display 120 of the participation requesting terminal according to the fourth embodiment. As illustrated in FIG. 34, the destination list displays whether or not there is participation restriction in association with each destination terminal. The user of the participation requesting terminal can therefore figure out whether or not the terminal in the session in which the user wishes to participate has participation restriction before instructing the participation request.

Accordingly, when the user has made the participation request by designating the terminal with participation restriction (step S104), the display control unit 16 of the participation requesting terminal (terminal 10*cd*) displays the participation authentication information entry screen illustrated in FIG. 21 on the display 120 so that the participation authentication information is input by the user and accepted by the operation input acceptance unit 12 (step S3501). A transmission/reception unit 11 thereafter transmits the participation requesting information including the participation authentication information that has been input to the management system 50 (step S105).

A participation determination unit 63 of the management system 50 then performs a process of participation determination by determining whether the participation authentication information included in the participation requesting information received from the participation requesting terminal matches the participation authentication information registered in a terminal management table, approving the participation when the two pieces of information match each other, and disapproving the participation when the two pieces of information do not match (step S106). The process of participation determination differs from the first embodiment described in FIG. 29 in that the participation determination unit 63 does not inquire of the participation requesting terminal the participation authentication information.

The present embodiment can suit the convenience of the user of the participation requesting terminal because the destination list displayed in the participation requesting terminal displays the participation restriction information while the participation authentication information is also input in selecting the terminal with participation restriction, so that he/she can make the participation request after figuring out whether or not there is participation restriction in the session. Moreover, in the present embodiment, the participation requesting terminal inputs the participation authentication information when making the participation request, thereby saving the management system 50 from inquiring of the participation requesting terminal the participation authentication information and receiving the response from the participation requesting terminal, and making the process easier.

Fifth Embodiment

While the participation authentication information is registered and managed in association with the terminal in the terminal management table according to the first to fourth embodiments, the participation authentication information is managed for each session in a fifth embodiment.

The network structure of a transmission system 1 and the hardware structure of a terminal 10, a management system 50, a relay device 30, a program providing system 90, or a maintenance system 100 are similar to those in the first embodiment.

Figure 36:
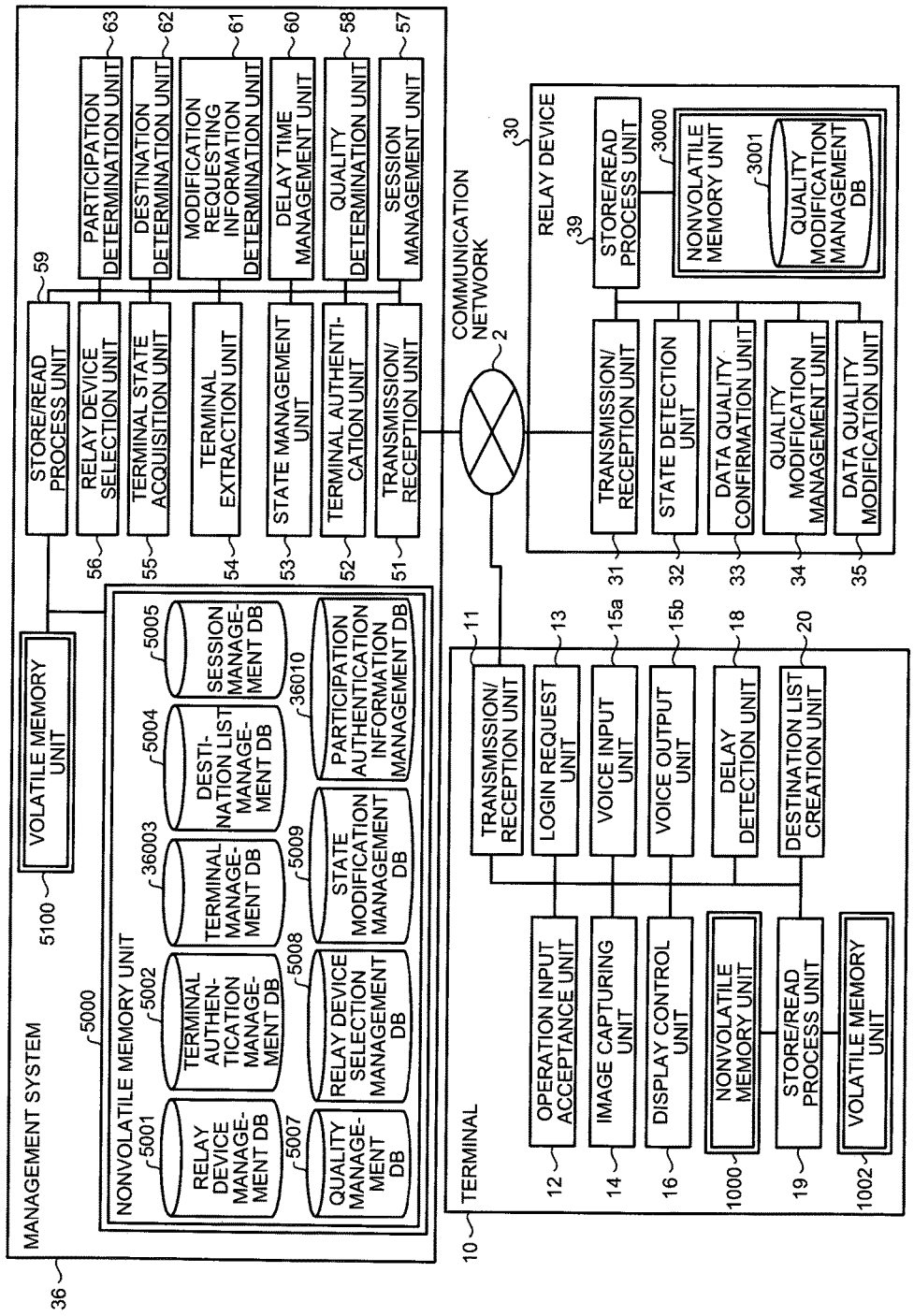
FIG. 36 is a block diagram illustrating a functional structure of each of a terminal, a device, and a system configuring a transmission system 1 according to a fifth embodiment.

FIG. 36 is a block diagram illustrating the functional structure of each terminal, device, or system included in the transmission system 1 according to the fifth embodiment. The functional structure of each of the terminal 10 and the relay device 30 is similar to that in the first embodiment. The present embodiment differs from the first embodiment in that a participation authentication information management DB 36010 is stored in a nonvolatile memory unit 5000 of the management system 50 in the present embodiment. The structure of a terminal management DB in the present embodiment is also different from that in the first embodiment. The rest of the units is similar to that in the first embodiment.

The participation authentication information management DB includes a participation authentication information management table. The participation authentication information management table manages the participation authentication information for each session. FIG. 37 is a diagram illustrating an example of the participation authentication information management table according to the fifth embodiment. As illustrated in FIG. 37, a session ID is stored in association with the participation authentication information in the participation authentication information management table.

FIG. 38 is a diagram illustrating an example of a terminal management table according to the fifth embodiment. The terminal management table according to the present embodiment differs from the terminal management table in the first embodiment in that the terminal management table illustrated in FIG. 38 does not include the item corresponding to the participation authentication information because the participation authentication information is managed in the participation authentication information management table in the present embodiment. The rest is similar to the first embodiment.

Figure 39:
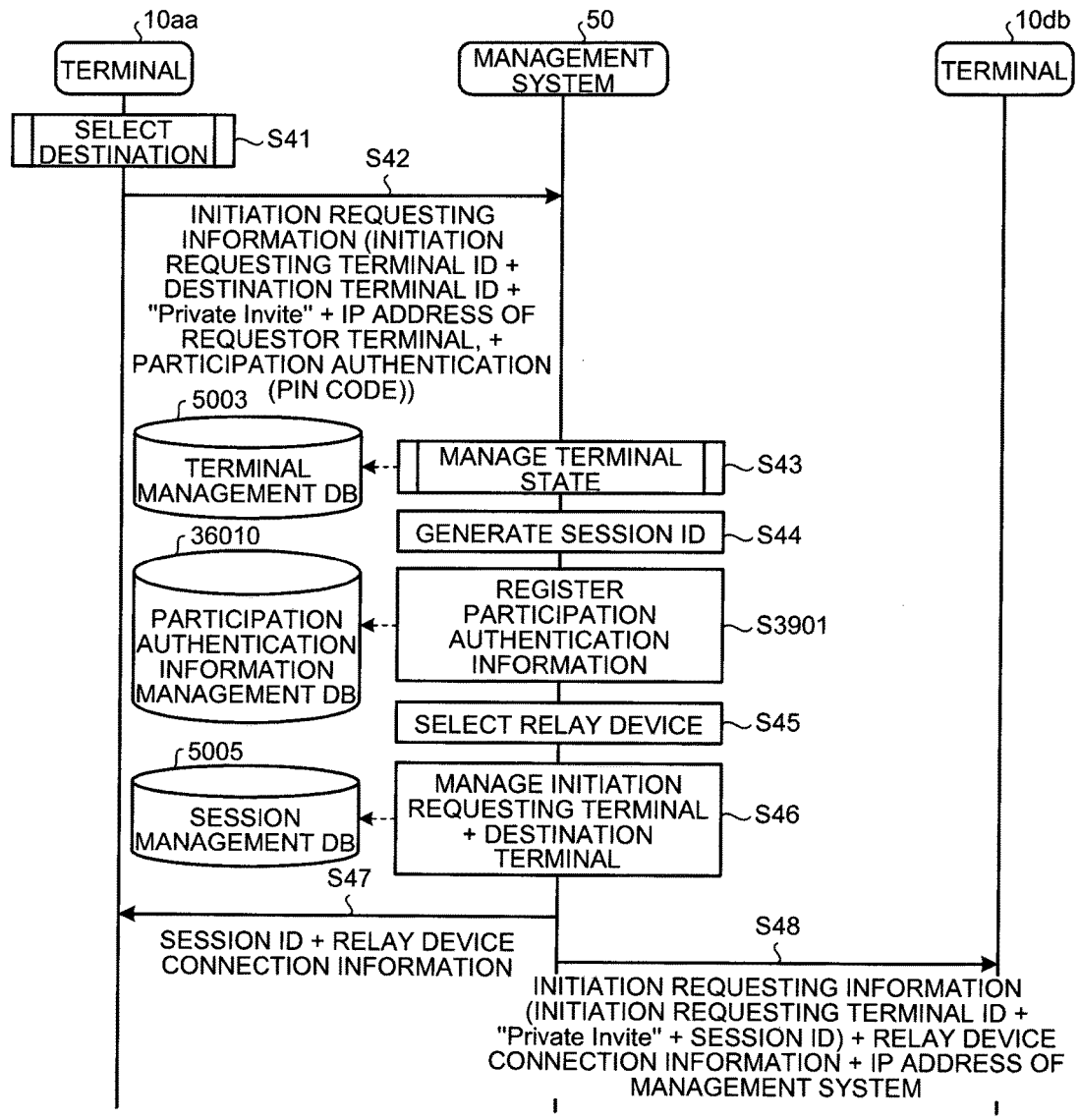
FIG. 39 is a sequence diagram illustrating a process which makes a request to initiate a communication according to the fifth embodiment.

FIG. 39 is a sequence diagram illustrating a process which makes a request to initiate a communication according to the fifth embodiment. Destination selection (step S41) performed by a initiation requesting terminal (terminal 10*aa*) as well as transmission of initiation requesting information from the initiation requesting terminal to the management system 50 (step S42) are performed similarly to those in the first embodiment.

Subsequently, the management system 50 performs a terminal state management process (step S43). In this terminal state management process, steps S43-1 to S43-6 of the processes described in FIG. 22 according to the first embodiment are performed in the similar manner, but the participation authentication information is not registered in the terminal management table as described in step S43-7 in FIG. 22.

A session management unit 57 of the management system 50 then generates a session ID in the manner similar to that in the first embodiment (step S44). Thereafter, the session management unit 57 of the management system 50 registers, in the participation authentication information management table, the generated session ID in association with the participation authentication information included in the initiation requesting information received in step S42 (step S3901). The selection of a relay device by the management system 50 and the process from this point on are performed in the manner similar to that in the first embodiment.

As a result, the session is initiated between the terminal 10*aa* and a terminal 10*db*, and a process similar to that in the first embodiment described in FIG. 27 is performed when a participation requesting terminal (terminal cd) is to participate in the session. Here, a display control unit 12 of the participation requesting terminal (terminal 10*cd*) displays, on the display, the destination list including the destination terminal classified into a group for each session. The destination terminal as well as the session can be selected in the destination list.

Figure 40:
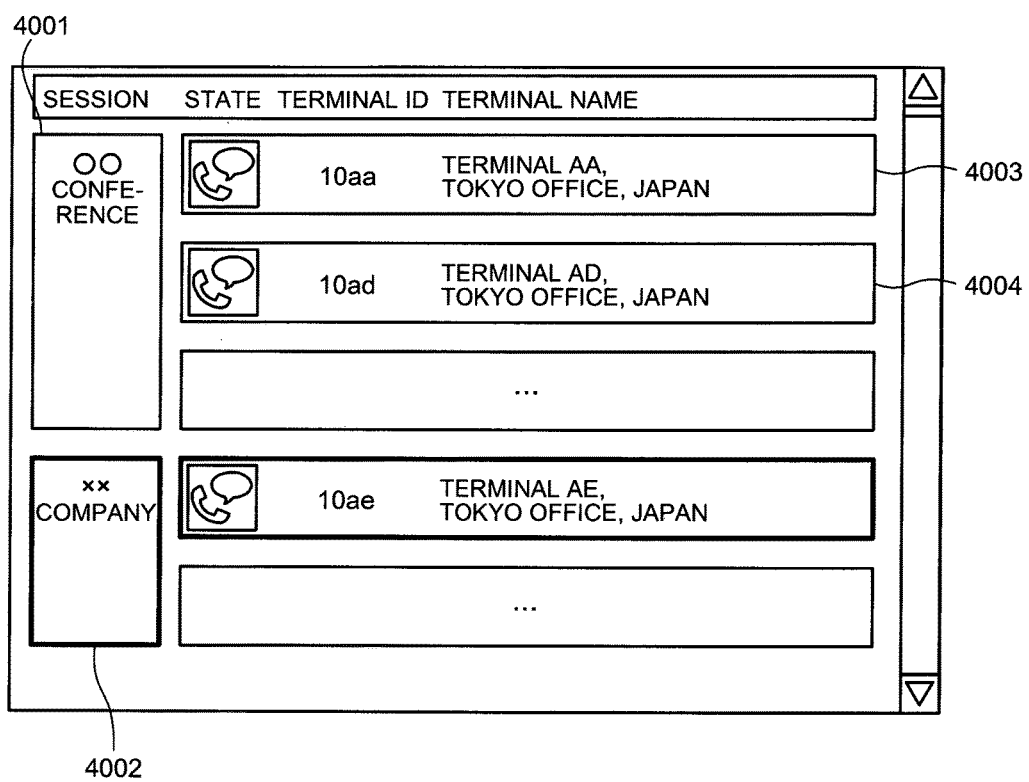
FIG. 40 is a diagram illustrating an example of a destination list displayed in a participation requesting terminal according to the fifth embodiment.

FIG. 40 is a diagram illustrating an example of the destination list displayed in the participation requesting terminal according to the fifth embodiment. As illustrated in FIG. 40, destination terminals 4003 and 4004 are displayed for each of sessions 4001 and 4002 where each of the sessions 4001 and 4002 and destination terminals 4003 and 4004 can be selected. When the session has been selected, a transmission/reception unit 11 of the participation requesting terminal transmits the participation requesting information including a session ID of the selected session to the management system 50.

Figure 41:
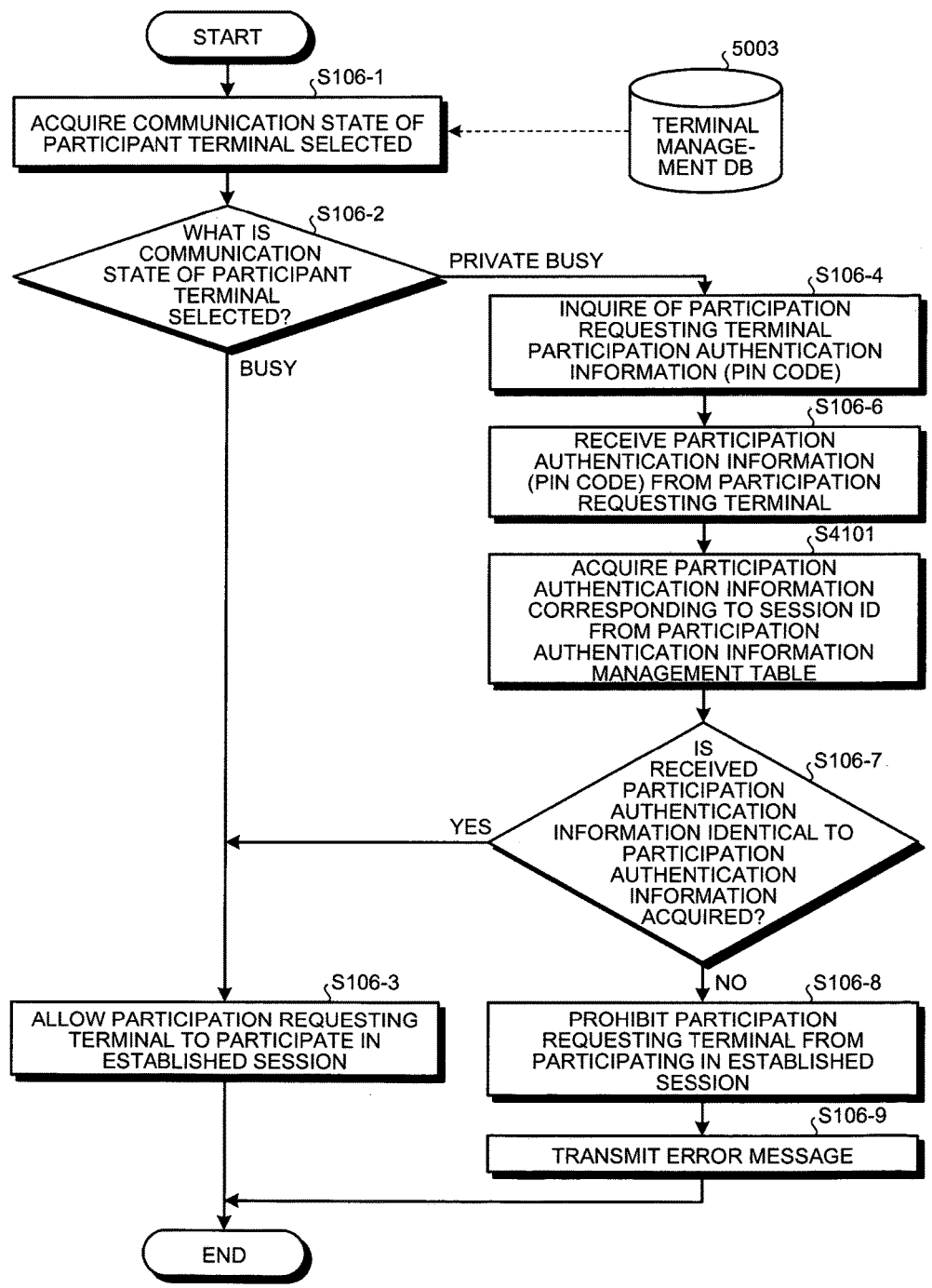
FIG. 41 is a flowchart illustrating a procedure of a participation determination process according to the fifth embodiment.

FIG. 41 is a flowchart illustrating a procedure of a participation determination process according to the fifth embodiment. Processes described in steps S106-1 to S106-3, S106-4 and S106-6 are performed similarly to the participation determination process described with reference to FIG. 29 in the first embodiment. Upon receiving participation authentication information from the participation requesting terminal in step S106-6, in the present embodiment, a participation determination unit 63 acquires the participation authentication information corresponding to the session ID included in the participation requesting information from the participation authentication information management table (step S4101).

When the destination terminal is specified by the participation requesting terminal, the participation determination unit 63 performs the process described in step S4101 for the session ID of the session that is first acquired from a session management table, the session corresponding to the terminal ID of the destination terminal included in the participation requesting information.

The participation determination unit 63 then determines whether or not the participation authentication information received from the participation requesting terminal matches the participation authentication information acquired from the participation authentication information management table (step S1906-7).

The process proceeds to step S106-4 when the two pieces of information match each other (YES in step S106-7), in which case the participation determination unit 63 allows the participation requesting terminal to participate in the established session (step S106-3).

On the other hand, when it is determined in step S106-7 that the two pieces of information do not match (NO in step S106-7), the participation determination unit 63 prohibits the participation requesting terminal from participating in the established session (step S106-8). The transmission/reception unit 11 thereafter transmits to the participation requesting terminal (terminal 10*cd*) an error message notifying that the terminal cannot participate in the session (step S106-9). The participation requesting terminal (terminal 10*cd*) displays the error message on the display 120 upon receiving it.

As described above, the present embodiment allows the participation authentication information to be managed by session and the destination terminal to be displayed by session in the destination list so that the user can select participation by the unit of session, thereby making it easier to manage the participation authentication information and suiting the convenience of the user at the same time.

While the present invention has been described with reference to the present embodiment, various modifications and improvements can be added to the aforementioned embodiments.

Figure 42:
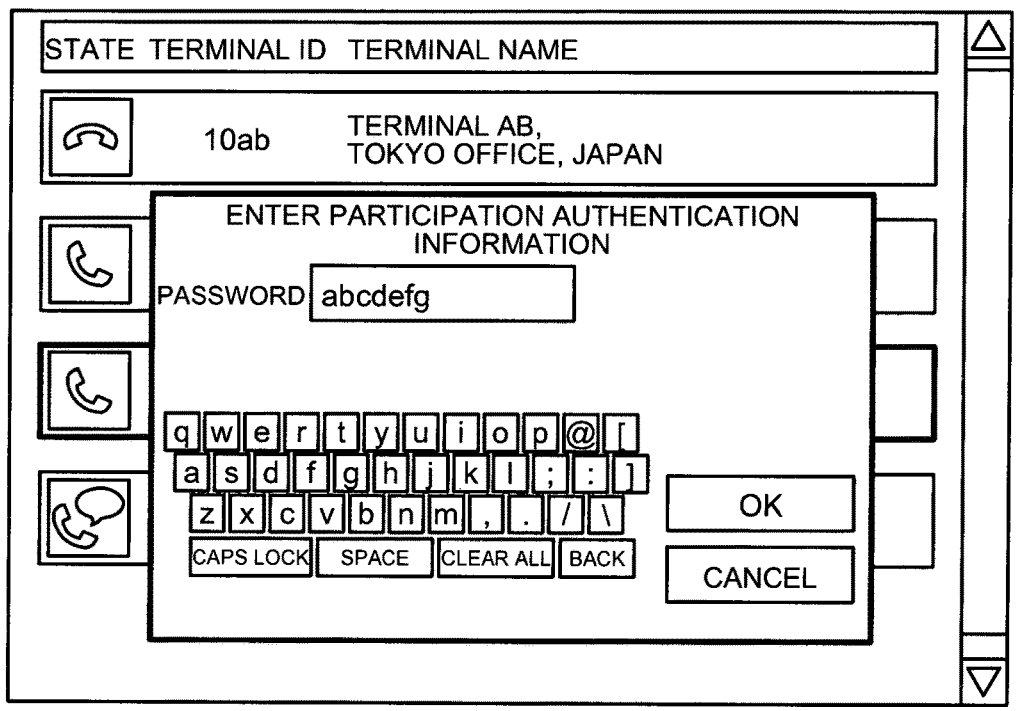
FIG. 42 is a diagram illustrating an example of a participation authentication information entry screen according to a variation.

As illustrated in FIG. 42, a variation can configure the display control unit 16 of the terminal 10 such that the participation authentication information can be input by means of a software keyboard that is displayed in the participation authentication information entry screen.

Moreover, the display control unit 16 and the operation input acceptance unit 12 may be configured such that the participation authentication information can be handwritten onto a screen provided for handwriting input or the like that is displayed in the participation authentication information entry screen, while the terminal 10 may be configured to include a recognition unit which recognizes a character that has been input.

<<Supplementary Note to Embodiments>>

Each of the management system 50 and the program providing system 90 described in each of the aforementioned embodiments may be constructed by a single computer or a plurality of computers into which each unit (or function or means) is separated and allotted randomly. A program transmitted from the program providing system 90 that is constructed by a single computer may be divided into a plurality of modules or undivided. Furthermore, a program from the program providing system 90 that is constructed by a plurality of computers may be transmitted from each computer while the program is divided into a plurality of modules.

The recording medium into which the program for terminal, the program for relay device, and the program for transmission management are stored as well as the HD 204 into which these programs are stored and the program providing system 90 including the HD 204 in the aforementioned embodiments are used when each of the program for terminal, the program for relay device, and the program for transmission management is to be provided as a program product to a user or the like within or outside the country.

While the aforementioned embodiments manage the quality of the image in the image data in the quality modification management table and the quality management table by focusing on the resolution as an example of the quality of the image in the image data relayed by the relay device 30, the quality may be managed instead by focusing on another quality such as a depth of the image quality of the image data, a sampling frequency of the voice in the voice data, or a bit length of the voice in the voice data.

With regards to the reception date and time managed in the relay device management table, the terminal management table illustrated in FIG. 7, and the session management table illustrated in FIG. 9, at least the reception time of the reception date and time need be managed.

While the IP address of the relay device and the IP address of the terminal are managed in the relay device management table illustrated in FIG. 5 and the terminal management table illustrated in FIG. 7 in the aforementioned embodiment, respectively, an FQDN (Fully Qualified Domain Name) for each device or terminal may be managed instead as long as the information serves to specify the relay device 30 or the terminal 10 on the communication network 2, the information being relay device specification information that specifies the relay device or terminal specification information that specifies the terminal. In this case, an IP address corresponding to the FQDN is acquired by a known DNS (Domain Name System) server. Note that "the relay device specification information that specifies the relay device 30 on the communication network 2" may also be expressed as "relay device connection point information that indicates a connection point for the relay device 30 on the communication network 2" or "relay device destination information that indicates a destination for the relay device 30 on the communication network 2". Likewise, "the terminal specification information that specifies the terminal 10 on the communication network 2" may also be expressed as "terminal connection point information that indicates a connection point for the terminal 10 on the communication network 2" or "terminal destination information that indicates a destination for the terminal 10 on the communication network 2".

The "teleconference" in the present embodiment is used as a term interchangeable with a "video conference".

Furthermore, the teleconference system described as an example of the transmission system 1 in the aforementioned embodiments may be replaced by a telephone system such as an IP (Internet Protocol) phone and an Internet phone, or by a vehicle navigation system. In this case, for example, one of the terminals 10 corresponds to a vehicle navigation system mounted in a vehicle while the other terminal 10 corresponds to a control terminal or a control server of a control center that controls the vehicle navigation, or a vehicle navigation system mounted in another vehicle. The transmission system 1 may also be a voice conference system or a PC (Personal Computer) screen sharing system.

Figure 43:
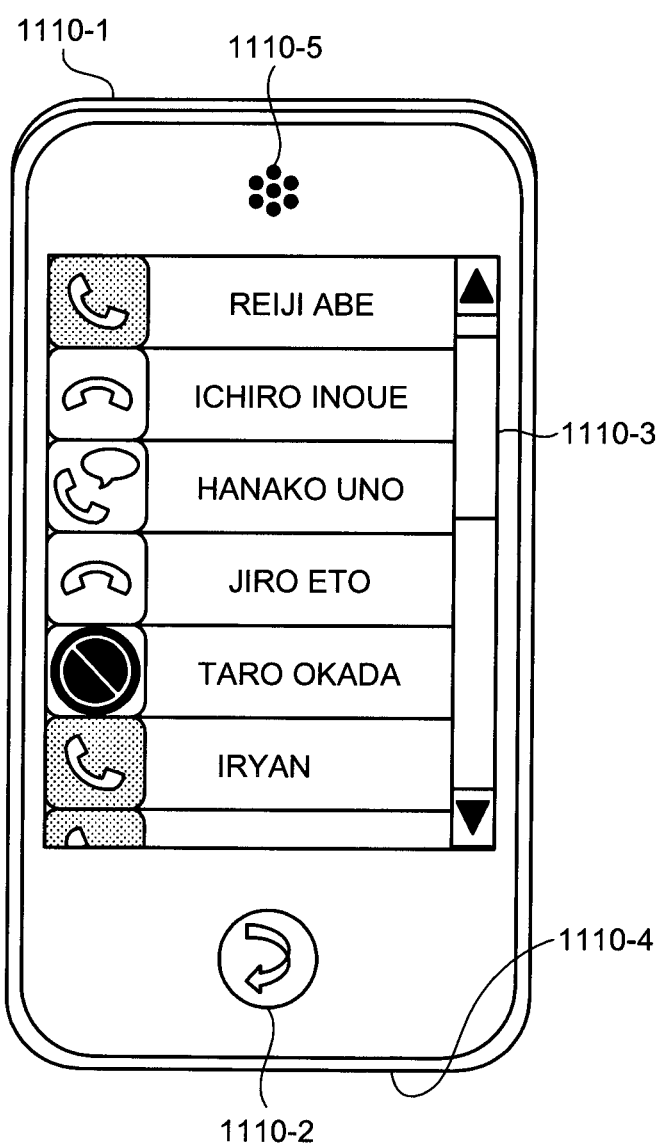
FIG. 43 is a conceptual diagram illustrating a destination list according to another embodiment.

Furthermore, the transmission system 1 may be a communication system of a mobile telephone, in which case the terminal 10 corresponds to the mobile telephone, for example. FIG. 43 illustrates a display example of a destination list in such case. FIG. 43 is a conceptual diagram illustrating the destination list according to another embodiment. That is, the terminal 10 serving as the mobile telephone includes a body 1110-1 of the mobile telephone, a menu screen display button 1110-2 provided to the body 1110-1, a display unit 1110-3 provided to the body 1110-1, a microphone 1110-4 provided at a lower part of the body 1110-1, and a speaker 1110-5 provided to the body 1110-1. The "menu screen display button" 1110-2 is a button which displays a menu screen on which an icon representing a variety of applications is displayed. The display unit 1110-3 is a touch panel through which a user selects a destination name to have a call with a mobile telephone of the other party.

The image data and the voice data described as an example of the content data in the aforementioned embodiments may also be touch data, in which case a sensation obtained by a touch of a user at one terminal is transmitted to another terminal. The content data may also be smell data, in which case smell at one terminal is transmitted to another terminal. The content data need only be at least one of the image data, the voice data, the touch data, and the smell data.

While the aforementioned embodiments have described the case where the teleconference is held by using the transmission system 1, the transmission system may also be used in a meeting, a general conversation among family members or friends, or used to present information in a non-interactive manner.

CITATION LIST

Patent Literature

Patent Literature 1: Japanese Patent Application (Laid-Open) No. 7-177482

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A communication system comprising:
   a network interface configured to:
      receive request information of session initiation from a first terminal and first authentication information of session participation, the request information of session initiation requesting for initiation of a session between the first terminal and a second terminal and indicating whether or not there is session participation restriction for at least one terminal other than the first terminal and the second terminal, and the first authentication information of session participation being provided for authenticating participation in the session when the request information of session initiation indicates that there is the session participation restriction; and
      receive request information of session participation and second authentication information of session participation from a third terminal, the request information of session participation being a request for participation in the session; and
   circuitry configured to:
      establish the session between the first terminal and the second terminal according to the request information of session initiation;
      output, for display on a display of the second terminal, an initiation request acceptance screen indicating that the session has the session participation restriction when the request information of session initiation indicates that there is the session participation restriction;
      compare the first authentication information of session participation with the second authentication information of session participation in response to the request information of session participation when the request information of session initiation indicates that there is the session participation restriction; and
      cause the third terminal to participate in the session when the first authentication information of session participation is identical to the second authentication information of session participation.

2. The communication system set forth in claim 1, wherein the network interface is configured to receive the request information of session initiation including the first authentication information of session participation from the first terminal.

3. The communication system set forth in claim 2, wherein
   the circuitry is further configured to output, for display on a display of the first terminal, a selection acceptance screen for accepting selection on whether or not there is the session participation restriction and an authentication information of session participation entry screen for accepting input of the first authentication information of session participation,
   the request information of session initiation includes information that indicates whether or not there is the session participation restriction according to an input through the selection acceptance screen by a user, and
   the first authentication information of session participation is input through the authentication information of session participation entry screen by the user.

4. The communication system set forth in claim 1, wherein the network interface is configured to
   transmit an inquiry to the first terminal for the first authentication information of session participation when the request information of session initiation indicates that there is the session participation restriction; and
   receive the first authentication information of session participation from the first terminal that is provided in response to the inquiry.

5. The communication system set forth in claim 4, wherein
   the circuitry is configured to output, for display on a display of the first terminal, a selection acceptance screen for accepting selection on whether or not there is the session participation restriction,
   the request information of session initiation includes information that indicates whether or not there is the session participation restriction according to an input through the selection acceptance screen by a user,
   the network interface is configured to transmit an inquiry to the first terminal for the first authentication information of session participation when the request information of session initiation indicates that there is the session participation restriction,
   the circuitry is further configured to output, for display on the display of the first terminal, an authentication information of session participation entry screen for accepting input of the first authentication information of session participation when the inquiry for the first authentication information of session participation is transmitted, and
   the network interface is further configured to receive the first authentication information of session participation that is input by the user through the authentication information of session participation entry screen.

6. The communication system set forth in claim 1, wherein
   the network interface is configured to:
      receive the first authentication information of session participation from the first terminal; and
      receive a third authentication information of session participation from the second terminal, and
   the circuitry is configured to:
      compare the first authentication information of session participation from the first terminal with the third authentication information of session participation from the second terminal; and
      establish the session between the first terminal and the second terminal when the first authentication information of session participation from the first terminal is identical to the third authentication information of session participation from the second terminal.

7. The communication system set forth in claim 6, wherein
   the circuitry is further configured to output, for display on the display of the second terminal, an authentication information of session participation entry screen for accepting input of the third authentication information of session participation, and the network interface is further configured to receive from the second terminal the third authentication information of session participation that is input through the authentication information of session participation entry screen by a user.

8. The communication system set forth in claim 1, further comprising:
a memory configured to store destination list management information in which terminal identification information for identifying each of the terminals is associated with at least one partner terminal candidate capable of establishing a session, wherein
the circuitry is configured to output, for display on a display of the third terminal, the at least one partner terminal candidate being associated with the third terminal in the destination list management information,
the network interface is configured to receive the request information of session participation including information that is input by a user selecting a partner terminal candidate from the at least one displayed partner terminal candidate,
the circuitry is further configured to output, for display on the display of the third terminal, an authentication information of session participation entry screen for accepting input of the second authentication information of session participation when the request information of session participation is the request for participation in the session established in response to the request information of session initiation indicating that there is the session participation restriction, and
the network interface is further configured to receive the second authentication information of session participation that is input through the authentication information of session participation entry screen.

9. The communication system according to claim 1, further comprising:
a memory configured to store destination list management information in which terminal identification information identifying each of the terminals is associated with at least one partner terminal candidate capable of establishing a session, wherein
the circuitry is configured to output, for display on a display of the third terminal, whether or not there is corresponding session participation restriction associated with the at least one partner terminal candidate, and
the network interface is configured to receive the request information of session participation including information that is input by a user selecting a partner terminal candidate from the at least one displayed partner terminal candidate and the second authentication information of session participation that is input by the user when there is the corresponding session participation restriction associated with the selected partner terminal candidate.

10. The communication system set forth in claim 1, further comprising:
a memory configured to store terminal management information in which terminal identification information identifying each of the terminals, a state of each terminal, and corresponding authentication information of session participation are stored in association with one another, wherein
the circuitry is configured to
register, in the terminal management information, the first authentication information of session participation from the first terminal in association with the terminal identification information of the first terminal and the terminal identification information of the second terminal, at the start of the session;
compare first authentication information of session participation in the terminal management information with the second authentication information of session participation in the terminal management information according to the request information of session participation; and
allow the third terminal to participate in the session when first authentication information of session participation in the terminal management information is identical to the second authentication information of session participation in the terminal management information according to the request information of session participation.

11. The communication system set forth in claim 1, further comprising:
a memory configured to
store destination list management information in which terminal identification information identifying each of the terminals is being associated with at least one partner terminal candidate capable of establishing a session; and
store authentication information of session participation management information in which session identification information identifying an established session is associated with corresponding authentication information of session participation specified in corresponding request information of session initiation for the established session when the established session has the participation restriction, wherein
the circuitry is configured to
classify, in the destination list management information, the at least one partner terminal candidate according to the third terminal by each session in which the at least one partner terminal candidate participates;
output, for display on a display of the third terminal, the partner at least one terminal candidate and the sessions so as to be selected by a user;
register, in the authentication information of session participation management information, the session identification information of a session to be established in association with the authentication information of session participation from the first terminal when the session is established between the first terminal and the second terminal;
compare the first authentication information of session participation according to the established session specified in the request information of session participation and/or the session in which the terminal participates with the second authentication information of session participation in the authentication information of session participation management information according to the request information of session participation; and
allow the third terminal to participate in the session when the first authentication information of session participation according to the established session specified in the request information of session participation and/or the session in which the terminal participates is identical to the second authentication information of session participation in the authentication information of session participation management information according to the request information of session participation.

12. The communication system set forth in claim 1, wherein the network interface is configured to receive the first authentication information of session participation from the first terminal together with the request information of session initiation.

13. The communication system set forth in claim 1, wherein the first authentication information of session participation is a PIN code or a password.

14. A non-transitory computer readable medium including a computer program product, the computer program product comprising instructions which, when executed by a computer, causes the computer to perform operations comprising:

receiving request information of session initiation from a first terminal and first authentication information of session participation, the request information of session initiation requesting for initiation of a session between the first terminal and a second terminal and indicating whether or not there is session participation restriction for at least one terminal other than the first terminal and the second terminal, and the first authentication information of session participation being provided for authenticating participation in the session when the request information of session initiation indicates that there is the session participation restriction;

establishing the session between the first terminal and the second terminal according to the request information of session initiation;

outputting, for display on a display of the second terminal, an initiation request acceptance screen indicating that the session has the session participation restriction when the request information of session initiation indicates that there is the session participation restriction;

receiving request information of session participation and second authentication information of session participation from a third terminal, the request information of session participation being a request for participation in the session;

comparing the first authentication information of session participation with the second authentication information of session participation in response to the request information of session participation when the request information of session initiation indicates that there is the session participation restriction; and causing the third terminal to participate in the session when the first authentication information of session participation is identical to the second authentication information of session.

15. The non-transitory computer readable medium set forth in claim 14, wherein the first authentication information of session participation is received from the first terminal together with the request information of session initiation.

16. The non-transitory computer readable medium set forth in claim 14, wherein the first authentication information of session participation is a PIN code or a password.

\* \* \* \* \*